US012720620B2

(12) United States Patent
Cheong et al.

(10) Patent No.: US 12,720,620 B2
(45) Date of Patent: Aug. 25, 2026

(54) ELECTRONIC DEVICE FOR PROVIDING AUDIO SERVICE AND OPERATION METHOD THEREOF

(71) Applicant: Samsung Electronics Co., Ltd., Suwon-si (KR)

(72) Inventors: Gupil Cheong, Suwon-si (KR); Doosuk Kang, Suwon-si (KR); Hyungseoung Yoo, Suwon-si (KR); Juyeon Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/632,934

(22) Filed: Apr. 11, 2024

(65) Prior Publication Data

US 2024/0267960 A1 Aug. 8, 2024

Related U.S. Application Data

(63) Continuation of application No. PCT/KR2022/014369, filed on Sep. 26, 2022.

(30) Foreign Application Priority Data

Oct. 28, 2021 (KR) ........................ 10-2021-0145785

(51) Int. Cl.
*H04W 76/10* (2018.01)
*H04W 4/80* (2018.01)

(52) U.S. Cl.
CPC .................................. *H04W 76/10* (2018.02)

(58) Field of Classification Search
CPC ......... H04W 76/10; H04W 4/18; H04W 4/80; H04W 28/18; H04W 80/02; H04W 88/02;
(Continued)

(56) References Cited

U.S. PATENT DOCUMENTS 10,785,818 B2 * 9/2020 Sridhara ............... H04W 76/15
2010/0023336 A1 * 1/2010 Shmunk ............. G10L 19/0212 704/503

(Continued)

FOREIGN PATENT DOCUMENTS

CN 115426687 A 12/2022
KR 20100096998 A 9/2010

(Continued)

OTHER PUBLICATIONS

Sheikh et al., Adaptive Physical Layer Selection for Bluetooth 5: Measurements and Simulations, Retrieved from the futernet: URL: https:// doi.org/10.I 155/2021/8842919, vol. 2021, 12 pages, Jan. 6, 2021, Hindawi Wireless Communications and Mobile Computing.

(Continued)

*Primary Examiner* — Andrew Wendell
(74) *Attorney, Agent, or Firm* — Nixon & Vanderhye P.C.

(57) ABSTRACT

A first electronic device may include a communication circuit and at least one processor. The at least one processor may be configured to: establish a BLE communication link with a second electronic device; on the basis of the BLE communication link, identify a physical layer transmission scheme (PHY) change policy indicating a change in the PHY, the PHY being used in a CIS link for an audio service between the first electronic device and the second electronic device; initiate the CIS link according to the PHY change policy; determine a PHY for a first time interval of the CIS link, as a first PHY on the basis of the PHY change policy; transmit a first audio packet generated using the first PHY to the second electronic device in the first time interval through the CIS link; determine a PHY for a second time interval of the CIS link, as a second PHY on the basis of the PHY change policy; and transmit a second audio packet generated
(Continued)

using the second PHY to the second electronic device in the second time interval through the CIS link.

20 Claims, 40 Drawing Sheets

(58) Field of Classification Search
CPC ... H04W 72/231; H04W 72/232; Y02D 30/70
See application file for complete search history.

(56) References Cited

U.S. PATENT DOCUMENTS

| | | | | |
|---|---|---|---|---|
| 2010/0229013 | A1* | 9/2010 | Diab | H04L 63/16 709/224 |
| 2012/0033620 | A1* | 2/2012 | Thoen | H04J 3/0697 370/329 |
| 2015/0103187 | A1* | 4/2015 | Schieltz | H04N 5/77 348/187 |
| 2015/0325201 | A1* | 11/2015 | Toba | H04N 5/38 |
| 2017/0244576 | A1 | 8/2017 | Batra et al. | |
| 2019/0373458 | A1* | 12/2019 | Dandekar | H04L 9/0891 |
| 2020/0120378 | A1* | 4/2020 | Elliot | H04N 21/43637 |
| 2021/0084072 | A1* | 3/2021 | Elend | H04L 69/323 |
| 2021/0184887 | A1* | 6/2021 | Balasubramaniam | H04W 76/10 |
| 2023/0090911 | A1* | 3/2023 | Wang | H04W 76/15 370/329 |
| 2023/0276515 | A1* | 8/2023 | Xu | H04R 1/1041 370/329 |

FOREIGN PATENT DOCUMENTS

| | | | |
|---|---|---|---|
| KR | 20150142565 | A | 12/2015 |
| KR | 20170040240 | A | 4/2017 |
| KR | 101971183 | B1 | 4/2019 |
| KR | 20210020542 | A | 2/2021 |
| KR | 20210086517 | A | 7/2021 |
| KR | 20220034384 | A | 3/2022 |
| WO | 2020239985 | A1 | 12/2020 |

OTHER PUBLICATIONS

International Search Report for PCT/KR2022/014369 mailed Dec. 14, 2022, 5 pages.

Written Opinion of the ISA for PCT/KR2022/014369 mailed Dec. 14, 2022, 4 pages.

* cited by examiner

802

| Header | | | | | | | |
|---|---|---|---|---|---|---|---|
| LLID (2 bits) | NESN (1 bit) | SN (1 bit) | ND (1 bit) | CP (1 bit) | RFU (2 bits) | Length (8 bits) | CTEInfo (8 bits) |

| Header | | | | | | | |
|---|---|---|---|---|---|---|---|
| LLID (2 bits) | NESN (1 bit) | SN (1 bit) | CIE (1 bit) | RFU (1 bit) | NPI (1 bit) | RFU (1 bit) | Length (8 bits) |

FIG. 14

ELECTRONIC DEVICE FOR PROVIDING AUDIO SERVICE AND OPERATION METHOD THEREOF

CROSS-REFERENCE TO RELATED APPLICATIONS

This application is a continuation application of International Application No. PCT/KR2022/014369 designating the United States, filed on Sep. 26, 2022, in the Korean Intellectual Property Receiving Office and claiming priority to Korean Patent Application No. 10-2021-0145785 filed on Oct. 28, 2021, in the Korean Intellectual Property Office, the disclosures of which are all hereby incorporated by reference herein in their entireties.

BACKGROUND

Technical Field

Various example embodiments relate to an electronic device for providing an audio service and/or a method for operating the same.

Description of Related Art

Bluetooth communication technology may suggest a short-range wireless communication technology that enables electronic devices to be connected to each other for exchanging data or information. Bluetooth communication technology may have Bluetooth legacy (or classic) communication technology or Bluetooth low energy (BLE) communication technology and have various kinds of topology, such as piconet or scatternet.

Recently in wide use are electronic devices adopting Bluetooth communication technology. In particular, a pair of earbuds that may be respectively worn on both ears of the user are widely used as an ear-wearable device. An ear-wearable device may provide various functions. For example, an ear-wearable device may include a microphone to identify the user's voice, thereby transmitting data for the user's voice to an electronic device (e.g., a smartphone). Further, the ear-wearable device may include a speaker to output the audio data received from an electronic device (e.g., a smartphone) to through the speaker.

The ear-wearable device may include a primary earbud (e.g., the right earbud) and a secondary earbud (e.g., the left earbud) that may be connected to an electronic device (e.g., a smart phone). The primary earbud may transmit voice data to the electronic device through connection with the electronic device, and the electronic device may transmit audio data (or audio content) to the master earbud. The primary earbud may transfer audio data (or audio content) received from the electronic device through wireless communication to the secondary earbud and may output the audio data through the speaker. The secondary earbud may be synchronized with the primary earbud, outputting the audio data transferred from the primary earbud or electronic device through the speaker.

The primary earbud and the secondary earbud (hereinafter referred to as 'earbuds') may be connected to the electronic device based on Bluetooth communication to perform the above operations. To that end, the earbuds may perform a pairing operation including an inquiry and/or an inquiry scan operation, or a BLE advertising and/or BLE scan operation.

The inquiry operation may refer to an initial operation of a connection in which an inquiry packet is repeatedly transmitted until a response is received from a peer electronic device or a time-out occurs. The inquiry scan operation may refer to an operation for monitoring reception of an inquiry packet through a designated physical channel. Upon receiving the inquiry packet through the inquiry scan operation, the earbuds may transmit an inquiry response packet including its own information.

The BLE advertising operation may indicate an operation for periodically broadcasting an advertising packet through an advertising physical channel, and the BLE scan may indicate an operation for monitoring reception of the advertising packet.

SUMMARY

Example embodiments may provide an audio service through changing a physical layer transmission method between electronic devices performing Bluetooth LE communication.

Example embodiments may provide an electronic device that changes into a designated physical layer transmission method in a designated time interval while performing an audio service and a method for operating the same.

A first electronic device according to an example embodiment may comprise memory storing instructions, a communication circuit configured to support Bluetooth communication and at least one processor, comprising processing circuitry, functionally connected with the memory and the communication circuit. The instructions, when executed by the at least one processor, cause the first electronic device to establish a Bluetooth low energy (BLE) communication link with a second electronic device through at least the communication circuit. The instructions, when executed by the at least one processor, cause the first electronic device to identify a physical layer transmission scheme (PHY) change policy indicating a change in a PHY used in a connected isochronous stream (CIS) link for an audio service between the first electronic device and the second electronic device based on the BLE communication link. The instructions, when executed by the at least one processor, cause the first electronic device to start the CIS link based on the PHY change policy and determine a PHY for a first time interval of the CIS link as a first PHY based on the PHY change policy. The instructions, when executed by the at least one processor, cause the first electronic device to transmit a first audio packet generated using at least the first PHY in the first time interval to the second electronic device through at least the CIS link. The instructions, when executed by the at least one processor, cause the first electronic device to determine a PHY for a second time interval of the CIS link as a second PHY based on the PHY change policy. The instructions, when executed by the at least one processor, cause the first electronic device to transmit a second audio packet generated using at least the second PHY in the second time interval to the second electronic device through at least the CIS link.

A second electronic device according to an example embodiment may comprise memory storing instructions, a communication circuit configured to support Bluetooth communication and at least one processor, comprising processing circuitry, functionally connected with the memory and the communication circuit. The instructions, when executed by the at least one processor, cause the second electronic device to establish a Bluetooth low energy (BLE) communication link with a first electronic device through at least the communication circuit. The instructions, when executed by the at least one processor, cause the second electronic device to identify a physical layer transmission scheme (PHY) change policy indicating a change in a PHY used in a connected isochronous stream (CIS) link for an audio service between the first electronic device and the second electronic device based on the BLE communication link. The instructions, when executed by the at least one processor, cause the second electronic device to start the CIS link according to the PHY change policy and determine a PHY for a first time interval of the CIS link as a first PHY based on the PHY change policy. The instructions, when executed by the at least one processor, cause the second electronic device to receive a first audio packet generated using at least the first PHY in the first time interval from the first electronic device through at least the CIS link. The instructions, when executed by the at least one processor, cause the second electronic device to determine a PHY for a second time interval of the CIS link as a second PHY based on the PHY change policy. The instructions, when executed by the at least one processor, cause the second electronic device to receive a second audio packet generated using at least the second PHY in the second time interval from the first electronic device through at least the CIS link.

A method performed by a first electronic device according to an example embodiment may comprise establishing a Bluetooth low energy (BLE) communication link with a second electronic device. The method may comprise identifying a physical layer transmission scheme (PHY) change policy indicating a change in a PHY used in a connected isochronous stream (CIS) link for an audio service between the first electronic device and the second electronic device based on the BLE communication link. The method may comprise starting the CIS link based on the PHY change policy and determining a PHY for a first time interval of the CIS link as a first PHY based on the PHY change policy. The method may comprise transmitting a first audio packet generated using at least the first PHY in the first time interval to the second electronic device through at least the CIS link. The method may comprise determining a PHY for a second time interval of the CIS link as a second PHY based on the PHY change policy. The method may comprise transmitting a second audio packet generated using at least the second PHY in the second time interval to the second electronic device through at least the CIS link.

A method performed by a second electronic device according to an example embodiment may comprise establishing a Bluetooth low energy (BLE) communication link with a first electronic device. The method may comprise identifying a physical layer transmission scheme (PHY) change policy indicating a change in a PHY used in a connected isochronous stream (CIS) link for an audio service between the first electronic device and the second electronic device based on the BLE communication link. The method may comprise starting the CIS link based on the PHY change policy and determining a PHY for a first time interval of the CIS link as a first PHY based on the PHY change policy. The method may comprise receiving a first audio packet generated using at least the first PHY in the first time interval from the first electronic device through at least the CIS link. The method may comprise determining a PHY for a second time interval of the CIS link as a second PHY based on the PHY change policy. The method may comprise receiving a second audio packet generated using at least the second PHY in the second time interval from the first electronic device through at least the CIS link.

In a non-transitory computer-readable storage medium storing one or more programs according to an embodiment, the one or more programs may comprise instructions that, when executed by at least one processor of a first electronic device, enable the first electronic device to establish a Bluetooth low energy (BLE) communication link with a second electronic device, identify a physical layer transmission scheme (hereinafter, referred to as PHY) change policy indicating a change in a PHY used in a connected isochronous stream (CIS) link for an audio service between the first electronic device and the second electronic device based on the BLE communication link, start the CIS link based on the PHY change policy, determine a PHY for a first time interval of the CIS link as a first PHY based on the PHY change policy, transmit a first audio packet generated using at least the first PHY in the first time interval to the second electronic device through at least the CIS link, determine a PHY for a second time interval of the CIS link as a second PHY based on the PHY change policy, and transmit a second audio packet generated using at least the second PHY in the second time interval to the second electronic device through at least the CIS link.

In a non-transitory computer-readable storage medium storing one or more programs according to an embodiment, the one or more programs may comprise instructions that, when executed by at least one processor of a second electronic device, enable the second electronic device to establish a Bluetooth low energy (BLE) communication link with a first electronic device through at least the communication circuit, identify a physical layer transmission scheme (PHY) change policy indicating a change in a PHY used in a connected isochronous stream (CIS) link for an audio service between the first electronic device and the second electronic device based on the BLE communication link, start the CIS link based on the PHY change policy, determine a PHY for a first time interval of the CIS link as a first PHY based on the PHY change policy, receive a first audio packet generated using at least the first PHY in the first time interval from the first electronic device through at least the CIS link, determine a PHY for a second time interval of the CIS link as a second PHY based on the PHY change policy, and receive a second audio packet generated using at least the second PHY in the second time interval from the first electronic device through at least the CIS link.

BRIEF DESCRIPTION OF DRAWINGS

The above and other aspects, features, and advantages of certain example embodiments will be more apparent from the following detailed description, taken in conjunction with the accompanying drawings, in which:

FIG. 8 is a view illustrating a data PDU format that may be included in an LE packet according to an example embodiment;

FIG. 13 is a view illustrating an example of control data set for a CIS link according to an example embodiment;

FIG. 14 is a view illustrating a CIS header format used for AoBLE according to an example embodiment;

DETAILED DESCRIPTION

Figure 1:
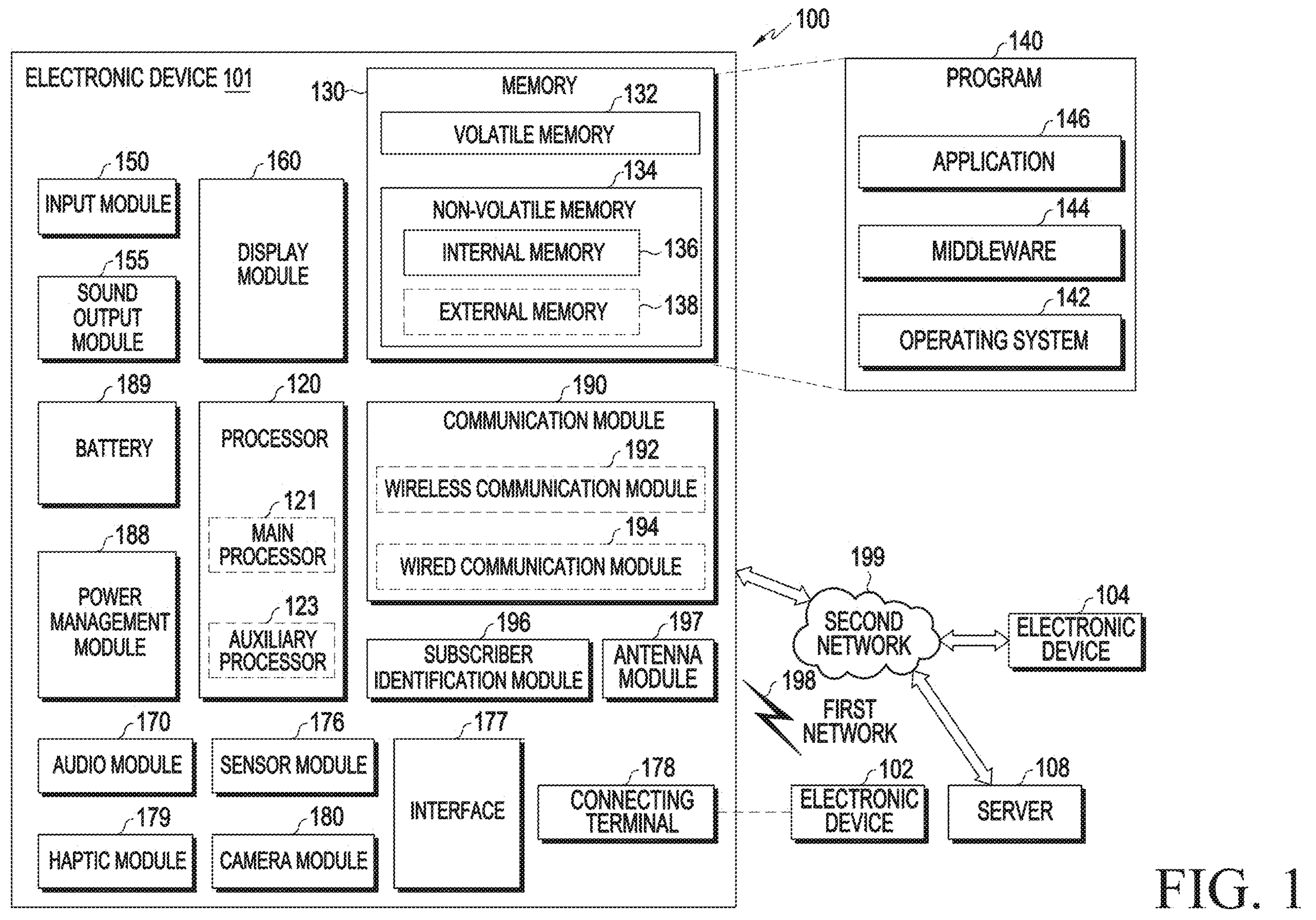
FIG. 1 is a view illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network), such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
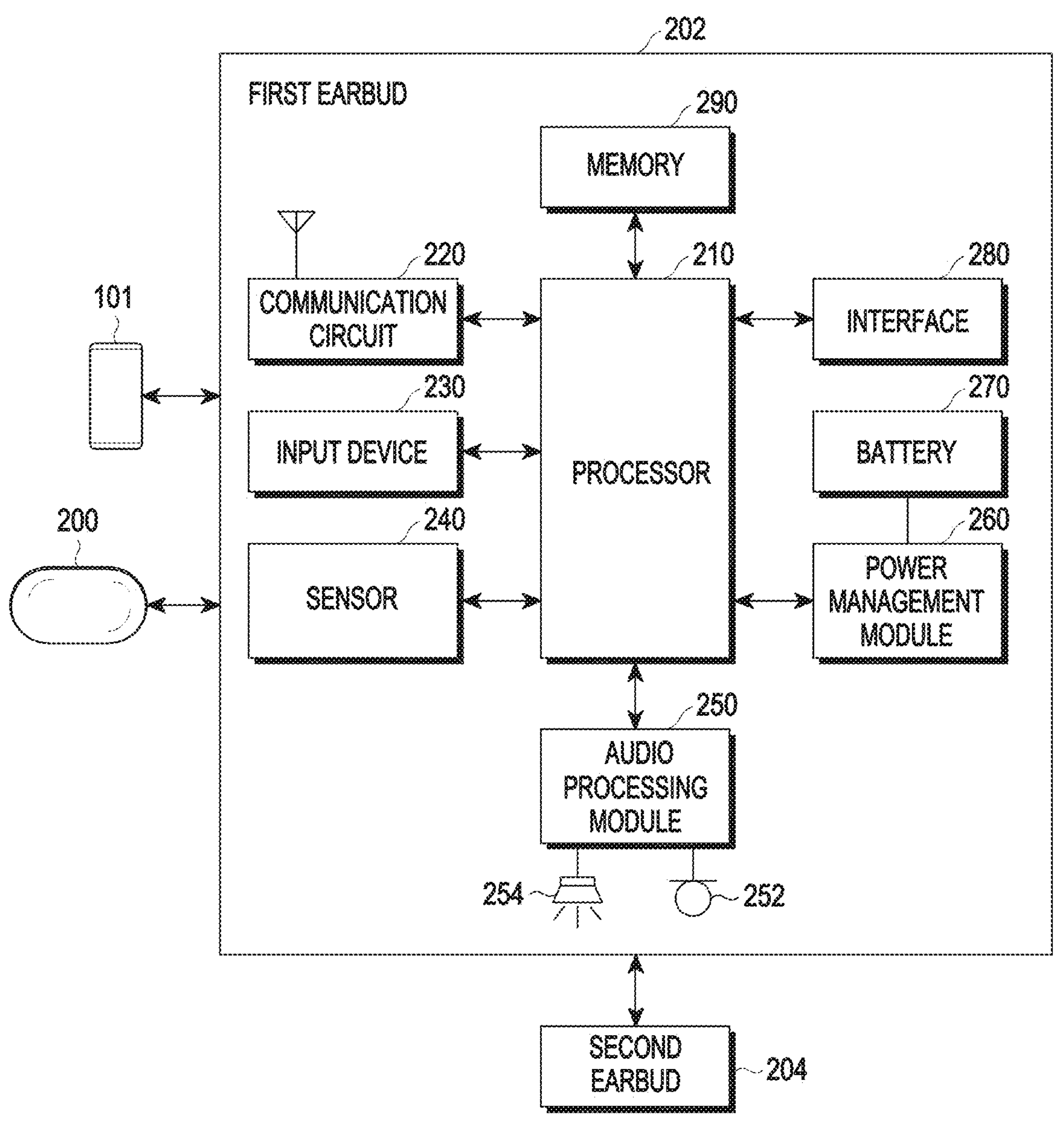
FIG. 2 is a view illustrating an example of connection of electronic devices based on Bluetooth according to an example embodiment.

FIG. 2 is a view illustrating an example of connection of electronic devices based on Bluetooth according to an embodiment.

Referring to FIG. 2, the user terminal (e.g., the electronic device 101) may be wirelessly connected to wearable devices 202 and 204. The user terminal (e.g., the electronic device 101) may include a smart phone as shown in FIG. 2 but, without limited to those described and/or shown, may be implemented as various types of devices (e.g., notebook computers including standard laptop computers, Ultrabook, netbooks, or tab books, laptop computers, tablet computers, or desktop computers). The user terminal (e.g., the electronic device 101) may be implemented as described above in FIG. 1 and may thus include at least some of the components (e.g., various modules) shown in FIG. 1, and no duplicate description thereof is thus given below.

The wearable devices 202 and 204 may be implemented as wireless earbuds but, without limited to those described and/or shown, may be implemented as various types of devices (e.g., a smart watch, a head-mounted display device, or devices for measuring biometric signals (e.g., heartrate patch)) that may have at least one electrode and a sensor device as described below. According to an embodiment, when the wearable devices 202 and 204 is wireless earbuds, the wearable devices 202 and 204 may include a pair of devices (e.g., the first earbud 202 and the second earbud 204). According to an embodiment, the first earbud 202 and the second earbud 204 may be implemented to include the same or similar components.

According to an embodiment, the electronic device 101 may establish a communication connection with the wearable devices 202 and 204 and transmit and/or receive data to/from each other. For example, the electronic device 101 and the wearable devices 202 and 204 each may use device-to-device (D2D) communication, such as Wi-Fi direct or Bluetooth, (e.g., using a communication circuit configured to support the corresponding communication scheme) to establish a communication connection therebetween but, without limited thereto, may communicate with each other using other various types of communication (e.g., a communication scheme, such as Wi-Fi, using access points (APs), a cellular communication scheme using base stations, or a wired communication scheme).

In an embodiment, the electronic device 101 may establish a communication link with only one (e.g., primary earbud) of the first earbud 202 and the second earbud 204 or establish a communication link with each of the first earbud 202 and the second earbud 204.

In an embodiment, the first earbud 202 and the second earbud 204 may establish a communication connection with each other and transmit and/or receive data (e.g., audio data and/or control data) to/from each other. The communication connection may be established using D2D communication (e.g., using a communication circuit configured to support the corresponding communication), such as Wi-Fi direct or Bluetooth, as described above, but is not limited thereto.

In an embodiment, one of the first earbud 202 and the second earbud 204 becomes the primary device (or main device), and the other becomes the secondary device. The primary device (or main device) may transmit data to the secondary device. For example, when the first earbud 202 and the second earbud 204 establish a communication connection with each other, any one of the first earbud 202 and the second earbud 204 may be randomly selected as the primary device, and the other may be selected as the secondary device. In an embodiment, when the first earbud 202 and the second earbud 204 establish a communication connection therebetween, the device detected as first worn (e.g., when a value indicating wearing is detected by a wearing detection sensor (e.g., a proximity sensor, a touch sensor, a slope 6-axis sensor, or a 9-axis sensor)) may be selected as the primary device, and the other as the secondary device.

In an embodiment, the primary device may transmit data received from the electronic device 101 to the secondary device. For example, the first earbud 202, which is the primary device, may not only output audio to the speaker 254 based on audio data received from the electronic device 101, but also output the audio data to the second earbud 204 which is the secondary device. In an embodiment, the secondary device may receive, through sniffing, the audio data transmitted from the electronic device 101 to the primary device, based on connection information provided from the primary device.

In an embodiment, the first earbud 202, as the primary device, may transmit the data (e.g., audio data or control data), received from the second earbud 204, as the secondary device, to the electronic device 101. For example, when a touch event occurs in the second earbud 204 which is the secondary device, control data including information about the event may be transmitted to the electronic device 101 by the first earbud 202 which is the primary device. However, without limited to those described, the secondary device and the electronic device 101 may establish a communication connection therebetween as described above, so that the secondary device and the electronic device 101 may directly perform transmission and/or reception of data therebetween.

In an embodiment, the first earbud 202 may include the same or similar components to at least one of the components (e.g., modules) of the electronic device 101 illustrated in FIG. 1. The first earbud 202 may include a communication circuit 220 (e.g., the communication module 190 of FIG. 1, comprising communication circuitry), an input device 230 (e.g., the input module 150 of FIG. 1 including input circuitry), a sensor 240 (e.g., the sensor module 176 of FIG. 1), an audio processing module 250 (e.g., the audio module 170 of FIG. 1), a memory 290 (e.g., the memory 130 of FIG. 1), a power management module 260 (e.g., the power management module 188 of FIG. 1 comprising circuitry), a battery 270 (e.g., the battery 189 of FIG. 1), an interface 280 (e.g., the interface 177 of FIG. 1), and a processor 210 (e.g., the processor 120 of FIG. 1 comprising processing circuitry).

According to an embodiment, the communication circuit 220 may include at least one of a wireless communication module (e.g., a Bluetooth communication module, a cellular communication module, a wireless-fidelity (Wi-Fi) communication module, a near-field communication (NFC) communication module, or a global navigation satellite system (GNSS) communication module) or a wired communication module (e.g., a local area network (LAN) communication module or a power line communication (PLC) communication module).

The communication circuit 220 may directly or indirectly communicate with at least one of the electronic device (e.g., a smartphone), the electronic device 200 (e.g., a charging device, such as a cradle), or the second earbud 204 (e.g., the slave earbud) through a first network (e.g., the first network 198 of FIG. 1), using at least one communication module. The second earbud 204 may be configured in pair with the first earbud 202. The communication module 220, comprising communication circuitry, may include one or more communication processors that are operable independently from the processor 210 and supports wired or wireless communication.

According to an embodiment, the communication circuit 220 may be connected, directly or indirectly, to one or more antennas for transmitting signals or information to another electronic device (e.g., at least one of the electronic device 101, the electronic device 200, or the second earbud 204) or receiving signals or information from the other electronic device. According to an embodiment, at least one antenna appropriate for a communication scheme used in a communication network, such as the first network (e.g., the first network 198 of FIG. 1) or the second network (e.g., the second network 199 of FIG. 2), may be selected from the plurality of antennas by, e.g., the communication circuit 220. The signal or information may then be transmitted or received between the communication circuit 220 and another electronic device via the selected at least one antenna.

According to an embodiment, the input device 230 may be configured to generate various input signals that may be used for operation of the first earbud 202. The input device 230 may include at least one of a touch pad, a touch panel, or a button.

According to an embodiment, the input device 230 may generate a user input regarding the turn-on/off of the first earbud 202. According to an embodiment, the input device 230 may receive a user input for a communication connection between the first earbud 202 and the second earbud 204. According to an embodiment, the input device 230 may receive a user input associated with audio data (or audio content). For example, the user input may be associated with functions of starting playback of audio data, pausing playback, stopping playback, adjusting playback speed, adjusting playback volume, or muting.

According to an embodiment, the sensor 240 may measure or identify the position or operational state of the first earbud 202. The sensor 240 may convert measured or identified information into an electric signal. The sensor 240 may include at least one of, e.g., a magnetic sensor, an acceleration sensor, a gyro sensor, a geomagnetic sensor, a proximity sensor, a gesture sensor, a grip sensor, a biometric sensor, or an optical sensor.

According to an embodiment, the processor 210 may detect data (e.g., audio data) from the data packet received from the electronic device 101 and may process the detected data through the audio processing module 250 and output it to the speaker 254. The audio processing module 250 may support an audio data gathering function and reproduce the gathered audio data.

According to an embodiment, the audio processing module 250 may include an audio decoder (not shown) and a D/A converter (not shown). The audio decoder may convert audio data stored in the memory 290 or received from the electronic device 101 through the communication circuit 220 into a digital audio signal. The D/A converter may convert the digital audio signal converted by the audio decoder into an analog audio signal. According to an embodiment, the audio decoder may convert audio data received from the electronic device 101 through the communication circuit 220 and stored in the memory 290 into a digital audio signal. The speaker 254 may output the analog audio signal converted by the D/A converter.

According to an embodiment, the audio processing module 250 may include an A/D converter (not shown). The A/D converter may convert the analog audio signal transferred through the microphone 252 (hereinafter, referred to as a mic) into a digital voice signal. The mic 252 may include at least one air conduction microphone and/or at least one bone conduction microphone for detecting voice and/or sound.

According to an embodiment, the audio processing module 250 may play various audio data set in the operation of the first earbud 202. For example, the processor 210 may be designed to detect insertion or removal of the first earbud 202 into/from the user's ear through the sensor 240 and reproduce audio data regarding an effect sound or guide sound through the audio processing module 250. The output of the sound effect or guide sound may be omitted according to the user setting or the designer's intention.

The memory 290 may store various data used by at least one component (e.g., the processor 210 or the sensor 240) of the first earbud 202. The various data may include, for example, software and input data or output data for a command related thereto. The memory 290 may include a volatile memory or a non-volatile memory.

The power management module 260 may manage power supplied to the first earbud 202. According to an embodiment, the power management module 260 may be implemented as at least part of, for example, a power management integrated circuit (PMIC). According to an embodiment, the power management module 260 may include a battery charging module. According to an embodiment, if another electronic device (e.g., one of the electronic device 101, the second earbud 204, or another electronic device) is electrically connected, directly or indirectly, to the first earbud 202 (wirelessly or wiredly), the power management module 260 may receive power from the other electronic device to charge the battery 270.

The battery 270 may supply power to at least one component of the first earbud 202. According to an embodiment, the battery 270 may include, e.g., a rechargeable battery. According to an embodiment, if the first earbud 202 is mounted in the electronic device 200, the first earbud 202 may charge the battery 270 to a designated charge level and then power on the first earbud 202 or turn on at least part of the communication circuit 220.

The interface 280 may support one or more designated protocols that may be used for the first earbud 202 to directly (e.g., wiredly) connect to the electronic device 101, the electronic device 200, the second earbud 204, or another electronic device. According to an embodiment, the interface 280 may include at least one of, e.g., a high definition multimedia interface (HDMI), a USB interface, an SD card interface, a power line communication (PLC) interface, or an audio interface. According to an embodiment, the interface 280 may include at least one connection port for forming a physical connection with the electronic device 200.

The processor 210 may execute, e.g., software to control at least one other component (e.g., a hardware or software component) of the first earbud 202 connected, directly or indirectly, to the processor 210 and may process or compute various data. According to an embodiment, as at least part of the data processing or computation, the processor 210 may load a command or data received from another component (e.g., the sensor 240 or communication circuit 220) onto a volatile memory 290, process the command or the data stored in the volatile memory 290, and store resulting data in a non-volatile memory. Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 210 may form a communication connection with the electronic device 101 through the communication circuit 220 and receive data (e.g., audio data) from the electronic device 101 through the formed communication connection. According to an embodiment, the processor 210 may transmit the data, received from the electronic device 101 through the communication circuit 220, to the second earbud 204. According to an embodiment, the processor 210 may perform the operations of the first earbud 202 which are to be described below.

The first earbud 202 may further include various modules depending on the form in which it is provided. There are many variations according to the convergence trend of digital devices, so it is not possible to list them all, but components equivalent to the above-mentioned components may be further included in the first earbud 202. Further, it is apparent that in the first earbud 202 according to an embodiment, specific components may be excluded from the above components or replaced with other components according to the form in which it is provided. This will be easily understood by those of ordinary skill in the art.

The second earbud 204 configured in pair with the first earbud 202 may include the same or similar components to those included in the first earbud 202 and may perform all or some of the operations of the first earbud 202 described below in connection with the drawings.

Figure 3:
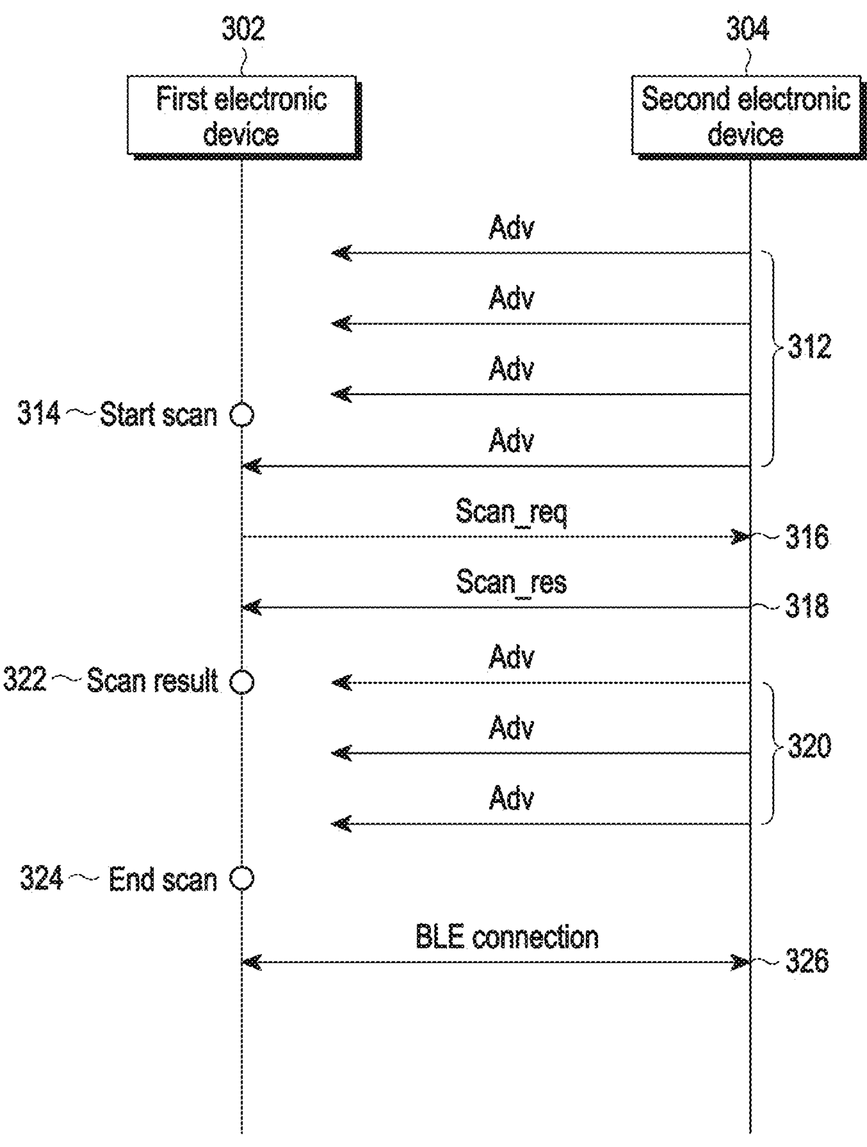
FIG. 3 is a view illustrating a Bluetooth LE (BLE) scan operation according to an example embodiment.

FIG. 3 is a view illustrating a Bluetooth LE (BLE) scan operation according to an embodiment.

Referring to FIG. 3, in operation 314, the electronic device 302 (e.g., the electronic device 101) may start to perform a scan operation for search for a nearby Bluetooth device based on BLE.

In operation 312, the second electronic device 304 (e.g., the first earbud 202 or the second earbud 204 of FIG. 2) may periodically transmit the advertising packet "adv" so as to be discovered by the peripheral Bluetooth device based on BLE. In an embodiment, the advertising packet may include advertising data, and the advertising data may provide information related to connection or pairing with the second electronic device 304 to an unspecified peripheral electronic device. In an embodiment, the second electronic device 304 may start an operation of transmitting an advertising packet in response to, e.g., a pairing request from the user. In an embodiment, the second electronic device 304 may be stored in a cradle device (e.g., the device 200), and when the cradle device is opened while being stored in the cradle device, the second electronic device 304 may start transmitting an advertising packet.

In an embodiment, the advertising packet may include at least one of identification information about the second electronic device 304, user account information, information about whether the second electronic device 304 is paired with another electronic device, a list of devices previously paired with the second electronic device 304, information about devices capable of being paired at the same time, transmission power, a detection area, or information about a remaining battery capacity.

In an embodiment, the second electronic device 304 may transmit the advertising packet according to a designated condition. In an embodiment, when power is supplied, the second electronic device 304 may start transmission of the advertising packet based on at least one of a designated time period or a user input. "Based on" as used herein covers based at least on.

In operation 316, the first electronic device 302 may receive at least one of the advertising packets from the second electronic device 304 and may transmit a scan request packet ("Scan_req") corresponding to the received advertising packet to the second electronic device 304. In operation 318, the second electronic device 304 may transmit a scan response packet ("Scan_rsp") corresponding to the scan request packet to the first electronic device 302. In an embodiment, while and after the scan request packet of operation 316 and the scan response packet of operation 318 are exchanged, in operation 320, the second electronic device 304 may continuously and periodically transmit the advertising packet.

In operation 322, the first electronic device 302 may generate a scan result (e.g., including a received signal strength indicator (RSSI)) according to reception of the scan response packet. Optionally, the first electronic device 302 may end the scan operation in operation 324. In operation 326, the first electronic device 302 may establish a BLE communication link with the first electronic device 304. In an embodiment, operation 326 may include transmitting the CONNECT_IND 404 to the first packet 410 of FIG. 4.

The Bluetooth LE electronic device may support various physical layer transmission schemes (hereinafter, referred to as PHY) such as LE 1M (1 mega-symbol per second), LE 2M (2 mega-symbol per second), Coded PHY with S=2, and Coded PHY with S=8 to communicate data with a peer device. Here, 1M or 2M may indicate the symbol rate. Here, the parameter S may indicate the number of symbols representing each bit. Further, a PHY (hereinafter referred to as LE HR) for a high rate (HR) for the purpose of higher data throughput may be supported by Bluetooth LE.

While LE 2M may send a large amount of data compared to other PHY methods, it is relatively vulnerable to wireless interference and has a disadvantage of a relatively short physical communication distance. Coded with S=8 may not send a large amount of data compared to other PHY methods, but it is relatively high resistant to wireless interference and has a relatively long physical communication distance.

When the electronic device performs data communication with the peer electronic device using the Bluetooth LE scheme and uses the most efficient PHY, it is possible to increase the communication success rate, minimize or reducing current consumption, and secure link efficiency. However, in Bluetooth LE, unlike Bluetooth legacy, when the electronic device transmitting data unilaterally changes the PHY, the peer electronic device may not be able to receive the data, and thus normal communication may not be possible.

In the case of Bluetooth legacy, because all packets using different packet types have the same preamble and header format, even if the electronic device transmits the packet using any of the packet types in Bluetooth legacy, the electronic device may receive and understand the packet. On the other hand, because preambles of packets in Bluetooth LE are different for PHY schemes (e.g., LE 1M, LE 2M, and Coded PHY), when the electronic device unilaterally changes the PHY to transmit the packet, the peer electronic device may not normally understand the packet.

When the PHY is to be changed, the electronic device and the peer electronic device need an additional operation of identifying whether the PHY is changeable and determining a time when the PHY is to be changed, using messages (e.g., LL PHY UPDATE messages) of the link layer (LL). Accordingly, a significant time latency may occur for the PHY change. For this reason, the PHY change through the messages of the link layer may be very inefficient when the surrounding wireless environment changes every very short time.

When connected isochronous stream (CIS) is used to support an audio service through audio over Bluetooth LE (AoBLE), it is impossible for the electronic device to change the PHY set when the CIS is generated. Therefore, the electronic device that wants to change the PHY has to terminate the currently set CIS and regenerate a CIS having a new PHY.

As described above, in the communication using Bluetooth LE, it is difficult to change the set PHY in real time, and it takes time to change. Thus, it is impossible to respond in real time to a sudden change in the surrounding environment. For example, when entering a weak electric field state during audio data communication through LE 2M, the electronic device may not change the PHY for the currently set CIS from the existing LE 2M to Coded with S=8, which guarantees stable communication in the weak electric field state. Since LE 2M may not support stable communication in the weak electric field state, this may lead to poor audio quality or disconnection.

The BLE communication link may include a plurality of physical channels, e.g., an LE piconet physical channel, an LE advertising physical channel, an advertising periodic physical channel, and an LE isochronous physical channel, which may be optimized and used for their different purposes. The LE piconet physical channel may be used for communication between the connected devices and be connected to a specific piconet. The LE advertising physical channel may be used to broadcast advertising (advertisements) to the Bluetooth device. The advertising may be used to discover user data, connect, or send user data to the peer electronic device. The advertising periodical physical channel may be used to transmit user data to the peer electronic device 101 at specific intervals through periodic advertising. The LE isochronous physical channel may be used to transfer isochronous data between Bluetooth devices in an LE piconet, or to transfer isochronous data between unconnected Bluetooth devices.

Figure 4:
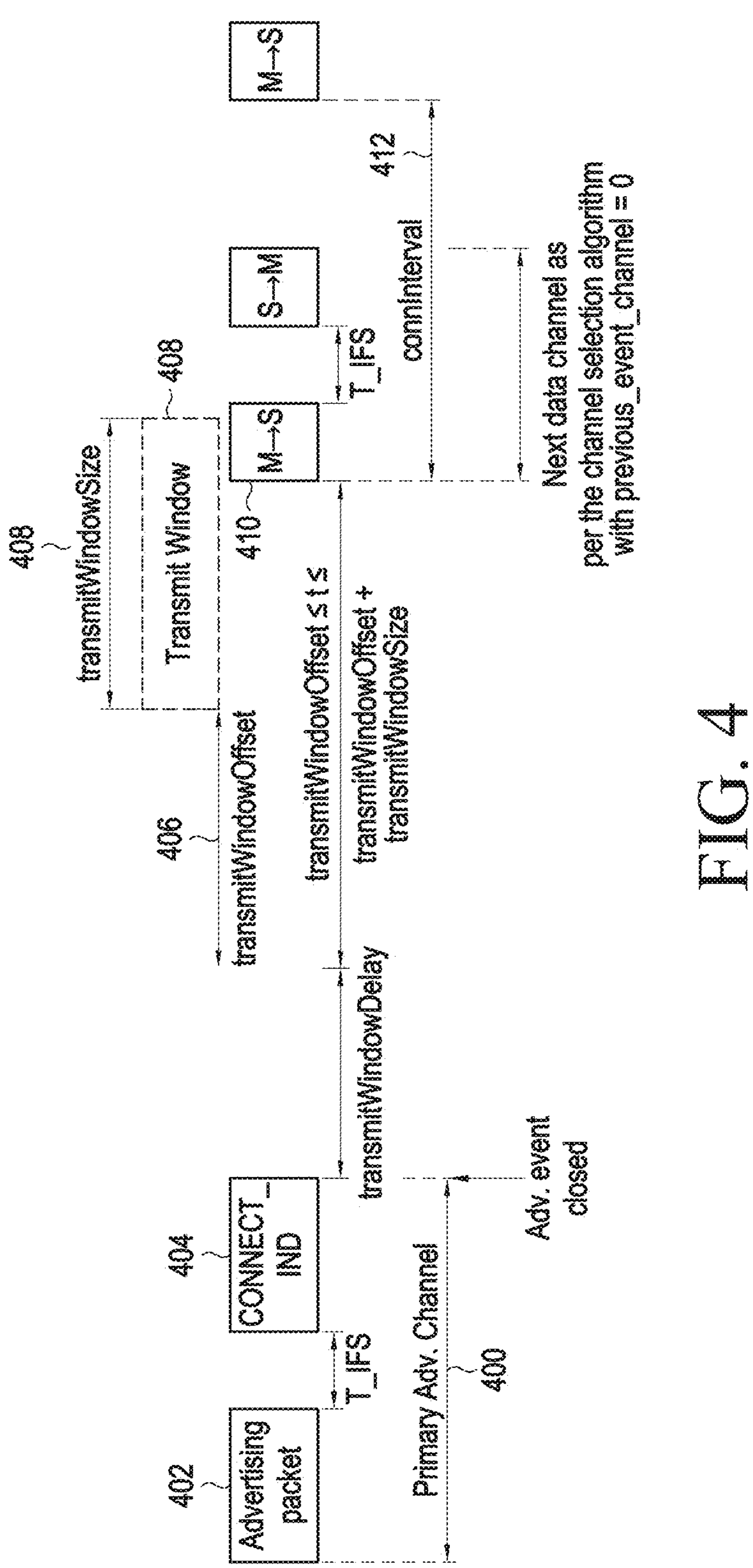
FIG. 4 is a view illustrating an example of BLE communication connection according to an example embodiment.

FIG. 4 is a view illustrating an example of BLE communication connection according to an embodiment.

Referring to FIG. 4, the primary advertising channel 400 may be used to transmit an advertising packet 402 and a connection indication (CONNECT_IND) packet 404. A time for inter frame space (T_IFS) may exist between the advertising packet 402 and the connection indication message 404. The advertising event may be terminated by the connection indication (CONNECT_IND) message 404. After the connection indication (CONNECT_IND) message 404, the connection of the link layer may be set up.

When generating a communication link with the peer electronic device 101, a Bluetooth device (e.g., the first electronic device 302 or the second electronic device 304) may set a connection interval (connInterval) 412 that indicates a communication period and perform communication at each connection interval 412. In an embodiment, upon receiving the advertising packet 402 broadcast from the second electronic device 304 on the primary advertising channel 400, the first electronic device 302 may transfer a CONNECT_IND message 404 to the second electronic device 304 to request a BLE connection.

The second electronic device 304 receiving the CONNECT_IND message 404 may operate as a slave role (or referred to as a peripheral device), calculate the start point of the connection interval 412 based on the parameters, e.g., transmitWindowOffset 406 and transmitWindowSize 408, transferred through the CONNECT_IND message 404 by the first electronic device 302 operating as the master role (or referred to as a central device), and prepare to receive the first packet 410 to be transferred from the first electronic device 302 in the master-to-slave (M-S) time range (including, e.g., at least one slot) in the connection interval 412. If the first packet 410 is received, an anchor point (AP) indicating the start point of the next connection interval from the time of reception of the first packet 410 may be calculated.

Figure 5:
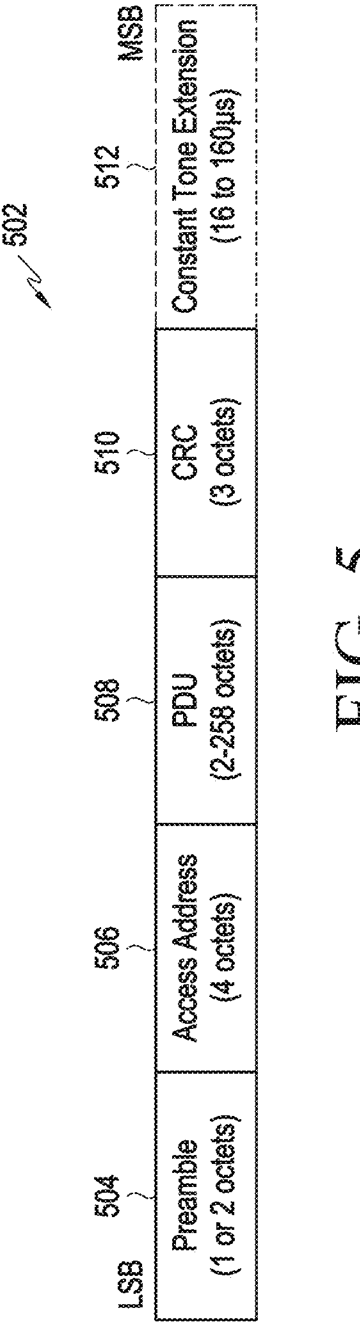
FIG. 5 is a view illustrating an LE Un coded PHY packet format according to an example embodiment.

FIG. 5 is a view illustrating an LE Uncoded PHY packet format according to an embodiment.

Referring to FIG. 5, a LE Uncoded PHY packet 502 for supporting two packet types of LE 1M and LE 2M may include essential fields such as a 1- or 2-byte/octet preamble 504, a 4-byte/octet access address 506, a 2- to 258-byte/octet protocol data unit (PDU) 508, and a 3-byte/octet cyclic redundancy check code (CRC) 510, as mandatory fields, and a constant tone extension (CTE) field 512 as an optional field.

The preamble 504 may be configured of 1 byte for the LE 1M PHY and may be configured of 2 bytes for the LE 2M PHY. One packet 502 may be transmitted at the same symbol rate as 1 Msym/s for the LE 1M PHY and 2 Msym/s for the LE 2M PHY.

Figure 6:
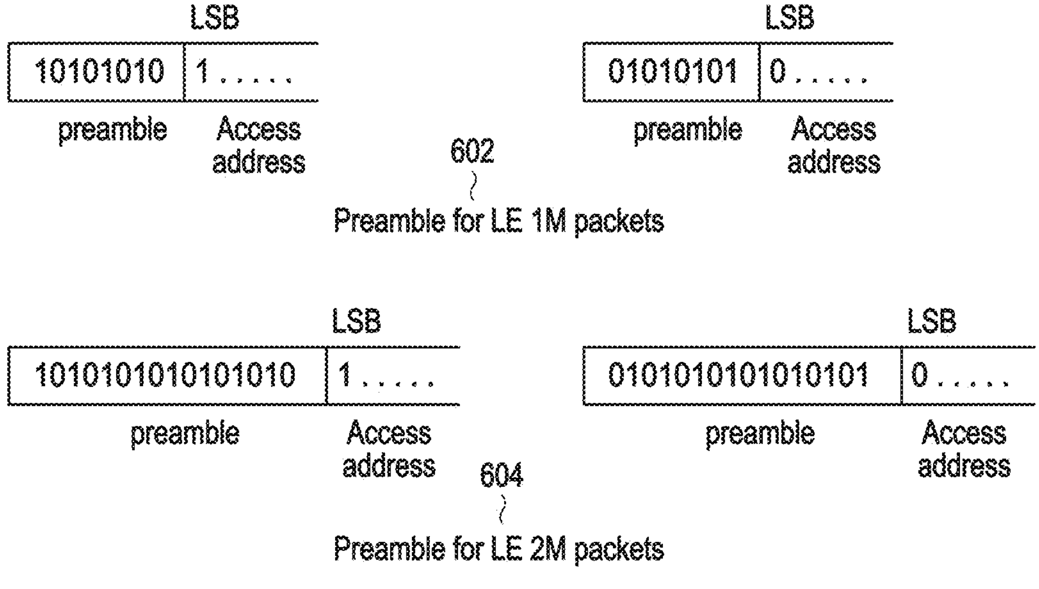
FIG. 6 is a view illustrating a preamble for an LE Uncoded PHY packet according to an example embodiment.

FIG. 6 is a view illustrating a preamble for an LE Uncoded PHY packet according to an embodiment.

Referring to FIG. 6, a preamble (e.g., the preamble 504) may be used to perform operations such as frequency synchronization, symbol timing estimation, and automatic gain control training. The preamble 602 included in the packet using the LE 1M PHY may be configured of 8 bits, and the preamble 604 included in the packet using the LE 2M PHY may be configured of 16 bits.

Figure 7:
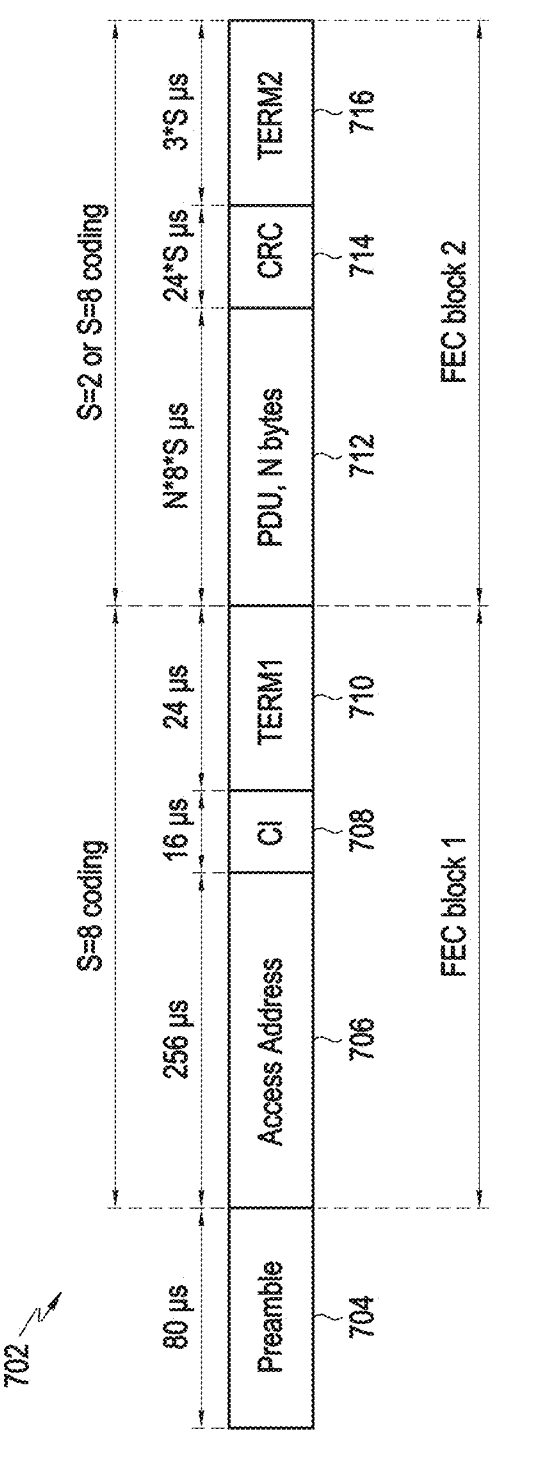
FIG. 7 is a view illustrating an LE Coded PHY packet format according to an example embodiment.

FIG. 7 is a view illustrating an LE Coded PHY packet format according to an embodiment.

Referring to FIG. 7, the LE Coded PHY packet 702 for supporting the packet type of the LE Coded PHY may be transmitted at a symbol rate of 1 Msym/s like the LE 1M, and may include a preamble 704, an access address 706, a coding indicator (CI) 708, a TERM1 710, an N-byte PDU 712, a CRC 714, and a TERM2 716. The preamble 704 may be transmitted in an uncoded state. For the coded PHY, the preamble 704 may be fixed to 80 symbols obtained by repeating '00111100' 10 times.

Forward error correction (FEC) block 1 may include an access address 706, a CI 708, and a TERM1 710, and may be encoded using an S=8 coding scheme. CI 708 is used to indicate the encoding method used in FEC block 2, and may indicate Coded PHY using S=8 or Coded PHY using S=2 according to the value thereof. FEC block 2 may include a PDU 712, a CRC 714, and a TERM2 716, and a coding scheme thereof may be indicated by the value of the CI 708.

Figure 8:
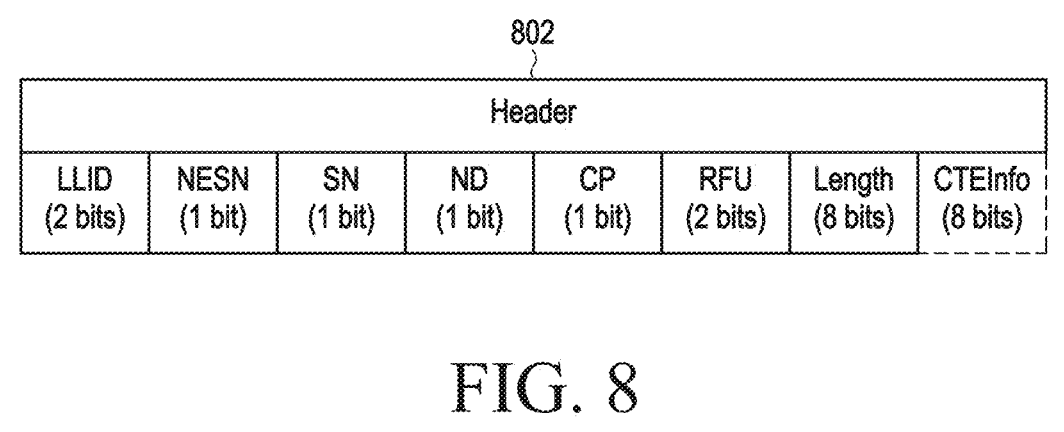

FIG. 8 is a view illustrating a data PDU format that may be included in an LE packet according to an embodiment.

Referring to FIG. 8, a header 802 of a data PDU that may be included in a PDU field 508 or 712 may include a 2-bit link layer ID (LLID) indicating whether the data PDU is an LL data PDU or an LL control PDU, a 1-bit next expected sequence number (NESN), a 1-bit sequence number (SN), a 1-bit more data (MD), a 1-bit CTEInfo presenting (CP), a 2-bit reserved for future use (RFU), an 8-bit length field, and an 8-bit CTEInfo field.

Figure 9:
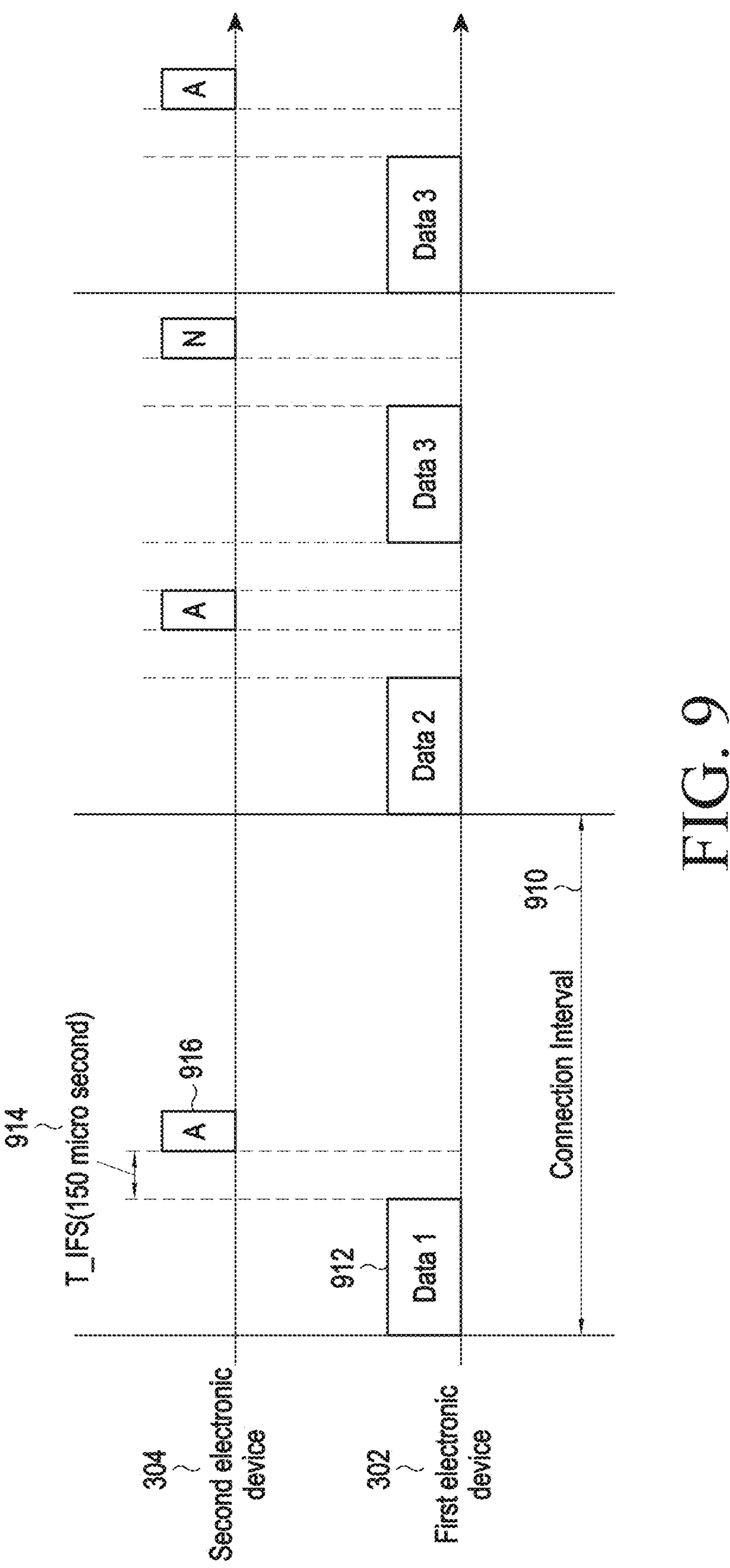
FIG. 9 is a view illustrating an example of data communication using BLE according to an example embodiment.

FIG. 9 is a view illustrating an example of data communication using BLE according to an embodiment.

Referring to FIG. 9, the first electronic device 302 may transmit the data packet 912 in which the value expected to be received is set in the NESN field at the current connection interval 910, and the second electronic device 304 may receive the data packet 912 and after the T_IFS 914, may set the value of +B68 the NESN field in the SN of the response packet 916 and may transmit the same to the first electronic device 302. The first electronic device 302 may determine whether the second electronic device 304 normally receives the data packet 912 based on the SN of the response packet 916. The first electronic device 302 may transmit a data packet within each subsequent connection interval, and the second electronic device 304 may transmit an ACK(A) packet or a NACK(N) packet corresponding to the data packet.

In an embodiment, the first electronic device 302 receiving the NACK(N) packet may retransmit the same data packet at the next connection interval. When the ACK(A) packet is received, the first electronic device 302 may transmit a new data packet at the next connection interval. When the first electronic device 302 intends to transmit one or more data packets within one connection interval, the first electronic device 302 may set a more data (MD) bit in the first data packet. Upon identifying the MD bit in the first data packet, the second electronic device 304 may monitor reception of the data packet from the first electronic device 302 in the next time interval (e.g., the master-slave interval M→S) within the current connection interval.

In an embodiment, the BLE communication link for data communication may include logical links and logical transport capable of communicating data through a physical link using a packet type of a specific physical channel. As an example, an asynchronous connection logical (ACL) transport may be used for reliable bidirectional point-to-point communication in a BLE communication link. When ACL transport is used, the BLE communication link may include an ACL link. The ACL link may be configured of either a control link for control data or a data link for user data.

In an embodiment, electronic devices (e.g., the first electronic device 302 and the second electronic device 304) may support an audio service (AoBLE) through BLE. Data transmission for AoBLE may be supported by a connectionless broadcast isochronous stream (BIS) or a connection-oriented connected isochronous stream (CIS). In an embodiment, the CIS link for AoBLE may be used for an audio service between a plurality of sink electronic devices such as true wireless stereo (TWS) and a source electronic device.

Figure 10:
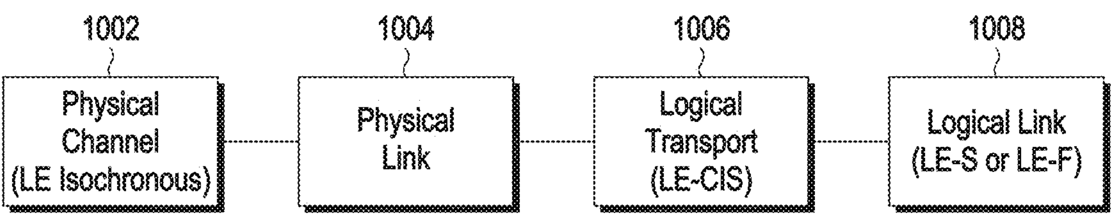
FIG. 10 is a view illustrating data transmission using connection-oriented isochronous communication according to an example embodiment.

FIG. 10 is a view illustrating data transmission using connection-oriented isochronous communication according to an embodiment.

Referring to FIG. 10, a data transmission architecture for connection-oriented isochronous channel data transmission may include a physical channel 1002, a physical link 1004, a logical transport 1006 using LE CIS, and a logical link 1008. The physical channel 1002 may use at least one of various physical layer transmission schemes, e.g., LE 1M, LE 2M, Coded PHY with S=2, Coded PHY with S=8, or LE HR (e.g., LE HR 4M or LE HR 8M) for LE isochronous communication. The logical transport 1006 may provide point-to-point isochronous communication between two connected electronic devices. The logical transport 1006 may transmit isochronous data in any direction between electronic devices, and may transmit data of a variable size as well as a fixed data size.

A flushing time (FT) may be designated for the logical transport 1006. Packets that are not transmitted within the FT on the logical transport 1006 may be discarded. The logical link 1008 may be LE-S (streaming) or LE-F (frame). The LE-S logical link 1008 may be used for streaming data such as audio, and the LE-F may be used for framed data packets.

Figure 11:
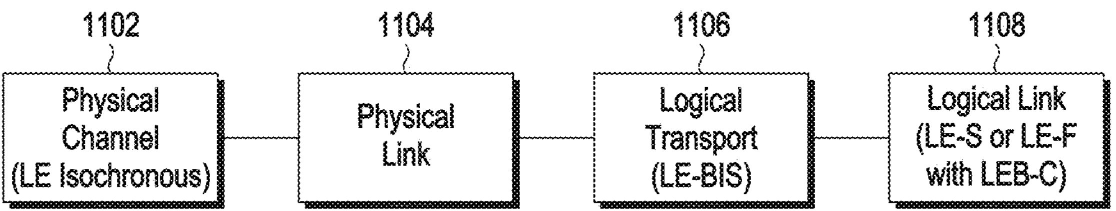
FIG. 11 is a view illustrating data transmission using connectionless isochronous communication according to an example embodiment.

FIG. 11 is a view illustrating data transmission using connectionless isochronous communication according to an embodiment.

Referring to FIG. 11, a data transmission architecture for connectionless isochronous channel data transmission may include a physical channel 1102 for LE isochronous communication, a physical link 1104, a logical transport 1106 using LE BIS, and a logical link 1108. The LE-S or LE-F logical link 1108 on the LE isochronous physical channel 1102 may be used for user data and may be used together with a broadcast control (LBB-C) logical link that may be used for control requirements such as communication of a channel map update.

Figure 12:
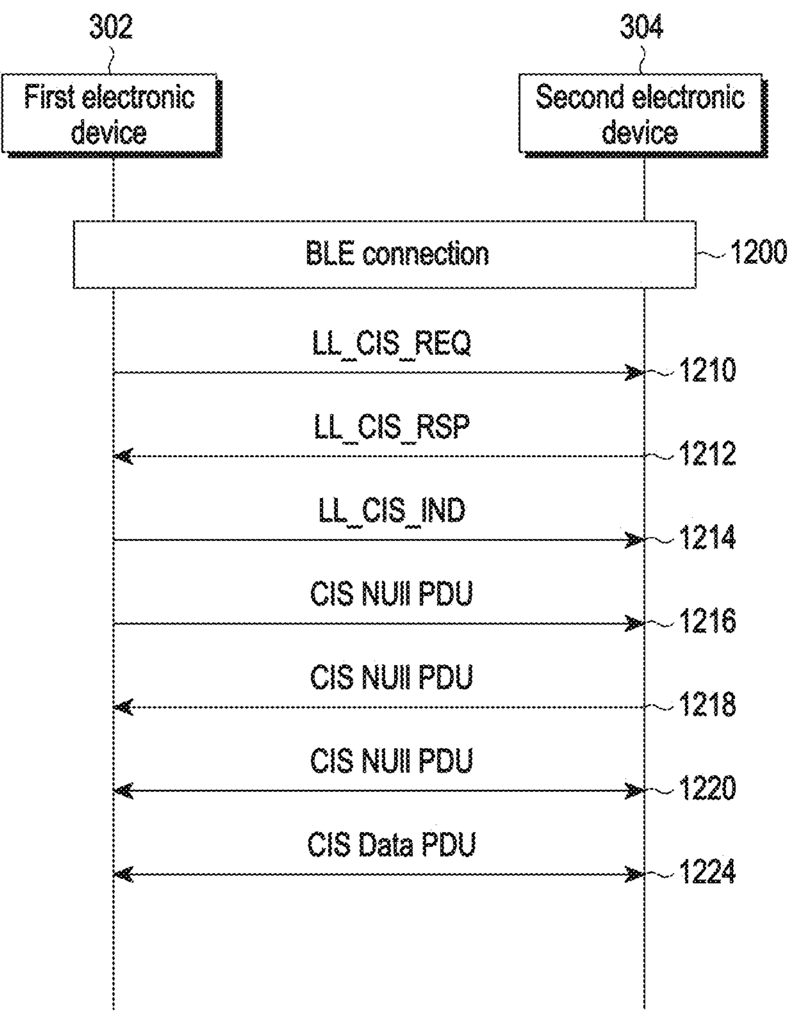
FIG. 12 is a signal flowchart illustrating an example of an operation procedure for CIS establishment according to an example embodiment.

FIG. 12 is a signal flowchart illustrating an example of an operation procedure for CIS establishment according to an embodiment.

Referring to FIG. 12, in operation 1200, an electronic device (e.g., a CIS source electronic device or the first electronic device 302) may have a connection (e.g., a BLE communication link) with a peer electronic device (e.g., a CIS sink electronic device or the second electronic device 304). In operation 1210, the first electronic device 302 may transmit an LL_CIS_REQ message including control data for establishing a CIS with the second electronic device 304. When the LL_CIS_RSP message is received from the second electronic device 304 in operation 1212, the first electronic device 302 may transmit the LL_CIS_IND message in operation 1214.

In operations 1216, 1218, and 1220, the first electronic device 302 and the second electronic device 304 may identify establishment of a CIS link by exchanging CIS null PDUs. In operation 1224, the first electronic device 302 and the second electronic device 304 may communicate CIS data PDUs via the CIS link.

In BLE, CIS may indicate logical transmission capable of transmitting isochronous data in any direction between the electronic devices that have created a communication link. The CIS is capable of transmitting data in a variable size as well as a fixed data size, and may be used for both framed data and unframed data. For each CIS, a schedule of time slots known as events and subevents may be set. The CIS may be capable of adjusting a data rate by transmitting a variable size packet and one or more packets in each isochronous event. Data traffic on the CIS link may be transmitted unidirectionally or bidirectionally between devices and may include an acknowledgment (ACK) protocol for enhancing reliability of packet transmission.

Figure 13:
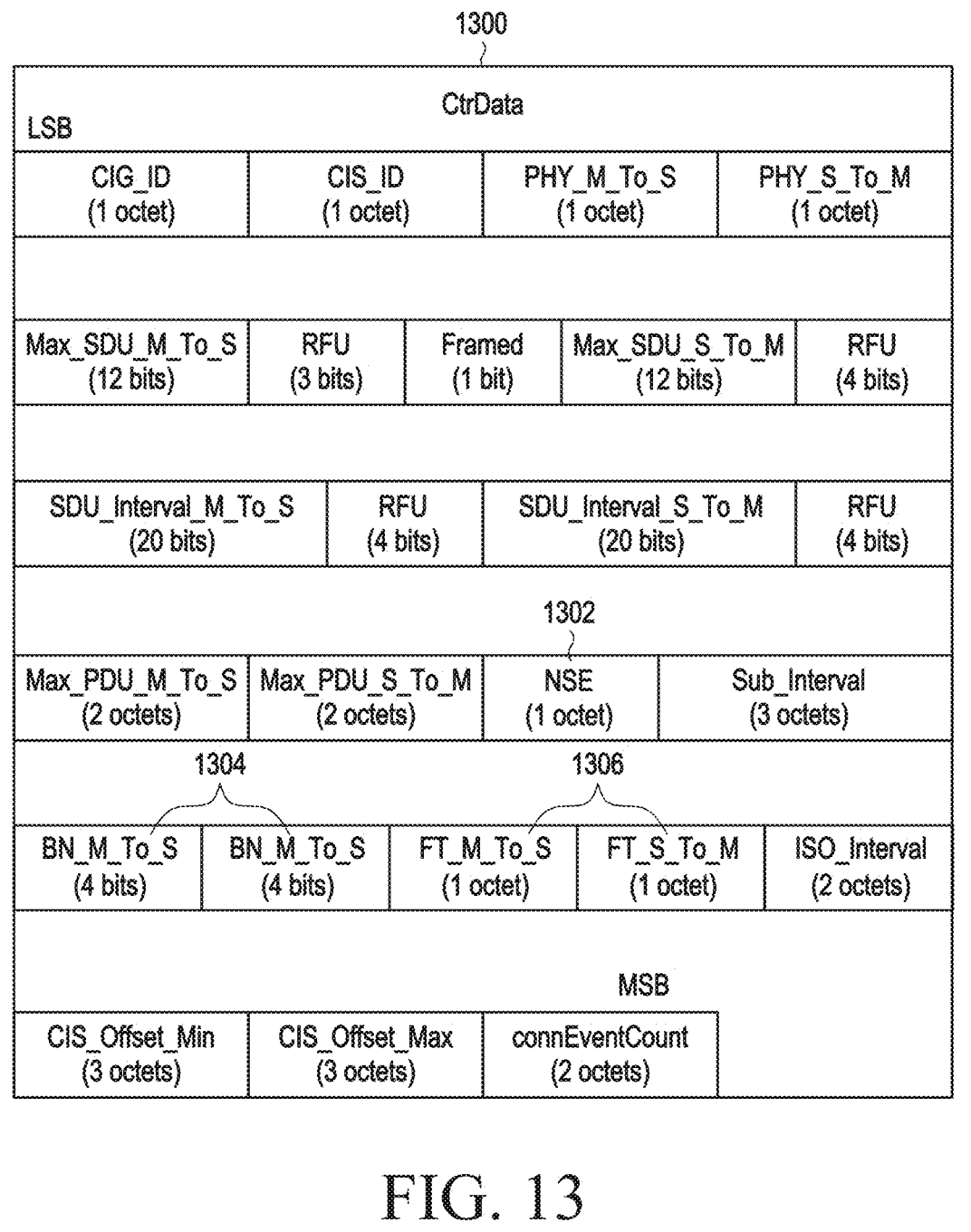

FIG. 13 is a view illustrating an example of control data set for a CIS link according to an embodiment.

Referring to FIG. 13, the parameters used in the CIS link may be provided to the peer electronic device through the control data 1300 included in the LL_CIS_REQ of operation 1210. In an embodiment, the first electronic device 302 playing a master role may allocate a CIS_ID for the CIS link, and the CIS_ID may be shared with the second electronic device 304 playing a slave role through the link layer message (e.g., LL_CIS_REQ).

In an embodiment, the control data 1300 may include CIG_ID for identifying a CIS group (CIG), CIS_ID for identifying a CIS, parameters (including PHY_M_To_S and PHY_S_To_M) indicating a master-slave PHY, Max_SDU parameters (including Max_SDU_M_To_S and Max_SDU_S_To_M) indicating the maximum size of the service data unit (SDU), SDU_Interval parameters (SDU_Interval_M_to_S and SDU_Interval_S_to_M), Max_PDU parameters (including Max_PDU_M_To_S and Max_PDU_S_To_M) indicating the maximum size of the PDU, ISO_Interval, Sub_Interval parameters (including Sub_Interval_M_To_S and Sub_Interval_S_To_M), number of subevent (NSE) 1302, burst number (BN) parameters 1304 (including BN_M_To_S and BN_S_To_M), flushing time (FT) parameters 1306 (including FT_M_To_S and FT_S_To_M), a Framed field, at least one reserved for future use (RFU), CIS offset parameters (CIS_Offset_Min and CIS_Offset_Max), or connEventCount. The parameters set by the control data 1300 may be applied to audio data transmission on the CIS link.

PHY_M_To_S and PHY_S_To_M may indicate a PHY used for data transmission in a master-slave direction and a PHY used for data transmission in a slave-master direction, respectively. PHYs indicated by PHY_M_To_S and PHY_S_To_M may be used on the CIS link before application of the PHY change policy according to embodiments described below begins.

ISO_Interval may indicate a regular time interval between two contiguous CIS anchor points. One CIS event may occur within one ISO interval. Sub_Interval may indicate the time interval between two contiguous subevents within one CIS event. Max_PDU may indicate the maximum size of the CIS data PDU. Max_SDU may indicate the maximum size of the SDU on the CIS. The NSE parameter 1302 may indicate the maximum number of subevents in each CIS event. The BN parameter 1304 may indicate the number of packets that may be transmitted without ACK/NACK. The NSE parameter 1302 may be the larger value of BN_M_To_S and BN_S_To_M and may be set up to 31. The FT parameter 1306 may indicate the maximum number of CIS events in which the CIS data PDU may be transmitted (or retransmitted) and may have a value from 1 to 255.

Figure 14:
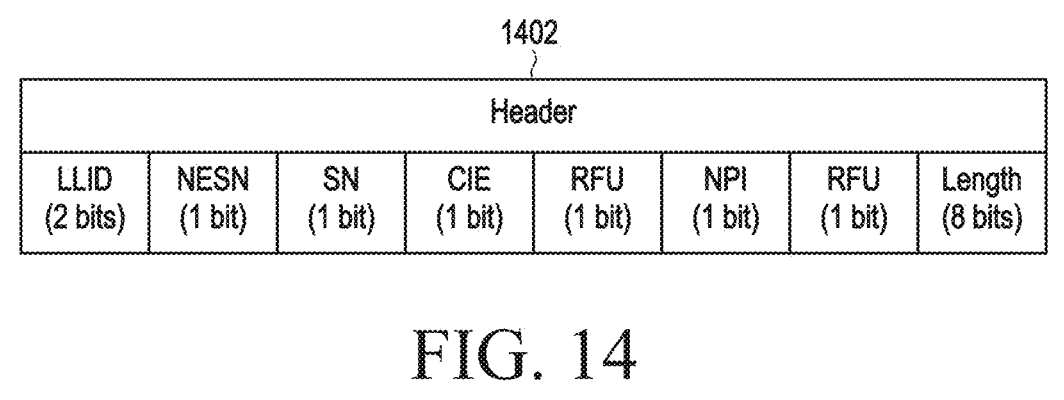

FIG. 14 is a view illustrating a CIS header format used for AoBLE according to an embodiment.

Referring to FIG. 14, the header 1402 of the CIS PDU may include at least one of LLID indicating whether the CIS data is unframed CIS data or framed CIS, NESN, SN, a close isochronous event (CIE) indicating whether the CIS event terminates early, null PDU indicator (NPI) indicating whether the CIS PDU is CIS data PDU or CIS null PDU, at least one RFU, or length field.

Figure 15:
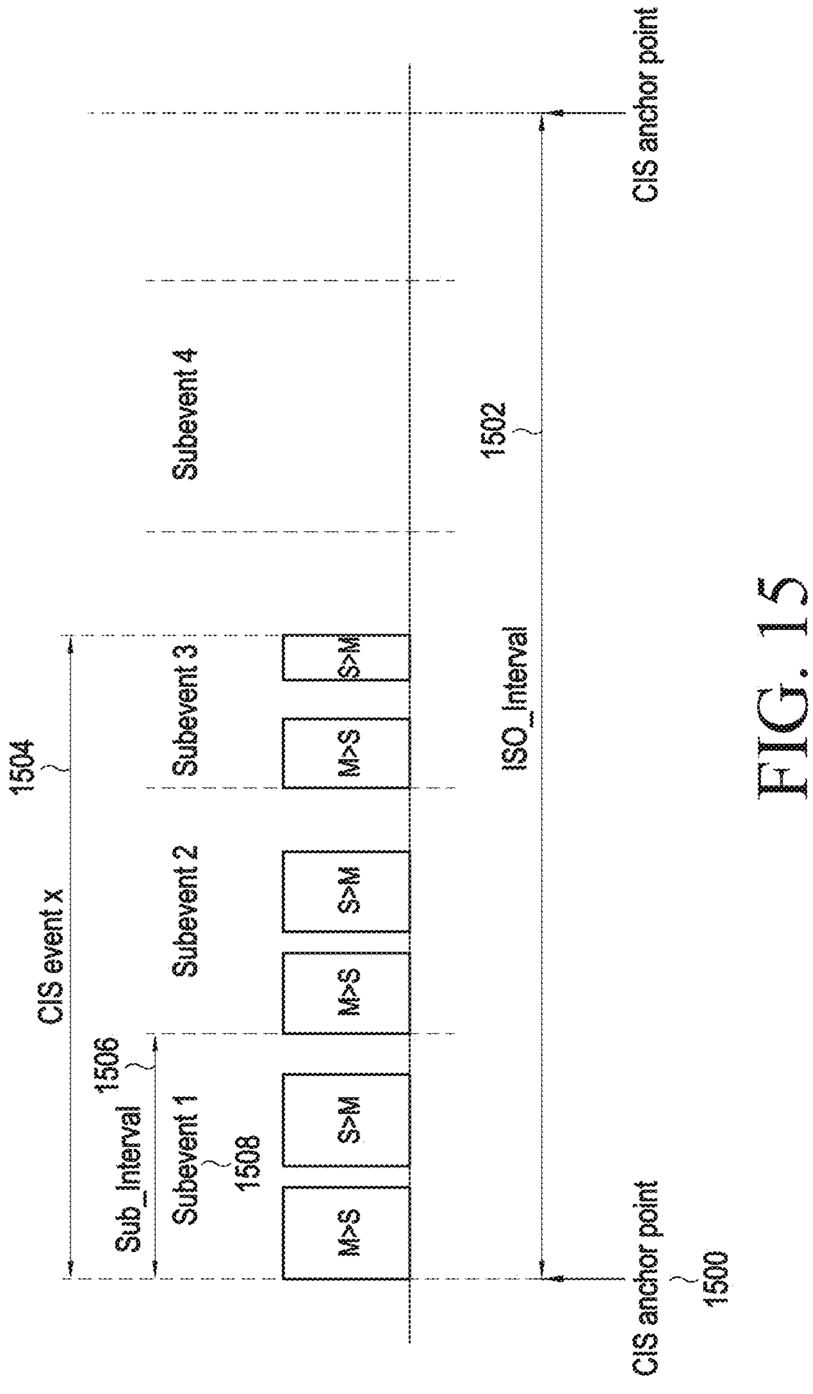
FIG. 15 is a view illustrating an example of a CIS event according to an example embodiment.

FIG. 15 is a view illustrating an example of a CIS event according to an embodiment.

Referring to FIG. 15, at least one CIS event (e.g., CIS event x 1504) may be included in the ISO_interval 1502 for CIS link. The CIS event x 1504 may indicate an occasion where the master device and the slave device may exchange CIS PDUs and may occur at regular intervals, and may include up to NSE subevents (e.g., including subevent 1 1508). For example, since NSE=4, up to four subevents may exist, and it is herein illustrated that three subevents occur. Each CIS event (e.g., CIS event x 1504) may start at the CIS anchor point 1500 until CIS is terminated, and a uniform spacing of the ISO_Interval 1502 may be present between two contiguous CIS anchor points.

Each CIS event (e.g., CIS event x 1504) may be divided into one or more subevents (including, e.g., subevent 1 1508). In one subevent 1 1508, there may be data transmission ("M→S") from the master device to the slave device and data transmission ("S→M") from the slave device to the master device. The spacing of the Sub_Interval 1506 may be present between two contiguous subevents in CIS event x 1504.

The CIG is a bundle of CISs providing the same service. The CIG may include one or more CISs. Several CISs in the CIG may have a common timing reference with respect to the timing of the master device and be synchronized in time units. The CIG may have a temporal relation in the application. In one CIG, CISs may have the same ISO_Interval, and up to 31 CISs may be included in one CIG. The master device may allocate a CIG_ID and share the CIG_ID with the slave device through an LL message.

The CISs in each CIG may be arranged in a sequential or interleaved manner depending on the interval between CIS anchor points and the Sub_Interval.

Figure 16:
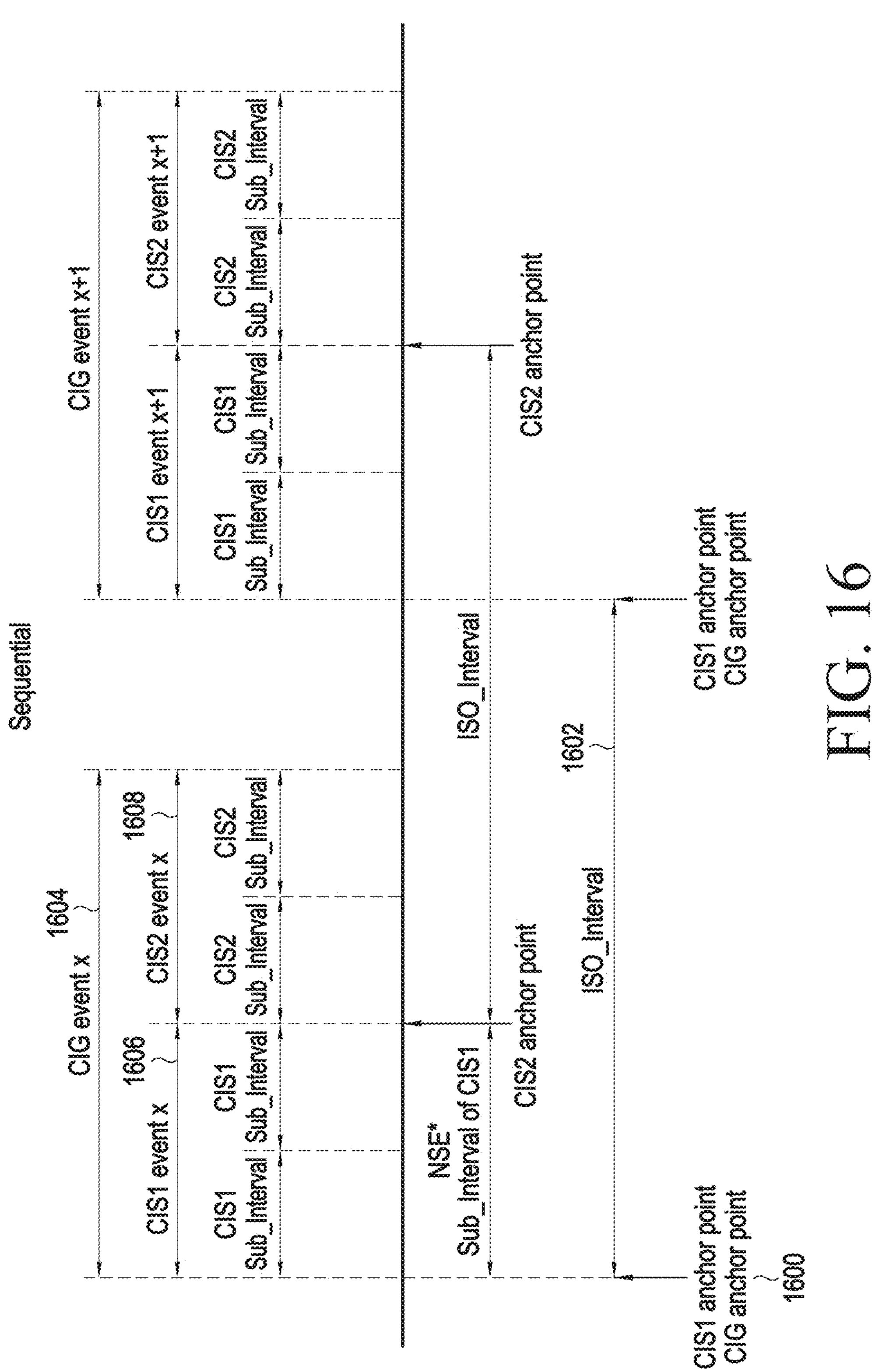
FIG. 16 is a view illustrating CISs in a sequential scheme according to an example embodiment.

FIG. 16 is a view illustrating CISs in a sequential scheme according to an embodiment.

Referring to FIG. 16, the ISO_Interval 1602 may start at the CIS1 anchor point 1600 overlapping the CIG anchor point and may include CIG events (e.g., CIG event x 1604). CIS2 event x 1608 in CIG event x 1604 may occur immediately after CIS1 event x 1606.

Figure 17:
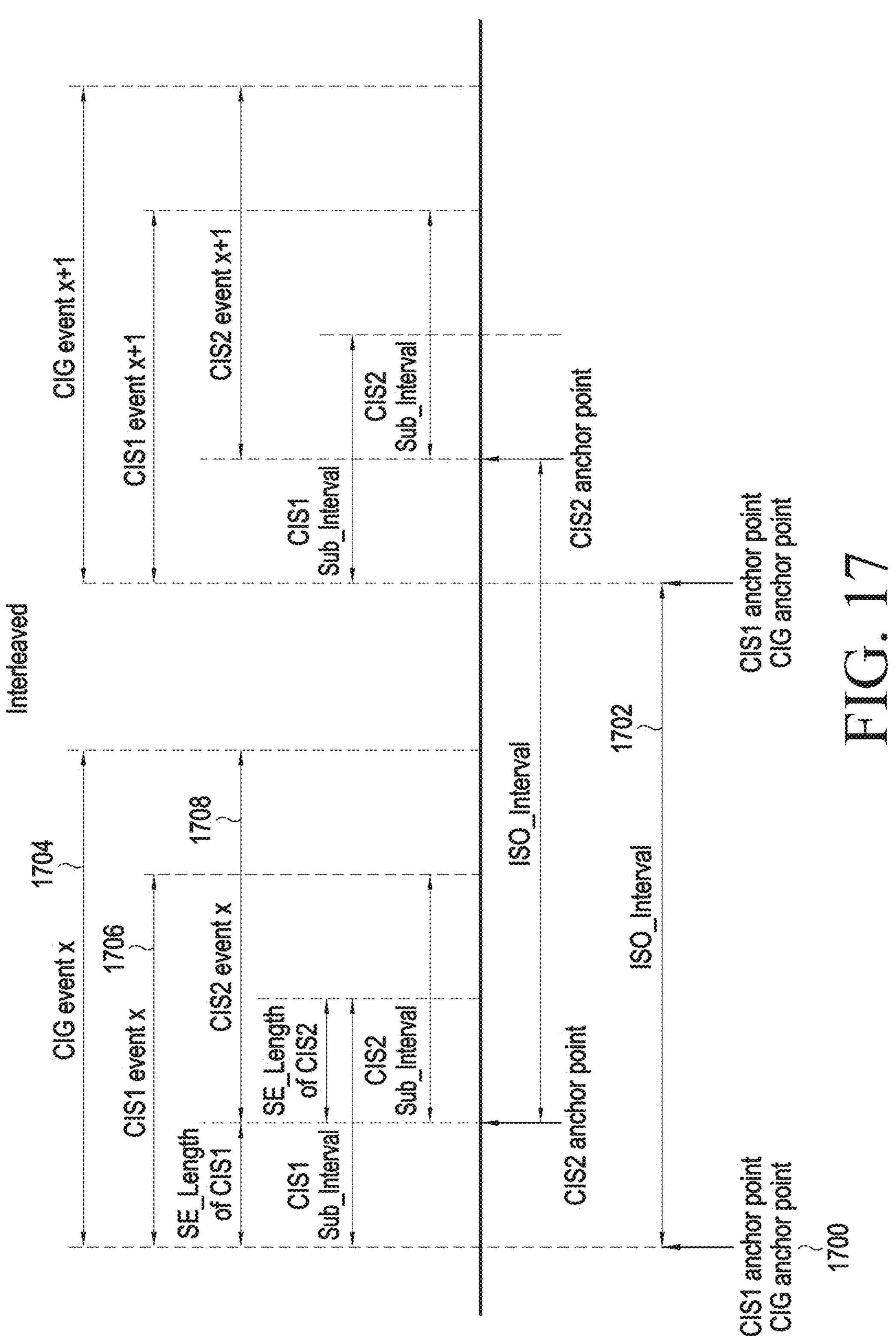
FIG. 17 is a view illustrating CISs in an interleaved scheme according to an example embodiment.

FIG. 17 is a view illustrating CISs in an interleaved scheme according to an embodiment.

Referring to FIG. 17, the ISO_Interval 1702 may start at the CIS1 anchor point 1700 overlapping the CIG anchor point and may include CIG events (e.g., CIG event x 1704). CIS2 event x 1708 in CIG event x 1704 may occur overlapping CIS1 event x 1706.

Figure 18:
FIG. 18 is a view illustrating an example of connection between Bluetooth devices according to an example embodiment.
Figure 18:
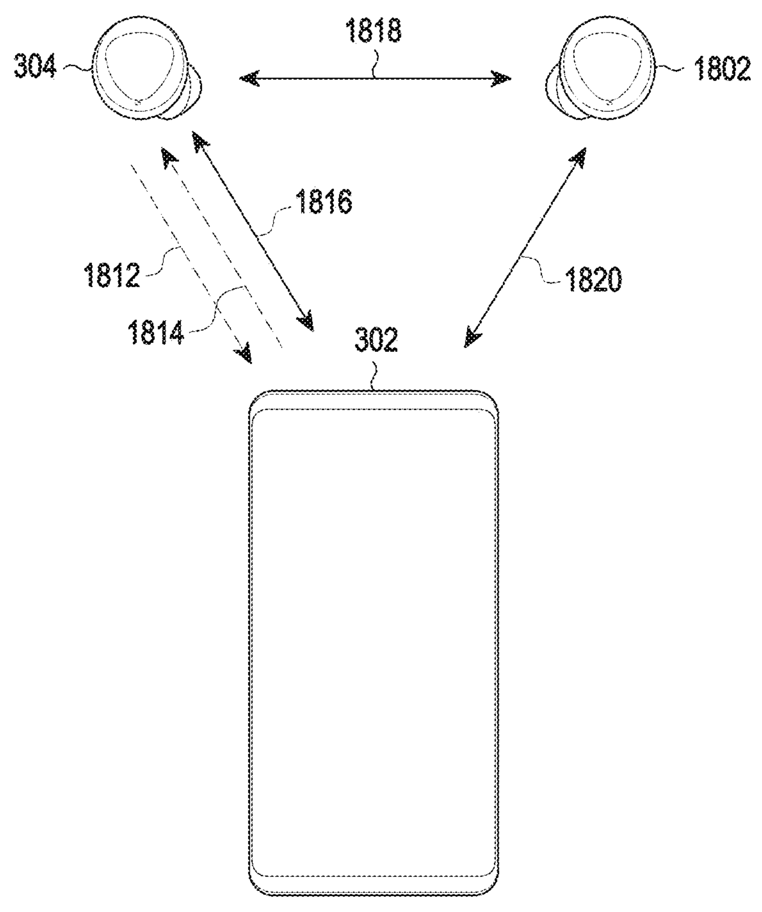

FIG. 18 is a view illustrating an example of connection between Bluetooth devices according to an embodiment.

Referring to FIG. 18, the first electronic device 302 may detect an advertising packet 1812 broadcast from the second electronic device 304 and may transmit a scan response packet 1814 to the second electronic device 304. The first electronic device 302 and the second electronic device 304 may discover each other by exchanging the advertising packet 1812 and the scan response packet 1814, and may establish a communication connection 1816 therebetween.

In an embodiment, the communication connection 1816 may include a BLE communication link and a CIS link. The BLE communication link may be used to exchange information necessary for establishing or controlling a CIS link between the first electronic device 302 and the second electronic device 304, and may include, e.g., an ACL link for logical transport. The CIS link may be used to communicate audio data between the first electronic device 302 and the second electronic device 304. In an embodiment, the first electronic device 302 and the second electronic device 304 may establish the CIS link based on information (e.g., the parameters of FIG. 13) obtained through the BLE communication link. In an embodiment, the first electronic device 302 and the second electronic device 304 may exchange, through the BLE communication link, information (e.g., supported feature information and/or PHY change policy) to be applied to control of the CIS link.

In an embodiment, the first electronic device 302 and the second electronic device 304 may exchange supported feature information with each other through the BLE communication link. In an embodiment, the supported feature information may include first information indicating whether each electronic device (e.g., the first electronic device 302 or the second electronic device 304) supports AoBLE and/or second information indicating whether each electronic device supports a CIS PHY change function. In an embodiment, the CIS PHY change function may include an operation of changing the PHY each time interval according to the PHY change policy on the CIS link.

In an embodiment, each of the first electronic device 302 and the second electronic device 304 may identify that the peer electronic device supports AoBLE and supports the CIS PHY change function, based on the supported feature information received from the peer electronic device, and may change the PHY used in the CIS link for each designated time interval, based on the PHY change policy shared therebetween. The first electronic device 302 may transmit audio data via the CIS link using the PHY that is changed for each corresponding time interval (e.g., any one of at least one CSI interval, at least one CIS event, or at least one CIS subevent) based on the PHY change policy. Similarly, the second electronic device 304 may receive audio data through the CIS link using the PHY determined based on the PHY change policy.

In an embodiment, the second electronic device 304 may establish a communication link 1818 with an external electronic device (e.g., the external electronic device 1802) constituting a pair of wearable devices, and may transmit and receive control and data to and from the external electronic device 1802. In an embodiment, the second electronic device 304 may be the first earbud 202, and the external electronic device 1802 may be the second earbud 204.

In an embodiment, the external electronic device 1802 may establish a communication link 1820 with the first electronic device 302 and may perform the same or similar operations to those of the second electronic device 304. In an embodiment, the external electronic device 1802 may communicate with the first electronic device 302 under the control of the second electronic device 304.

Figure 19A:
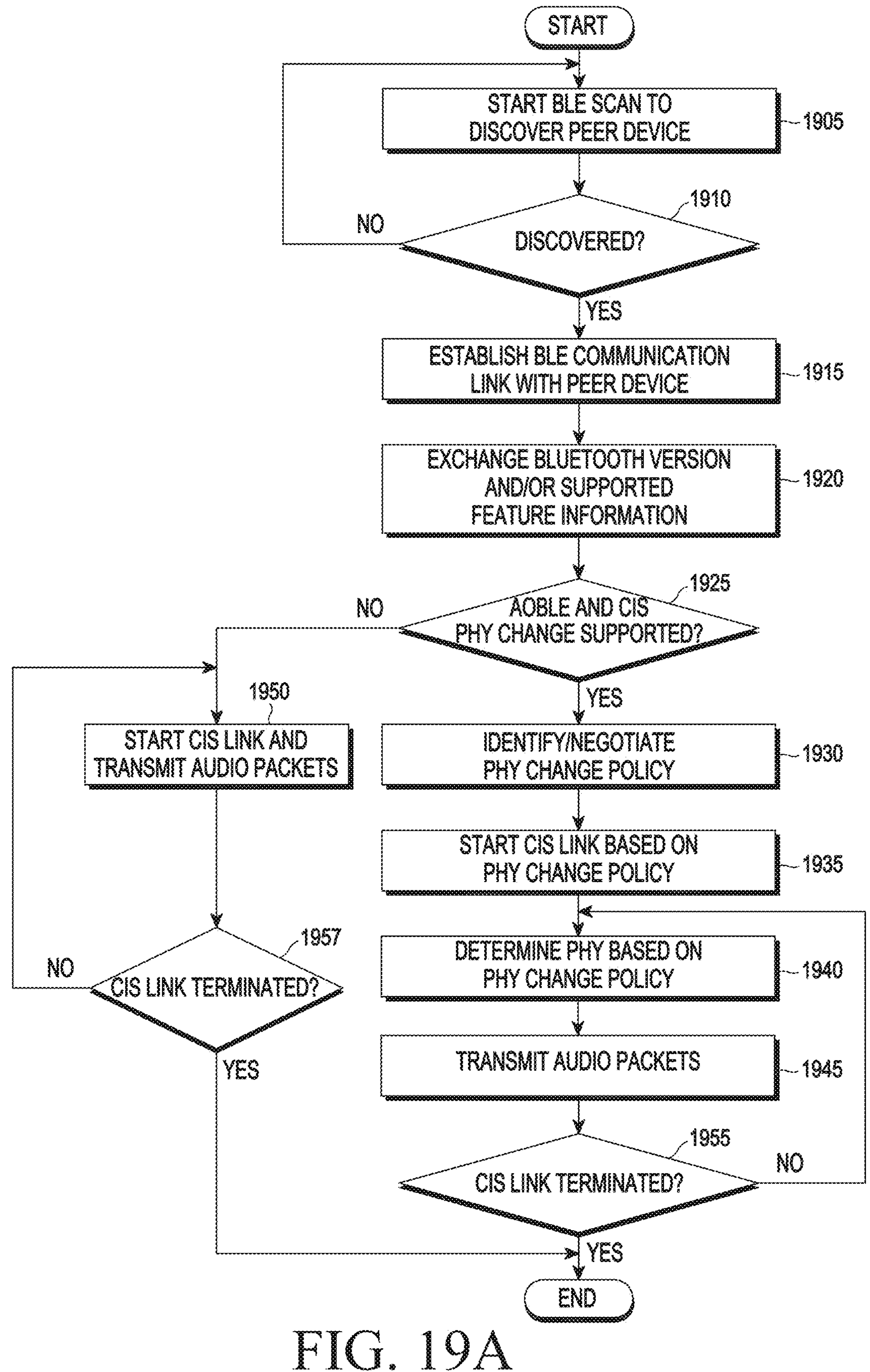
FIG. 19A is a flowchart illustrating a procedure for transmitting audio data by a first electronic device according to an example embodiment.

FIG. 19A is a flowchart illustrating a procedure for transmitting audio data by a first electronic device 302 according to an embodiment. In an embodiment, the first electronic device 302 may be the electronic device 101 illustrated in FIG. 1, and the illustrated operations may be executed by the processor 120. According to embodiments, at least some of operations to be described below may be omitted, modified, or rearranged.

Referring to FIG. 19A, in operation 1905, the first electronic device 302 may start a BLE scan to find the peer device that may be located nearby. The BLE scan may include the operation (e.g., operation 314) of monitoring reception of the advertising packet being broadcast from the peer device.

In operation 1910, the first electronic device 302 may determine whether the peer device (e.g., the second electronic device 304) is discovered. When no peer device is discovered, the first electronic device 302 may continue to perform operation 1905. On the other hand, if the second electronic device 304 is discovered by receiving the advertising packet from the second electronic device 304, the first electronic device 302 may proceed to operation 1915.

In operation 1915, the first electronic device 302 may establish a BLE communication link with the second electronic device 304. In operation 1920, the first electronic device 302 may transmit a message (e.g., a pairing request message of a link layer (LL)) including the Bluetooth version and/or supported feature information about the first electronic device 302 to the second electronic device 304 via the BLE communication link, and may receive a message (e.g., a pairing response message of an LL) including the Bluetooth version and/or supported feature information about the second electronic device 304 from the second electronic device 304 via the BLE communication link.

The messages may include supported feature information related to capability of the first electronic device 302 and the second electronic device 304. As an example, the supported feature information may include a feature set including bits individually indicating whether various features such as LE encryption, LE ping, LE data length extension, LE 2M PHY, or LE Coded PHY are supported. In an embodiment, each of the supported feature information may include first information (e.g., 1 bit in the feature set) indicating whether AoBLE is supported and/or second information (e.g., 1 bit in the feature set) indicating whether CIS PHY change function is supported.

In operation 1925, the first electronic device 302 may determine whether the second electronic device 304 supports AoBLE and CIS PHY change functions, based on the supported feature information about the second electronic device 304. In an embodiment, the first electronic device 302 may detect the bit corresponding to the second information from the feature set included in the pairing response message received from the second electronic device 304, and may determine that the second electronic device 304 supports the CIS PHY change function when the detected bit is set to "1". In an embodiment, the first electronic device 302 may support AoBLE and CIS PHY change functions.

When the second electronic device 304 does not support the AoBLE or CIS PHY change function, the first electronic device 302 may proceed to operation 1950 to start a CIS link having a fixed PHY that may be determined through the BLE communication link, and may transmit audio packets through the CIS link using the fixed PHY. The first electronic device 302 may continue to use the same PHY according to operation 1950 until identifying that the CIS link is terminated in operation 1957. When it is identified that the second electronic device 304 supports AoBLE and the CIS PHY change function, the first electronic device 302 may proceed to operation 1930.

In an embodiment, when the first electronic device 302 knows that the second electronic device 304 supports AoBLE and supports the CIS PHY change function, operations 1920 and 1925 may be omitted.

In operation 1930, the first electronic device 302 may identify a PHY change policy to be used during the audio service via the CIS link, or may negotiate the PHY change policy with the first and/or second electronic device. In an embodiment, the PHY change policy may be stored in memory (e.g., the memory 290) of the first electronic device 302, and may be identified based on the Bluetooth version and/or supported feature information about the second electronic device 304 obtained in operation 1920.

Figure 25:
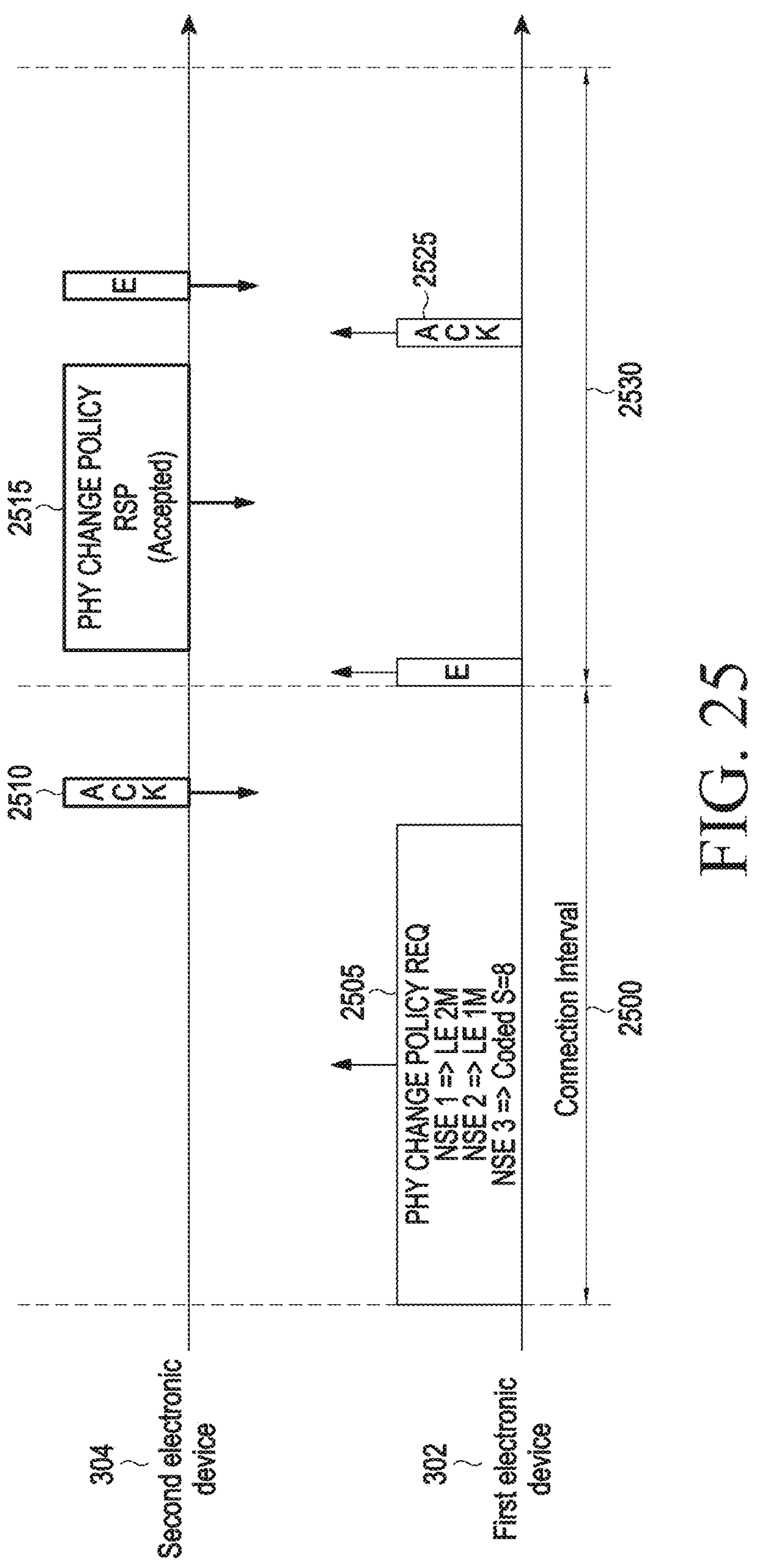
FIG. 25 is a view illustrating an example procedure for negotiating a PHY change policy according to an example embodiment.

In an embodiment, the PHY change policy may be determined based on information (e.g., the change request packet 2505 and the change response packet 2515 of FIG. 25) exchanged between the first electronic device 302 and the second electronic device 304. In an embodiment, the PHY change policy may include at least one time interval for changing the PHY on the CIS link and at least one parameter (e.g., PHY) for being used in each of the at least one time interval. In an embodiment, the plurality of PHYs designated by the PHY change policy may include at least one of LE 1M, LE 2M, Coded PHY with S=2, Coded PHY with S=8, or LE HR.

In an embodiment, the PHY change policy may include at least one change order (e.g., LE 2M→LE 1M→Coded PHY with S=8 and/or LE 2M→LE 2M→LE 1M) of PHYS on the CIS link, and the time interval indicating the change interval of the PHY may be agreed as, e.g., at least one ISO interval, at least one event, or at least one subevent.

For example, when the change interval of the PHY is the subevent and the change order of the PHYs is designated as LE 2M→LE 1M→Coded PHY with S=8 according to the PHY change policy, the first electronic device 302 and the second electronic device 304 may exchange data packets encoded using LE 2M within the first subevent of each ISO interval, exchange data packets encoded using LE 1M within the second subevent, and exchange data packets encoded using Coded PHY with S=8 within the third subevent. For example, transmission of data packets in the second and third subevents may be omitted.

In an embodiment, the PHY change policy may further include the unit of the time interval for changing the PHY or the period (e.g., at least one CIS subevent, at least one CIS event, or at least one CIG event, at least one ISO interval) or the reference point to which the change in PHYs is applied. In an embodiment, the PHY change policy may include a plurality of PHYs to be used for a plurality of CIS subevents, respectively, included in one CIS event for the CIS link. In an embodiment, the PHY change policy may individually indicate a plurality of PHYs to be used for each of a plurality of CIS events included in one CIG for the CIS link. In an embodiment, the PHY change policy may be determined before the CIS link is started. In an embodiment, the PHY change policy may be negotiated between the first electronic device 302 and the second electronic device 304 when the CIS link starts or during the CIS link. In an embodiment, the PHY change policy may indicate the time interval in which the PHY is changed based on at least one parameter (e.g., the event or the subevent) related to CIS communication and the PHY to be changed for each time interval.

In an embodiment, the PHY change policy may include a change order of a plurality of PHYs and/or a change order of a plurality of parameter sets according to a given time interval (e.g., at least one ISO interval, at least one CIS event, or at least one CIS subevent), and each of the plurality of parameter sets may include information of at least one of a transmission path, a subevent length, or a data size for use in the CIS link.

In operation 1935, the first electronic device 302 may start the CIS link based on the identified or negotiated PHY change policy. In operation 1940, the first electronic device 302 may determine the PHY corresponding to the current time interval (e.g., the CIS event or the CIS subevent) based on the PHY change policy. In operation 1945, the first electronic device 302 may transmit audio packets generated using the determined PHY to the second electronic device 304 through the CIS link. In an embodiment, the first electronic device 302 may transmit a next audio packet as ACK of the audio packet is detected. In an embodiment, according to detection of NACK or ACK missing of the audio packet, the first electronic device 302 may retransmit or flush the audio packet and may transmit a next audio packet.

Operations 1940 and 1945 may be repeated for each corresponding time interval (e.g., a CIS event or a CIS subevent) according to the PHY change policy until the termination of the CIS link is determined in operation 1955. In an embodiment, the PHY change policy used in operation 1940 and operation 1945 may be changed or updated through negotiation in each time interval determined based on a given reference point or according to the communication state between the first electronic device 302 and the second electronic device 304.

Figure 19B:
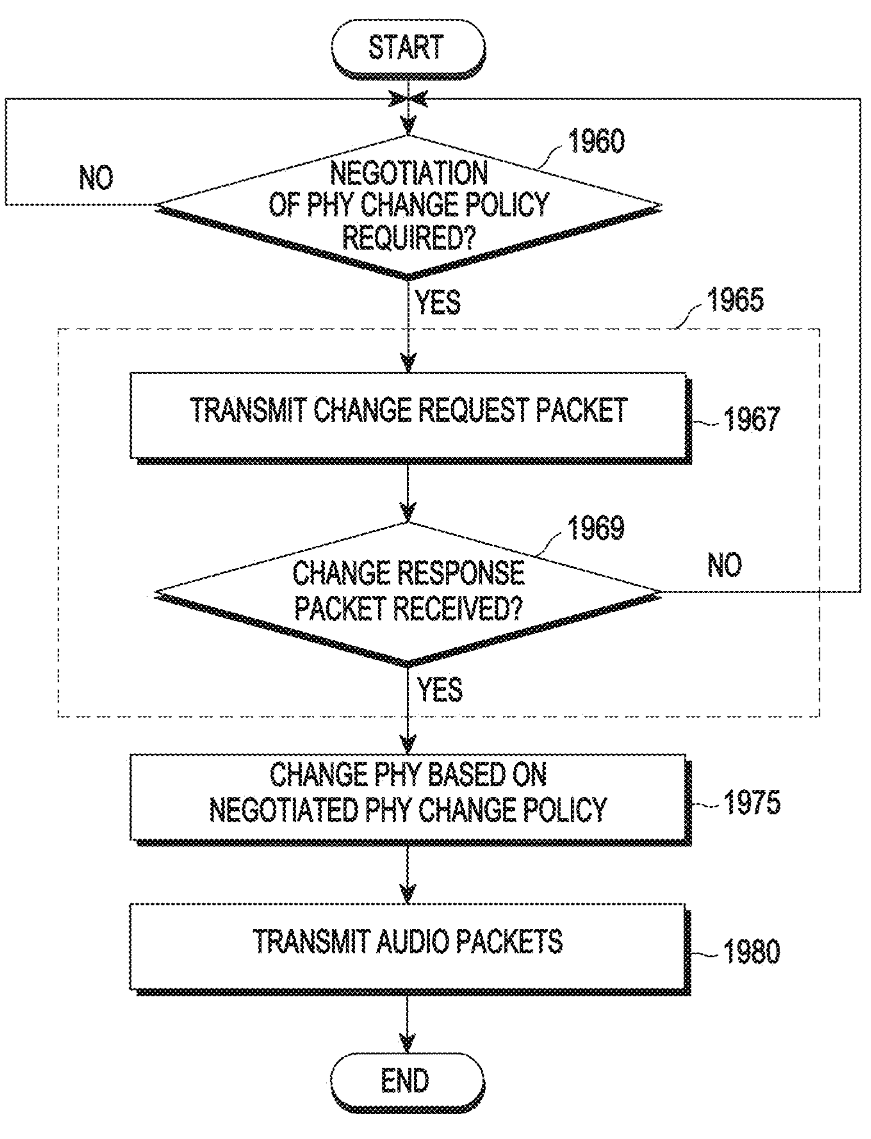
FIG. 19B is a flowchart illustrating a procedure for negotiating a PHY change policy by a first electronic device according to an example embodiment.

FIG. 19B is a flowchart illustrating a procedure for negotiating a PHY change policy by a first electronic device 302 according to an embodiment. In an embodiment, the first electronic device 302 may be the electronic device 101 illustrated in FIG. 1, and the illustrated operations may be executed by the processor 120. According to embodiments, at least some of operations to be described below may be omitted, modified, or rearranged.

Referring to FIG. 19B, in operation 1960, the first electronic device 302 may determine whether it is necessary to negotiate (or change) a PHY change policy for a CIS link. In an embodiment, the first electronic device 302 may determine to negotiate (or change) the PHY change policy at at least one of the time when the BLE communication link is established, the time when the CIS link is established, or the time when an audio service is performed through the CIS link.

In an embodiment, the first electronic device 302 may determine whether to negotiate the PHY change policy considering at least one of the link occupancy, at least one internal resource, or the surrounding wireless environment considering CIS parameters of the first electronic device 302 transmitting audio data. In an embodiment, the first electronic device 302 may determine to periodically negotiate the PHY change policy for each predetermined time interval with respect to a predetermined reference point (e.g., a plurality of CIS events or at least one CIG event). When it is determined that it is necessary to negotiate the PHY change policy, the first electronic device 302 may proceed to operation 1965.

In operation 1965, the first electronic device 302 may determine a PHY change policy through negotiation with the second electronic device 304. In an embodiment, negotiation of the PHY change policy may include operation 1967 and operation 1969. In an embodiment, operation 1967 or operation 1969 may be repeated at least once or more for negotiation.

In operation 1967, the first electronic device 302 may transmit a change request packet (e.g., the change request packet 2505 of FIG. 25) including a PHY change policy to be changed to the second electronic device 304. In an embodiment, the change request packet may be delivered through the ACL link or the CIS link between the first electronic device 302 and the second electronic device 304.

In an embodiment, when the first electronic device 302 establishes CIS links with a plurality of external electronic devices (e.g., including the second electronic device 304) and the plurality of external electronic devices are included in the same CIG, because the first electronic device 302 may not allocate a large amount of resources to each of the CIS links, the first electronic device 302 may determine the PHY change policy to preferentially use LE 2M for audio services with external electronic devices in the CIG.

In an embodiment, when there is a lot of noise around the first electronic device 302 and the strength of the received signal from the second electronic device 304 is weak (e.g., the strength of the received signal from the second electronic device 304 is less than a threshold), the first electronic device 302 may determine the PHY change policy to preferentially use Codec PHY with S=8 having a high communication success rate. In an embodiment, the first electronic device 302 may determine the PHY change policy to preferentially use the LE HR and then use a PHY having a lower data rate in a time interval for retransmission according to ACK. In an embodiment, the first electronic device 302 may request to change various additional parameters that may include at least one of transmission power, the transmission path, the reception gain, or the reception path through the change request packet.

In operation 1969, the first electronic device 302 may determine whether a change response packet (e.g., the change response packet 2515 of FIG. 25) accepting the PHY change policy of the change request packet is received from the second electronic device 304. In an embodiment, the change response packet may be delivered through the ACL link or the CIS link between the first electronic device 302 and the second electronic device 304. If the change response packet is not received or indicates that the PHY change policy is not accepted, the PHY change policy is not changed, and the audio service may continue according to the previously used CIS parameters. On the other hand, when the change response packet is received, the first electronic device 302 may proceed to operation 1975. Although not illustrated, in another embodiment, the first electronic device 302 may receive a response packet including a desired PHY change policy from the second electronic device 304 and may accept the PHY change policy of the response packet.

According to an embodiment, the first electronic device 302 and/or the second electronic device 304 may store parameters related to the PHY change policy in memory (e.g., the memory 130 of FIG. 1 or the memory 290 of FIG. 2). In an embodiment, the parameters may indicate at least one PHY map indicating a change in PHYs over time and/or PHYs corresponding to the communication environment (e.g., received signal strength). For example, the first electronic device 302 and/or the second electronic device 304 may perform negotiation for the PHY change policy based on the parameters stored in the memory. In an embodiment, the first electronic device 302 and the second electronic device 304 may repeatedly use the given PHY map for each predetermined time interval (e.g., at least one subevent or at least one event) with respect to the predetermined reference point. In operation 1975, the first electronic device 302 may determine the PHY corresponding to the current time interval (e.g., the CIS event or the CIS subevent) based on the PHY change policy. For example, when the change interval of the PHY is a subevent and the change order of the PHYs is designated as LE 2M→LE 1M→Coded PHY with S=8 according to the PHY change policy, the first electronic device 302 and the second electronic device 304 may determine the PHY as LE 2M in the first subevent within each ISO interval, determine the PHY as LE 1M in the second subevent, and determine the PHY as Coded PHY with S=8 in the third subevent. For example, transmission of data packets in the second and third subevents may be omitted.

In operation 1980, the first electronic device 302 may transmit audio packets generated using the determined PHY in at least one subevent within each ISO interval to the second electronic device 304 through the CIS link.

Figure 20A:
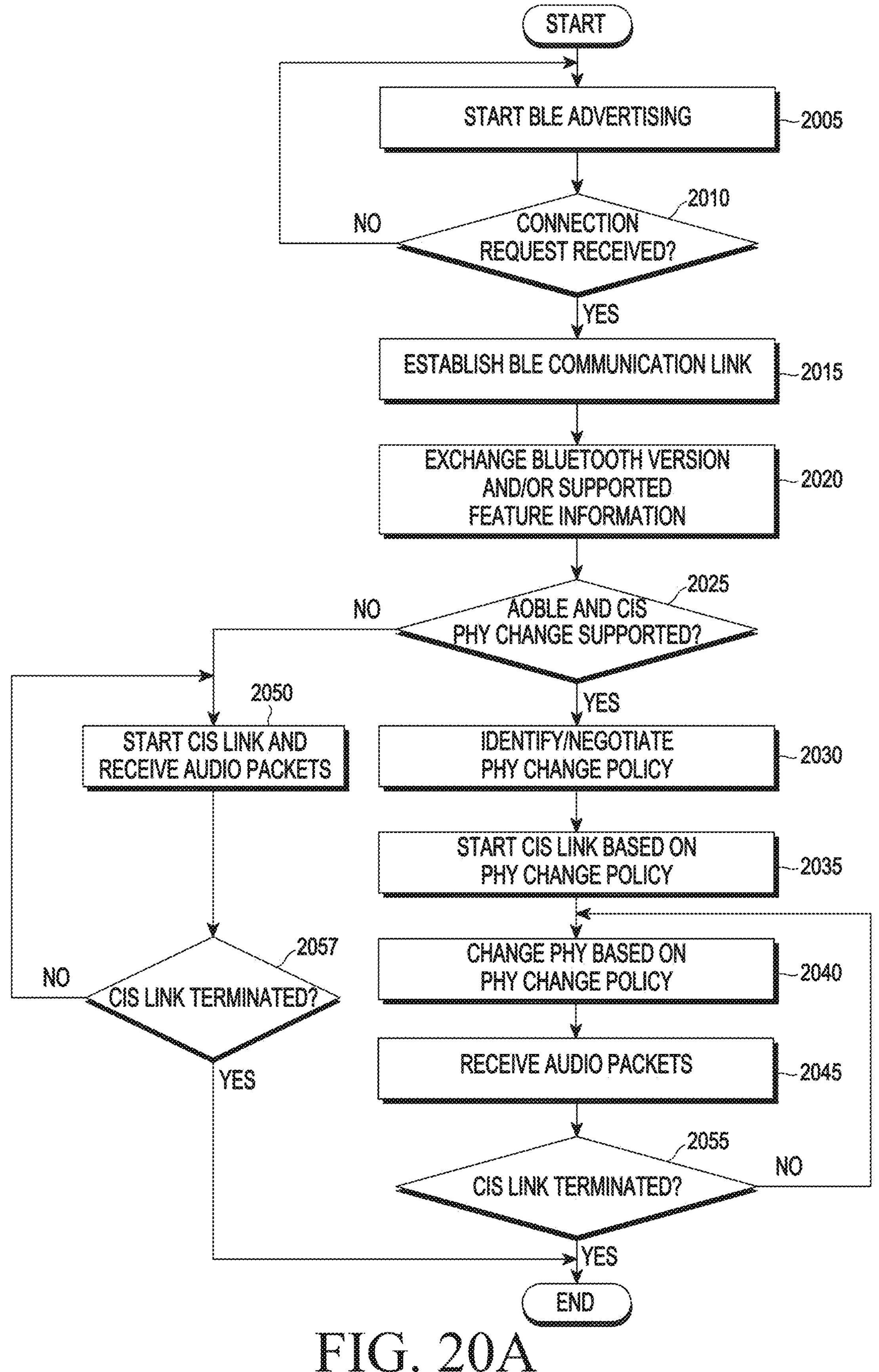
FIG. 20A is a flowchart illustrating a procedure for receiving audio data by a second electronic device according to an example embodiment.

FIG. 20A is a flowchart illustrating a procedure for receiving audio data by a second electronic device 304 according to an embodiment. In an embodiment, the second electronic device 304 may be the electronic device 202 illustrated in FIG. 2, and the illustrated operations may be executed by the processor 210. According to embodiments, at least some of operations to be described below may be omitted, modified, or rearranged.

Referring to FIG. 20A, in operation 2005, the second electronic device 304 may start BLE advertising to find a peer device that may be located nearby. The BLE advertising may include periodically broadcasting (e.g., operations 312 and 320) an advertising packet containing information about the second electronic device 304.

In operation 2010, the second electronic device 304 may determine whether a connection request (e.g., the scan request packet or the connection indication (CONNECT_IND) packet of operation 316) is received from the peer device (e.g., the first electronic device 302) receiving the advertising packet. In operation 2015, the second electronic device 304 may establish a BLE communication link with the first electronic device 302 in response to the connection request.

In operation 2020, the second electronic device 304 may transmit a message including the Bluetooth version and/or supported feature information about the second electronic device 304 to the first electronic device 302 through the BLE communication link, and may receive a message including the Bluetooth version and/or supported feature information about the first electronic device 302 from the first electronic device 302 through the BLE communication link.

In operation 2025, the second electronic device 304 may determine whether the first electronic device 302 supports AoBLE and CIS PHY change functions, based on the supported feature information about the first electronic device 302. In an embodiment, the second electronic device 304 may support AoBLE and CIS PHY change functions.

When the first electronic device 302 does not support the AoBLE or CIS PHY change function, the second electronic device 304 may proceed to operation 2050 to start a CIS link having a fixed PHY that may be determined through the BLE communication link, and may transmit audio packets through the CIS link using the fixed PHY. Operation 2050 may be continued until it is identified that the CIS link is terminated in operation 2057. When it is identified that the first electronic device 302 supports AoBLE and the CIS PHY change function, the second electronic device 304 may proceed to operation 2030.

In operation 2030, the second electronic device 304 may identify a PHY change policy to be used during the audio service through the CIS link, or may negotiate the PHY change policy with the first electronic device. In an embodiment, the PHY change policy may be stored in memory (e.g., the memory 290) of the second electronic device 304, and may be identified based on the Bluetooth version and supported feature information about the first electronic device 302 obtained in operation 2020. In an embodiment, the PHY change policy may be determined from information (e.g., a control data packet) exchanged between the first electronic device 302 and the second electronic device 304. In an embodiment, the PHY change policy may include at least one time interval for changing the PHY on the CIS link and at least one parameter (e.g., PHY) for being used in each of the at least one time interval. In an embodiment, the plurality of PHYs designated by the PHY change policy may include at least one of LE 1M, LE 2M, Coded PHY with S=2, Coded PHY with S=8, or LE HR.

In an embodiment, the PHY change policy may include the unit of time interval for changing the PHY on the CIS link and at least one change order of PHYs. In an embodiment, the PHY change policy may include a plurality of PHYs to be used for a plurality of CIS subevents, respectively, included in one CIS event for the CIS link. In an embodiment, the PHY change policy may include a plurality of PHYs to be used for each of a plurality of CIS events included in one CIG for the CIS link. In an embodiment, the PHY change policy may be determined before the CIS link is started. In an embodiment, the PHY change policy may be negotiated between the first electronic device 302 and the second electronic device 304 when the CIS link starts or during the CIS link.

In operation 2035, the second electronic device 304 may start the CIS link based on the identified or negotiated PHY change policy. In operation 2040, the second electronic device 304 may determine the PHY corresponding to the current time interval (e.g., the CIS event or the CIS subevent) based on the PHY change policy. In operation 2045, the second electronic device 304 may receive audio packets generated by the first electronic device 302 using the determined PHY through the CIS link. In an embodiment, the second electronic device 304 may transmit an ACK or NACK for the audio packets to the first electronic device 302.

Operations 2040 and 2045 may be repeated for each corresponding time interval (e.g., a CIS event or a CIS subevent) according to the PHY change policy until the termination of the CIS link is determined. See 2055 in FIG. 20A.

In an embodiment, when both the first electronic device 302 and the second electronic device 304 are capable of AoBLE support and support the CIS PHY change function, the first electronic device 302 and the second electronic device 304 may perform communication on the CIS link by simultaneously using the designated PHY in the designated time interval according to the promised PHY change policy. In an embodiment, the first electronic device 302 and the second electronic device 304 may create the CIS link and may communicate audio data using the PHY that changes according to the PHY change policy rather than the fixed PHY in at least one time interval (e.g., an integer multiple of the subevent interval) within the CIS event of the CIS link. By efficiently responding to various communication degradation states such as wireless environment change or physical distance movement and supporting a bit rate variable function according to retransmission through the use of the PHY change policy, it is possible to increase a data transmission success rate and increase the efficiency of link resources, thereby minimizing or reducing current consumption and increasing usability.

Figure 20B:
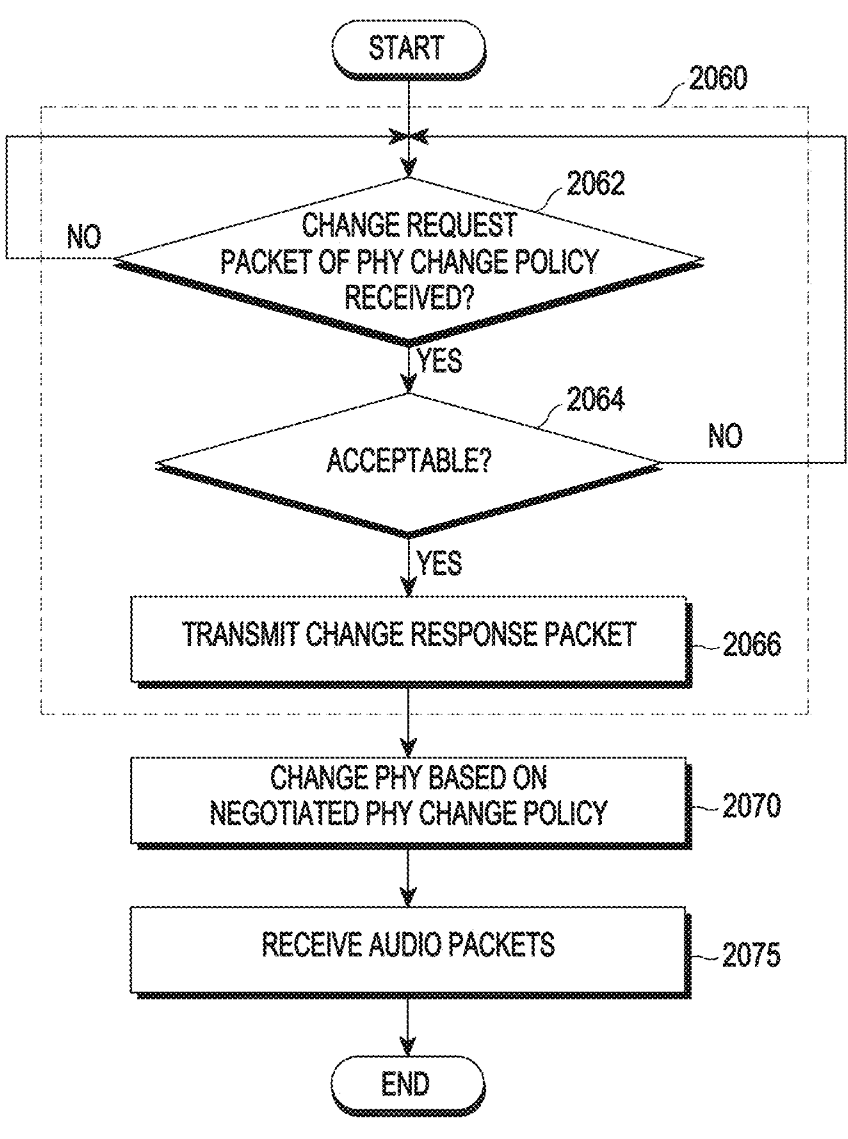
FIG. 20B is a flowchart illustrating a procedure for negotiating a PHY change policy by a second electronic device according to an example embodiment.

FIG. 20B is a flowchart illustrating a procedure for negotiating a PHY change policy by a second electronic device 304 according to an embodiment. In an embodiment, the second electronic device 304 may be the electronic device 202 illustrated in FIG. 2, and the illustrated operations may be executed by the processor 210. According to embodiments, at least some of operations to be described below may be omitted, modified, or rearranged.

Referring to FIG. 20B, in operation 2060, the second electronic device 304 may determine a PHY change policy through negotiation with the first electronic device 302. In an embodiment, negotiation of the PHY change policy may include at least one of operation 2062, operation 2064, or operation 2066. In an embodiment, operation 2062, operation 2064, or operation 2066 may be repeated at least once or more for negotiation.

In operation 2062, the second electronic device 304 may determine whether the packet received from the first electronic device 302 is a change request packet (e.g., the change request packet 2505 of FIG. 25) requesting negotiation of the PHY change policy. In an embodiment, the change request packet may be received at at least one of the time when the BLE communication link is established, the time when the CIS link is created, or the time while an audio service is performed through the CIS link. In an embodiment, the change request packet may be delivered through the ACL link or the CIS link between the first electronic device 302 and the second electronic device 304. The change request packet may include a new PHY change policy desired to be changed into by the first electronic device 302.

In operation 2064, the second electronic device 304 may determine whether to accept the PHY change policy of the change request packet considering the communication environment such as an internal resource of the second electronic device 304. If the PHY change policy of the change request packet may not be accepted, the PHY change policy is not changed, and the audio service may continue according to previously used CIS parameters. In an embodiment, when the PHY change policy of the change request packet may not be accepted, the second electronic device 304 may transmit a response packet indicating that the PHY change policy is not accepted to the first electronic device 302. On the other hand, if it is possible to accept the PHY change policy, the second electronic device 304 may proceed to operation 2066. In operation 2066, the second electronic device 304 may transmit, to the first electronic device 302, a change response packet (e.g., the change response packet 2515 of FIG. 25) indicating that the PHY change policy of the change request packet is accepted. In an embodiment, the change response packet may be delivered through the ACL link or the CIS link between the first electronic device 302 and the second electronic device 304. Although not illustrated, in another embodiment, the second electronic device 304 may transmit a negotiation response packet including a desired new PHY change policy.

In operation 2070, the second electronic device 304 may determine the PHY corresponding to the current time interval (e.g., the CIS event or the CIS subevent) based on the PHY change policy. In operation 2075, the second electronic device 304 may receive audio packets generated by the first electronic device 302 using the determined PHY through the CIS link.

Figure 21A:
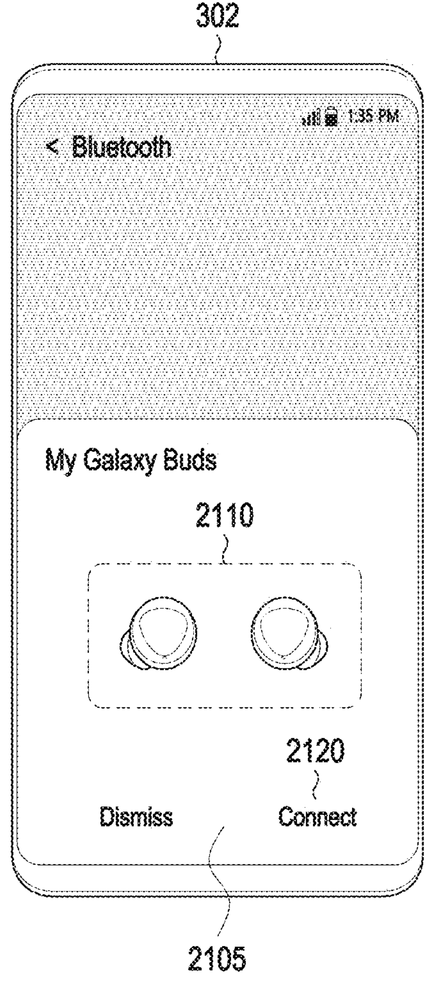
FIGS. 21A and 21B illustrate a user interface (UI) showing device connection in a Bluetooth network environment according to an example embodiment.
Figure 21B:
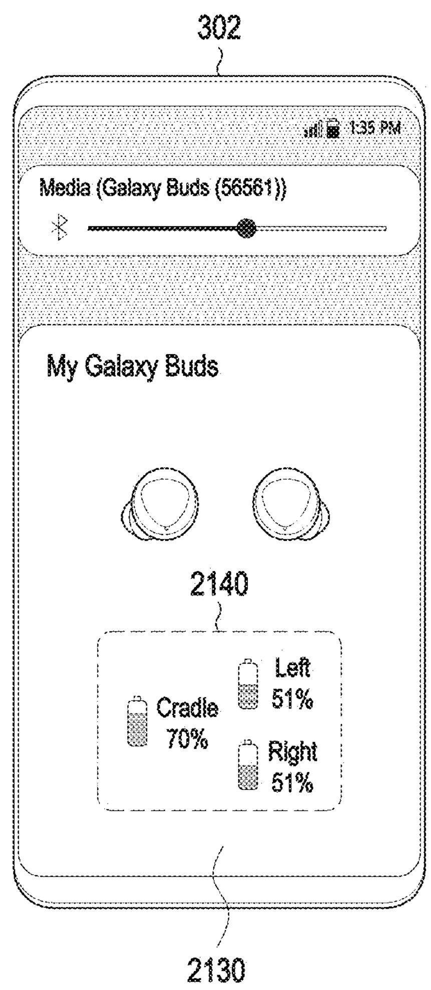

FIGS. 21A and 21B illustrate a user interface (UI) showing device connection in a Bluetooth network environment according to an embodiment.

Referring to FIG. 21A, a first electronic device 302 (e.g., the electronic device 101) may recognize a second electronic device 304 by receiving an advertising packet transmitted from the second electronic device 304, and may output a first user interface 2105 for notifying the user of the recognized second electronic device 304 through a display (e.g., the display module 160 which includes at least one display) of the first electronic device 302. For example, the first electronic device 302 may recognize another electronic device (e.g., the second earbud 204) constituting one set or pair with the second electronic device 304 (e.g., the first earbud 202) as one electronic device.

In an embodiment, the first user interface 2105 may include at least one of an image 2110 indicating the shapes of the first earbud 202 and the second earbud 204 or a text indicating device names (e.g., My Galaxy Buds) of the first earbud 202 and the second earbud 204.

In an embodiment, the first electronic device 302 may automatically establish a BLE communication connection (e.g., the communication connection 1816 of FIG. 18) with the second electronic device 304 (e.g., 326 of FIG. 3) in response to reception of a user input to the user interface 2120 requesting connection with the second electronic device 304 or without the user input.

Referring to FIG. 21B, the first electronic device 302 may output a second user interface 2130 indicating that a communication connection with the second electronic device 304 has been established, through a display (e.g., the display module 160). The second user interface 2130 may further include, e.g., an image 2140 indicating the battery status of the first electronic device 302, the second electronic device 304, and/or the cradle device.

Figure 22:
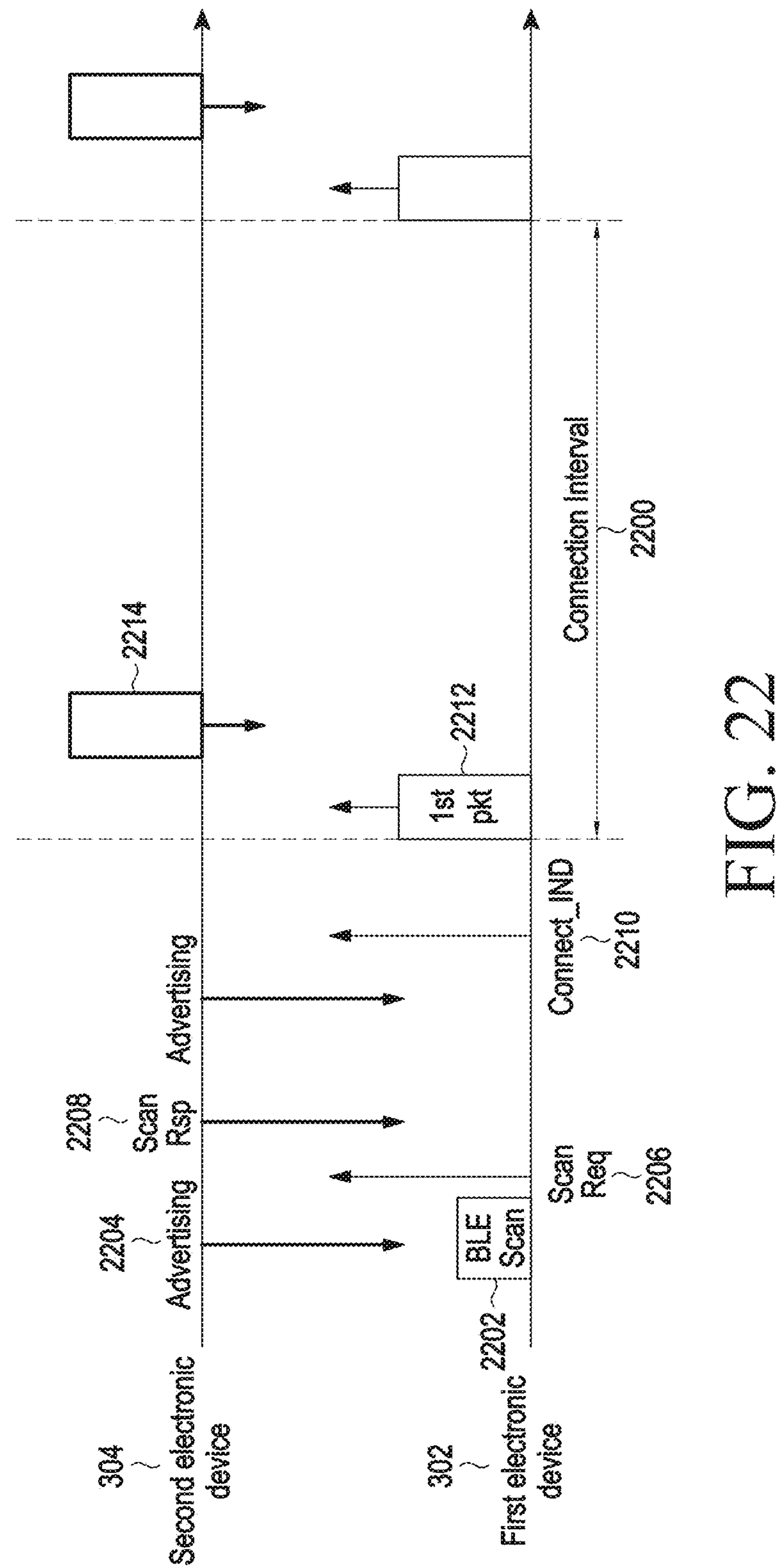
FIG. 22 is a view illustrating an example of BLE communication between electronic devices according to an example embodiment.

FIG. 22 is a view illustrating an example of BLE communication between electronic devices according to an embodiment.

Referring to FIG. 22, the first electronic device 302 may receive an advertising packet 2204 transmitted by the second electronic device 304 through a BLE scan operation 2202, and may transmit a scan request packet Scan_Req 2206. When the second electronic device 304 transmits the scan response packet Scan_Rsp 2208, the first electronic device 302 may request BLE connection from the second electronic device 304 by transmitting the connection indication (CONNECT_IND) packet 2210. In an embodiment, the connection indication packet 2210 may include at least one of a device address, a connection interval, a supervision timeout, or a channel map of the first electronic device 302.

In an embodiment, the first electronic device 302 and the second electronic device 304 may start the first connection interval 2200 of BLE communication at a time identified by the connection indication packet 2210. Within the connection interval 2200, the first electronic device 302 may transmit a first data packet (1st pkt) 2212 (e.g., a null packet), and the second electronic device 304 may transmit its own packet 2214 (e.g., an ACK/NACK packet or a data packet).

In an embodiment, when the AoBLE function is supported, the first electronic device 302 and the second electronic device 304 may establish a CIS link using packets (e.g., the CIS_REQ packet of operation 1210 and the CIS_RSP packet of operation 1212) exchanged through the BLE communication link, and may communicate audio data through the CIS link. The PHY used in the CIS link may be changed in a given time interval according to the PHY change policy.

In an embodiment, the first electronic device 302 and the second electronic device 304 may identify or negotiate the PHY change policy at at least one of the time of establishing the CIS link, before starting the audio service, or while performing the audio service. In an embodiment, the first electronic device 302 and the second electronic device 304 may identify or negotiate the PHY change policy in at least one of the following cases.

1. during advertising and scan operations before establishing a BLE connection,
2. when creating an ACL link after establishing BLE connection,
3. when establishing a CIS link and starting a CIS service, or
4. while performing a CIS service.

Figure 23:
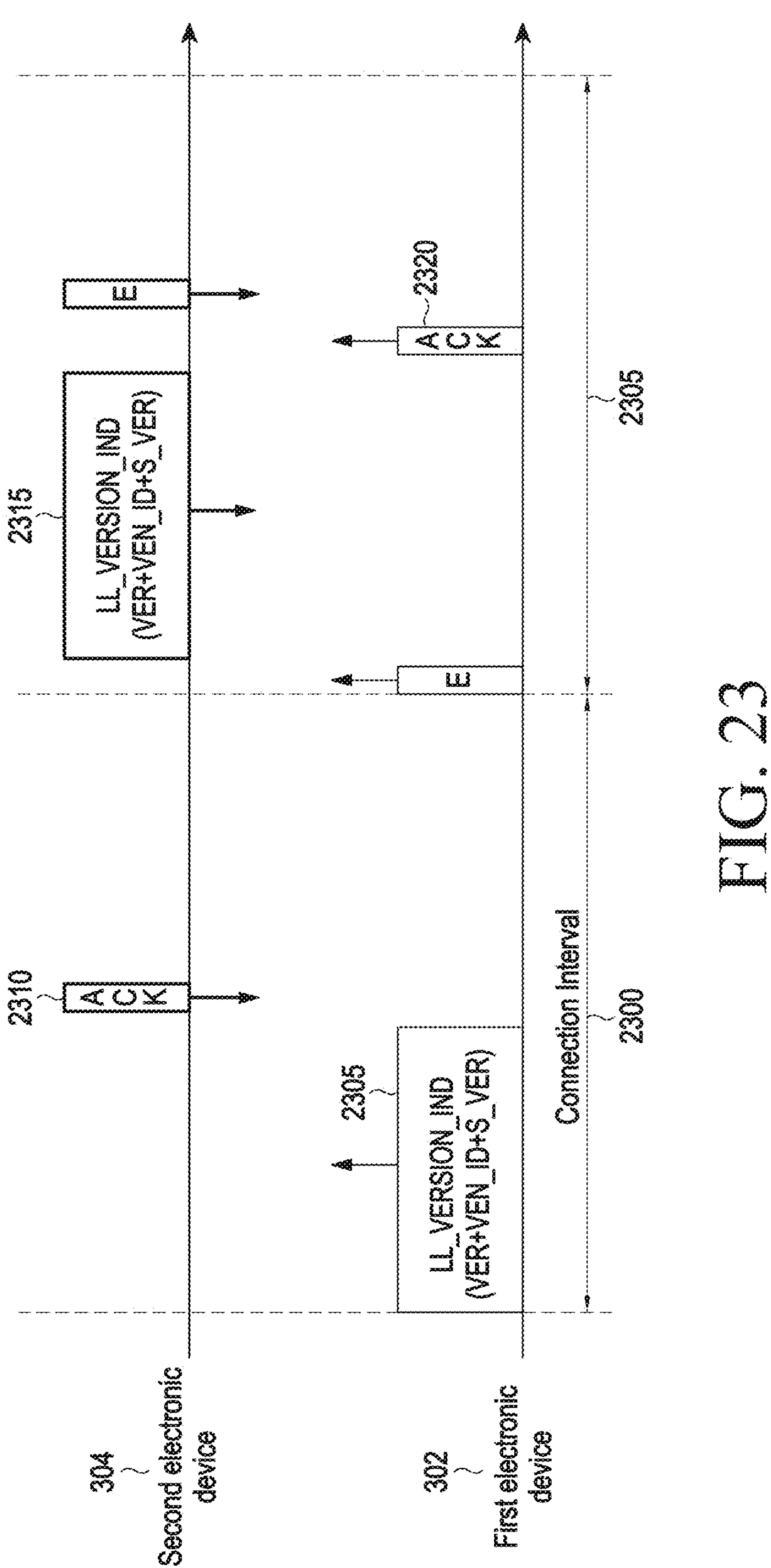
FIG. 23 is a view illustrating an example procedure for identifying support of a CIS PHY change function according to an example embodiment.

FIG. 23 is a view illustrating an example procedure for identifying support of a CIS PHY change function according to an embodiment. In an embodiment, the illustrated procedure may correspond to operation 1920 of FIG. 19A or operation 2020 of FIG. 20A.

Referring to FIG. 23, after establishing a BLE communication link, the first electronic device 302 and the second electronic device 304 may identify versions of each other through link layer control packets 2305 and 2315 (e.g., LL_VERSION_IND packets) transmitted through the BLE communication link.

In an embodiment, the first electronic device 302 may transmit an LL_VERSION_IND packet within the connection interval 2300 and may receive an ACK packet 2310 corresponding thereto from the second electronic device 304. In an embodiment, the LL_VERSION_IND packet 2305 may include at least one of information indicating the Bluetooth version of the first electronic device 302, e.g., a VER field (e.g., set to 5.2), the VEN_ID field (e.g., set to 'Samsung') indicating the vendor, or an S_VER field (e.g., set to 0x98) indicating the subversion. The second electronic device 304 may recognize that the first electronic device 302 supports AoBLE and CIS PHY change functions based on the fields.

In an embodiment, the second electronic device may transmit an LL_VERSION_IND packet 2315 at the next connection interval 2325 and may receive an ACK packet 2320, which is a response thereto, from the first electronic device 302. In an embodiment, the second electronic device 304 may transmit the LL_VERSION_IND packet 2315 after receiving the empty packet E from the first electronic device 302 at the start time of the connection interval 2325. In an embodiment, similarly, the LL_VERSION_IND packet 2315 may include at least one of a VER field (e.g., set to 5.2) related to the second electronic device 304, a VEN_ID field (e.g., set to 'Samsung'), or an S_VER field (e.g., set to 0x98). Similarly, the first electronic device 302 may recognize that the second electronic device 304 supports AoBLE and CIS PHY change functions based on the fields.

In an embodiment, the first electronic device 302 and the second electronic device 304 may agree to operate according to the designated PHY change policy when the first electronic device 302 and the second electronic device 304 are a designated combination of the Bluetooth version, the vendor, and the sub-version. As an example, the PHY change policy may be determined so that the PHY (e.g., LE HR) having the highest data rate is used in the first subevent within each ISO interval, and the PHY (e.g., Coded PHY) having a stable data transmission success rate is used in the last subevent within the ISO interval.

Figure 24:
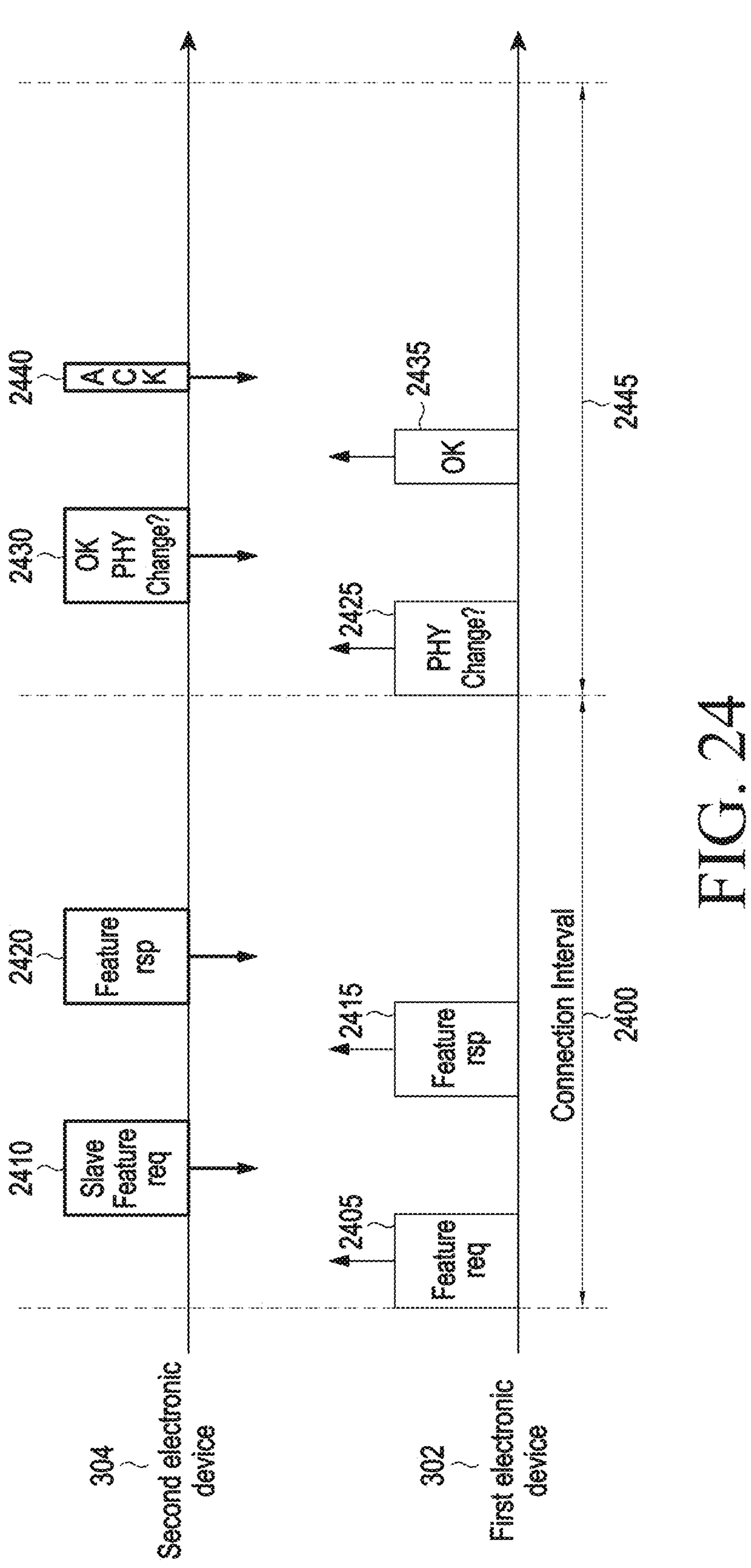
FIG. 24 is a view illustrating another example procedure for identifying support of a CIS PHY change function according to an example embodiment.

FIG. 24 is a view illustrating another example procedure for identifying support of a CIS PHY change function according to an embodiment. In an embodiment, the illustrated procedure may correspond to operation 1920 of FIG. 19A or operation 2020 of FIG. 20A.

Referring to FIG. 24, the first electronic device 302 may transmit a feature request (Feature req.) packet 2405 within the connection interval 2400. The second electronic device 304 may transmit a slave feature request (Slave Feature req.) packet 2410 within the connection interval 2400. The first electronic device 302 may transmit a feature response (Feature rsp.) packet 2415 in response to the slave feature request packet 2410. The second electronic device 304 may transmit a feature response packet 2420 in response to the feature request packet 2405 and/or packet 2415.

In an embodiment, the feature response packet 2415 may include first information indicating whether the first electronic device 302 supports AoBLE and/or second information indicating whether the first electronic device 302 supports a CIS PHY change function. The second electronic device 304 may recognize that the first electronic device 302 supports AoBLE and CIS PHY change functions based on the feature response packet 2415.

In an embodiment, the feature response packet 2420 may include first information indicating whether the second electronic device 304 supports AoBLE and/or second information indicating whether the second electronic device 304 supports a CIS PHY change function. The first electronic device 302 may recognize that the second electronic device 304 supports AoBLE and CIS PHY change functions based on the feature response packet 2420.

In an embodiment, within another connection interval 2445, the first electronic device 302 may transmit a PHY change inquiry (PHY Change?) packet 2425 to inquire whether the second electronic device 304 supports the CIS PHY change function, and the second electronic device 304 may transmit a PHY change inquiry (OK PHY Change?) packet 2430 within the connection interval 2400. The first electronic device 302 may transmit an OK packet 2435 in response to the PHY change inquiry packet 2430, and the second electronic device 304 may transmit an ACK packet 2440 in response to the PHY change inquiry packet 2425. The OK packet 2435 and the ACK packet 2440, respectively, may indicate that the first electronic device 302 and the second electronic device 304 support AoBLE and PHY change policies.

FIG. 25 is a view illustrating an example procedure for negotiating a PHY change policy according to an embodiment. The procedure illustrated in an embodiment may correspond to operation 1965 of FIG. 19B and operation 2060 of FIG. 20B.

Referring to FIG. 25, the first electronic device 302 may transmit a change request packet 2505, e.g., a PHY CHANGE POLICY REQ packet, within the connection interval 2500 and may receive an ACK packet 2510 from the second electronic device 304. In an embodiment, the change request packet 2505 may include a PHY change policy desired to be negotiated by the first electronic device 302. In the illustrated example, the PHY change policy may include {NSE 1→LE 2M, NSE 2→LE 1M, and NSE 3→Coded S=8}. The PHY change policy may indicate that LE 2M is used in the CIS subevent of NSE 1, LE 1M is used in the CIS subevent of NSE 2, and Coded PHY with S=8 is used in the CIS subevent of NSE 3 in each CIS event. In an embodiment, the change request packet 2505 may further include information about the time (e.g., the specific CIS event or the specific connection interval) when the PHY change policy is configured and/or applied.

Within the next connection interval 2530, the second electronic device 304 may transmit a change response packet indicating that the PHY change policy is accepted, e.g., a PHY CHANGE POLICY RSP packet 2515, and the first electronic device 302 may respond with an ACK packet 2525. Thereafter, the first electronic device 302 and the second electronic device 304 may perform the audio service according to the PHY change policy in the PHY CHANGE POLICY REQ packet 2505.

In an embodiment, the first electronic device 302 and the second electronic device 304 may determine the PHY change policy that prioritizes the bit rate. In an embodiment, for a high bit rate, the first electronic device 302 and the second electronic device 304 may determine a PHY change policy that preferentially uses a PHY having a highest bit rate and sequentially uses PHYs having a low bit rate from a specific retransmission time thereafter. For example, in the CIS link of BN=1, NSE=4, and FT=1, the first electronic device 302 may transmit audio data through LE HR 8M during the first subevent and may not receive ACK. Then, the first electronic device 302 may transmit audio data through the LE HR 4M in the second subevent according to the agreed-on PHY change policy. If ACK is not received afterwards, the first electronic device 302 may transmit audio data through LE 2M in the third subevent according to the PHY change policy. Likewise, in subsequent retransmissions, the PHY change policy may sequentially indicate LE 1M for the fourth subevent and flush for the fifth subevent.

Figure 26:
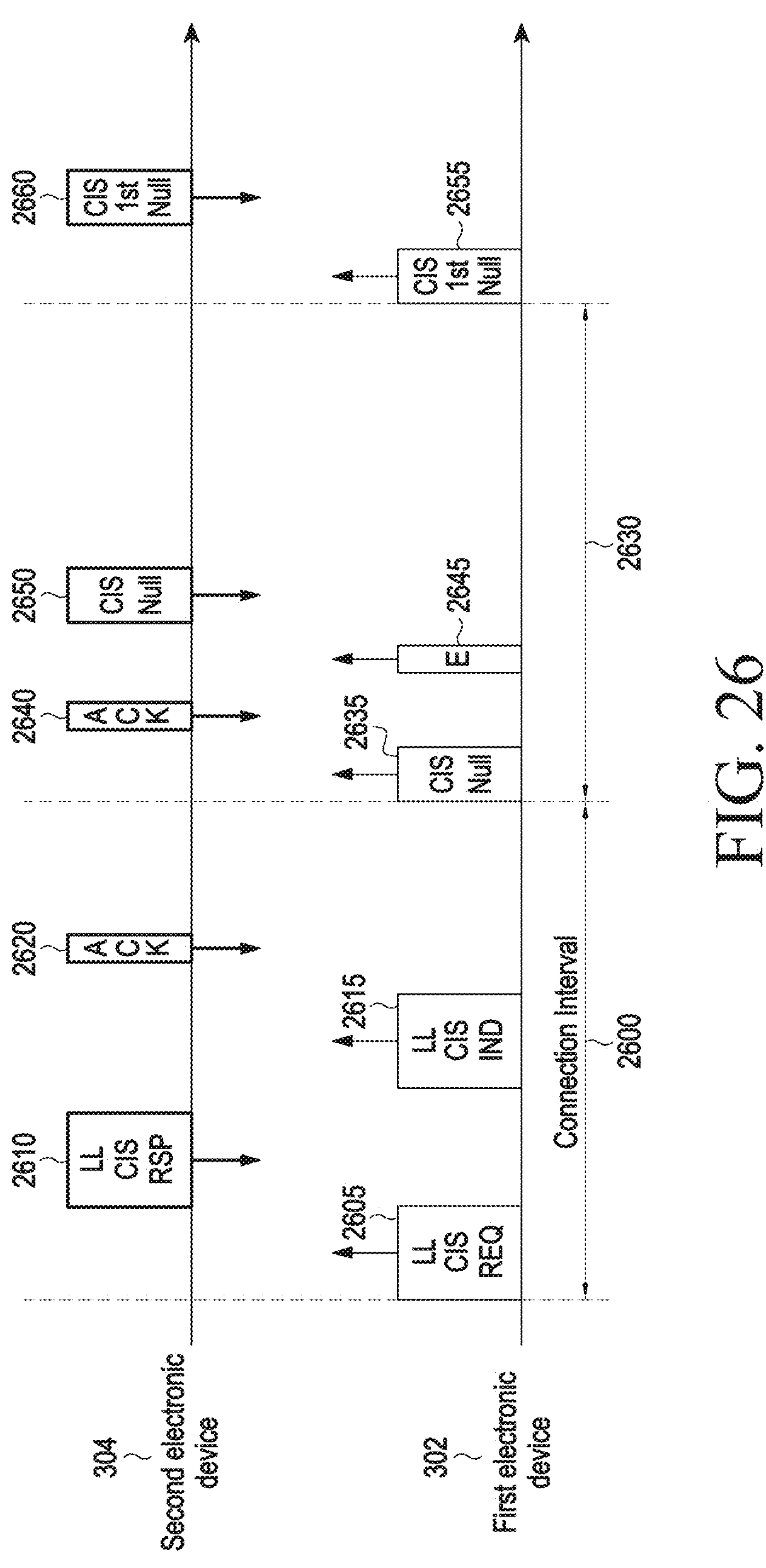
FIG. 26 is a view illustrating a procedure for starting an audio service through a CIS link at the request of a first electronic device according to an example embodiment.

FIG. 26 is a view illustrating a procedure for starting an audio service through a CIS link at the request of a first electronic device 302 according to an embodiment. In an embodiment, the illustrated procedure may correspond to operation 1935 of FIG. 19A and operation 2035 of FIG. 20A.

Referring to FIG. 26, the first electronic device 302 may transmit an LL_CIS_REQ packet 2605 for creating an AoBLE CIS link to the second electronic device 304 (e.g., the first earbud 202 or the second earbud 204) during the connection interval 2600 of the BLE communication link. In an embodiment, the LL_CIS_REQ packet 2605 may include the parameters of FIG. 13. Within the connection interval 2600, the second electronic device 304 may transmit the LL_CIS_RSP packet 2610, and the first electronic device 302 may start the CIS link by receiving the ACK packet 2620 from the second electronic device 304 after transmitting the LL_CIS_IND packet 2615.

At the next connection interval 2630, the first electronic device 302 may transmit the CIS null packet 2635 and may receive the ACK packet 2640 from the second electronic device 304. The second electronic device 304 may transmit the CIS null packet 2650 to the first electronic device 302 after receiving the E packet 2645 from the first electronic device 302. The CIS null packets 2635 and 2650 may be used when there is no data to be transmitted on the CIS link after the CIS link is started. When there is no data to be transmitted at the next connection interval, the first electronic device 302 and the second electronic device 304 may similarly exchange the CIS null packets 2655 and 2660.

Figure 27:
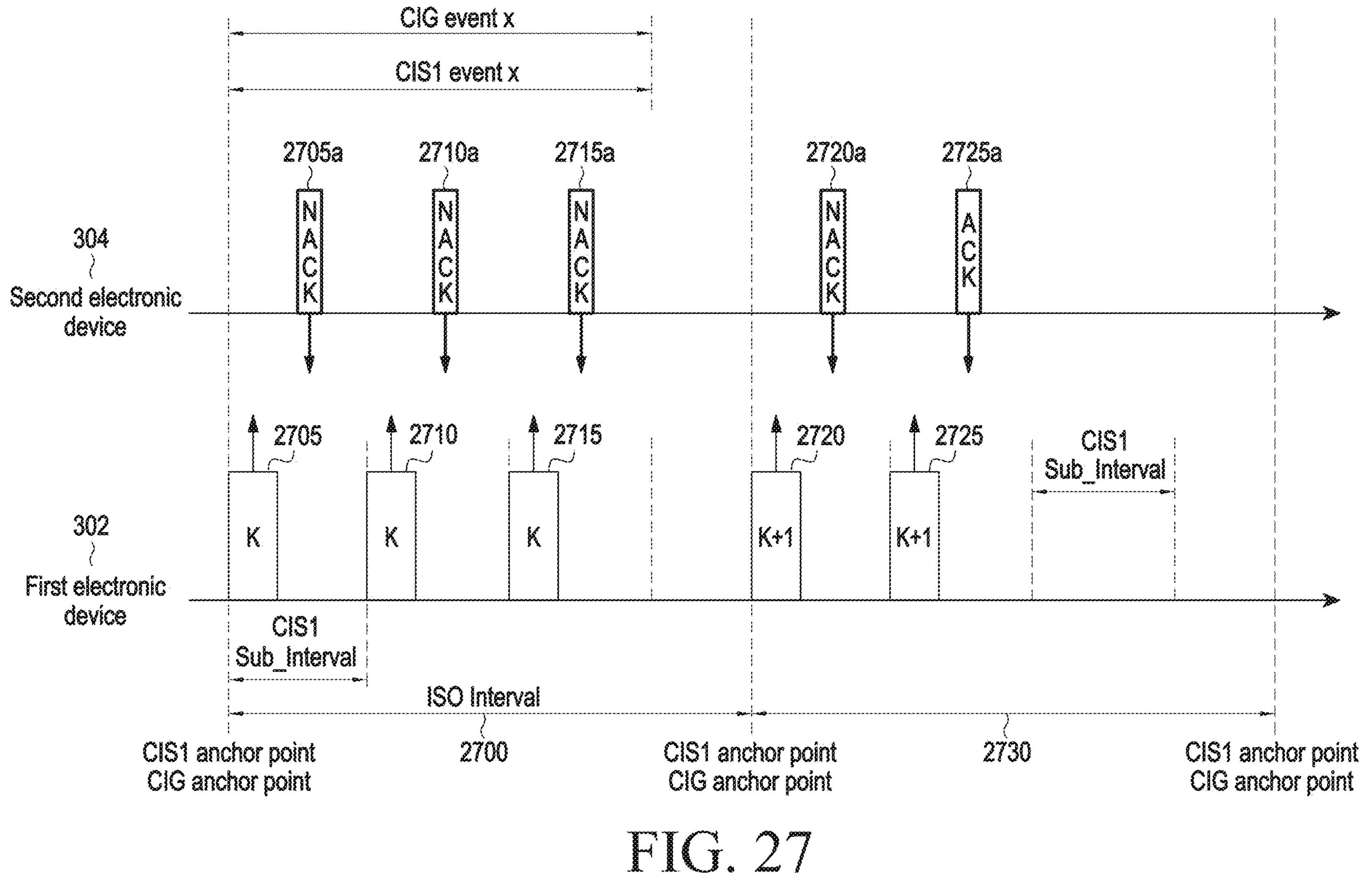
FIG. 27 is a view illustrating an example audio service through a CIS link according to an example embodiment.

FIG. 27 is a view illustrating an example audio service through a CIS link according to an embodiment. Here, the CIS link of BN=1, NSE=3, and FT=1 is shown. In an embodiment, the illustrated procedure may correspond to operation 1950 of FIG. 19A and operation 2050 of FIG. 20A.

Referring to FIG. 27, within an ISO interval 2700 (e.g., CIS 1 event x of CIG event x) for a CIS link between the first electronic device 302 and the second electronic device 304, the first electronic device 302 may transmit audio packets 2705, 2710, and 2715 having the same SN=K in three CIS subevents according to NSE=3. The audio packets 2705, 2710, and 2715 may be transmitted at intervals of CSI1 Sub_interval. When the NACKs 2705*a*, 2710*a*, and 2715*a* are received for all three audio packets 2705, 2710, and 2715, the first electronic device 302 may flush the audio packet of SN=K and may start transmitting the audio packets 2720 and 2725 of SN=K+1 at the next ISO interval. When the NACK 2720*a* is received for the first audio packet 2720 of SN=K+1 and the ACK 2725*a* is received for the second audio packet 2725 of SN=K+1, retransmission of the data of SN=K+1 may be terminated within the corresponding ISO interval. While the PHY change policy is not applied, the audio packets 2705, 2710, and 2715 and the audio packets 2720 and 2725 may be transmitted using the same PHY (e.g., LE 2M).

Figure 28:
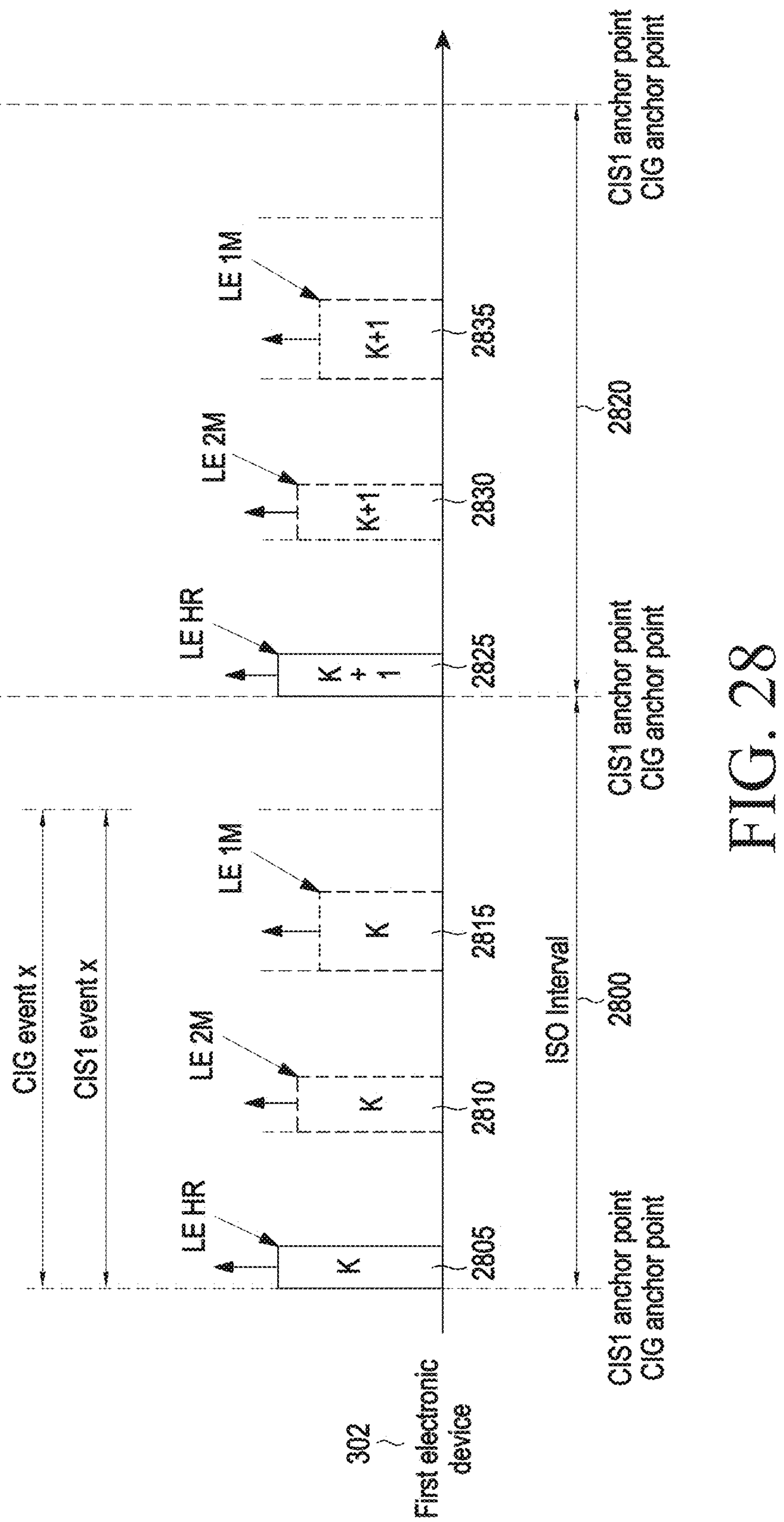
FIG. 28 is a view illustrating an example audio service according to a PHY change policy according to an example embodiment.

FIG. 28 is a view illustrating an example audio service according to a PHY change policy according to an embodiment. In an embodiment, the illustrated procedure may correspond to operation 1940 and operation 1945 of FIG. 19A and operation 2040 and operation 2045 of FIG. 20A.

Referring to FIG. 28, when performing an audio service through a CIS link, the first electronic device 302 and the second electronic device 304 may transmit and receive audio data while changing and configuring a PHY according to a PHY change policy shared therebetween. In an embodiment, within one ISO interval 2800, the PHY change policy may be to use LE HR in a first subevent, use LE 2M in a second subevent, and use LE 1M in a third subevent.

According to the PHY change policy, the first electronic device 302 may transmit an audio packet 2805 including audio data of SN=K generated using LE HR in the first subevent. The second electronic device 304 may receive the audio packet 2805 received in the first subevent using LE HR. Although not shown, when the successful reception of the audio packet 2805 fails, the second electronic device 304 may request retransmission from the first electronic device 302 by transmitting a NACK or by transmitting no packet.

The first electronic device 302 may transmit an audio packet 2810 including audio data of SN=K generated using LE 2M in the second subevent, and may transmit an audio packet 2815 including audio data of SN=K generated using LE 1M in the third subevent when retransmission is required. According to the PHY change policy, the second electronic device 304 may decode the audio packet 2810 of the second subevent using LE 2M, and may decode the audio packet 2815 of the third subevent using LE 1M.

Likewise, in the next ISO interval 2820, LE HR, LE 2M, and LE 1M may be sequentially used for each subevent. For example, in the first subevent within the ISO interval 2820, the audio packet 2825 may be transmitted using LE HR, in the second subevent, the audio packet 2830 may be transmitted using LE 2M, and in the third subevent, the audio packet 2835 may be transmitted using LE 1M.

Although FIG. 28 illustrates that different PHYs are used for retransmissions of audio packets 2805, 2810, and 2815 of the same SN according to a PHY change policy, different PHYs may also be used for audio packets of different SNs within one ISO interval according to a PHY change policy shared between the first electronic device 302 and the second electronic device 304.

Figure 29:
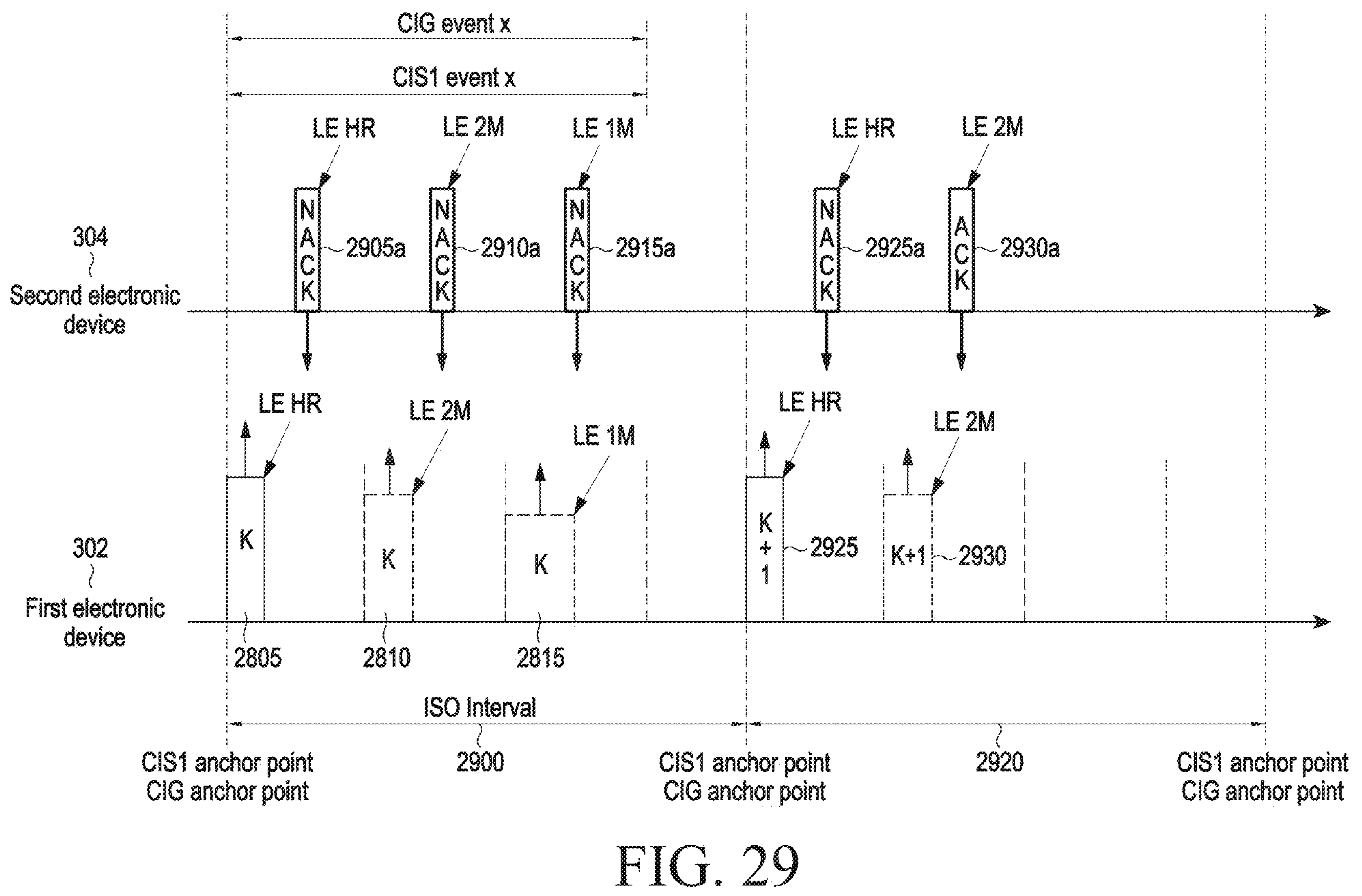
FIG. 29 is a view illustrating another example audio service according to a PHY change policy according to an example embodiment.

FIG. 29 is a view illustrating another example audio service according to a PHY change policy according to an embodiment. In an embodiment, the illustrated procedure may correspond to operation 1940 and operation 1945 of FIG. 19A and operation 2040 and operation 2045 of FIG. 20A.

Referring to FIG. 29, the PHY change policy shared between the first electronic device 302 and the second electronic device 304 may indicate different PHYs for each subevent, e.g., LE HR, LE 2M, and LE 1M.

According to an embodiment, within the ISO interval 2900 (e.g., CIS 1 event x of CIG event x) for the CIS link between the first electronic device 302 and the second electronic device 304, the first electronic device 304 may transmit the audio packet 2905 of SN=K using LE HR in the first subevent. The second electronic device 302 may receive the audio packet 2905 using the LE HR, and may transmit the NACK packet 2905*a* when successful reception fails. In an embodiment, the NACK packet 2905*a* may be transmitted using the LE HR.

According to the PHY change policy, the audio packet 2910 of SN=K in the second subevent may be transmitted using LE 2M. Similarly, the NACK packet 2910*a* corresponding to the audio packet 2910 may be transmitted using LE 2M.

According to the PHY change policy, the audio packet 2915 of SN=K in the third subevent may be transmitted using LE 1M. Similarly, the NACK packet 2915*a* corresponding to the audio packet 2915 may be transmitted using LE 1M.

In the first subevent of the next ISO interval 2920, the new audio packet 2925 of SN=K+1 may be transmitted using the LE HR, and the NACK packet 2925*a* may be transmitted using the LE HR. In the second subevent, the audio packet 2930 of SN=K+1 may be transmitted using LE 2M, and the ACK packet 2930*a* may be transmitted using LE 2M. The retransmission of the audio data of SN=K+1 may be terminated according to the reception of the ACK packet 2930*a*.

Figure 30:
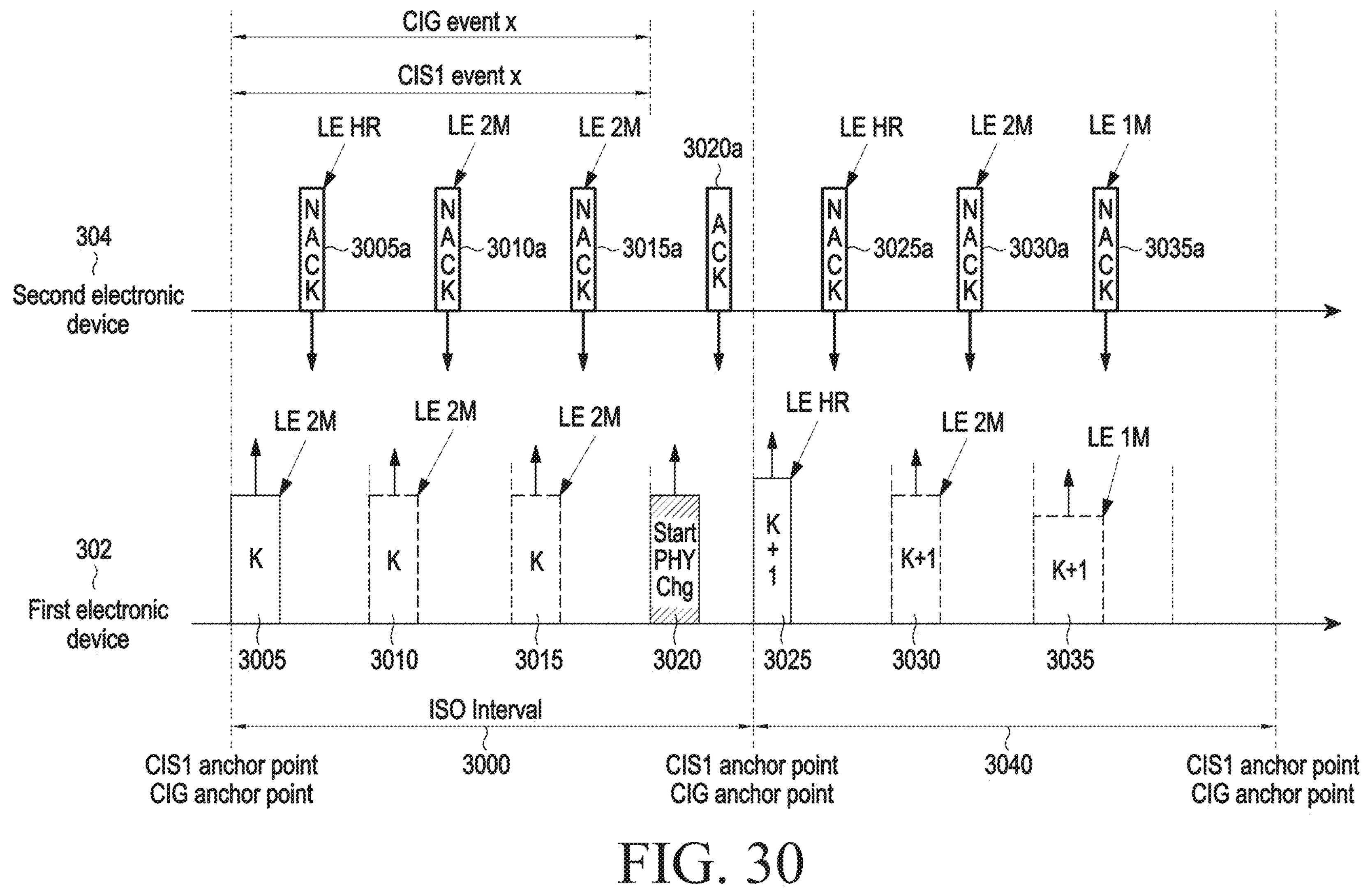
FIG. 30 is a view illustrating an example procedure for changing a PHY change policy during an audio service according to an example embodiment.

FIG. 30 is a view illustrating an example procedure for changing a PHY change policy during an audio service according to an embodiment.

Referring to FIG. 30, within an ISO interval 3000 for a CIS link between the first electronic device 302 and the second electronic device 304, the first electronic device 302 and the second electronic device 304 may communicate using a fixed PHY, e.g., LE 2M, without a PHY change policy. The procedure illustrated in an embodiment may correspond to FIGS. 19B and 20B.

Within the ISO interval 3000 (e.g., CIS 1 event x of CIG event x), the first electronic device 302 may transmit the audio packet 305 of SN=K using LE 2M in the first subevent, and the second electronic device 304 may transmit the NACK packet 305*a* using LE 2M. When the NACK packet 305*a* is received, the first electronic device 302 may transmit the SN=K audio packet 3010 using LE 2M in the second subevent, and the second electronic device 304 may transmit the NACK packet 3010*a* using LE 2M. When the NACK packet 3010*a* is received, the first electronic device 302 may transmit the SN=K audio packet 3015 using LE 2M in the third subevent, and the second electronic device 304 may transmit the NACK packet 3015*a* using LE 2M.

After transmitting the audio packet 3015 of SN=K, the first electronic device 302 may transmit a change start packet 3020 (e.g., a Start_PHY_Chg packet) for requesting a PHY change policy. In an embodiment, the change start packet 3020 may be transmitted through the ACL link. In an embodiment, the change start packet 3020 may be transmitted using at least one subevent on the CIS link. In an embodiment, the first electronic device 302 may detect deterioration of the wireless environment and may determine to apply the PHY change policy according to consecutive transmission failures of the audio packets 305, 3010, and 3015. In an embodiment, the first electronic device 302 may determine that a PHY change policy is required due to various factors such as a wireless congestion situation due to wireless interference or detection of a weak electric field due to a physical distance.

In an embodiment, the PHY change policy may be determined according to at least one of the Bluetooth version, the vendor, or the sub-version of the first electronic device 302 and the second electronic device 304. In an embodiment, the PHY change policy may be determined according to determination from the first electronic device 302. In an embodiment, the change start packet 3020 may include the PHY change policy required by the first electronic device 302. When the ACK packet 3020*a* responding to the change start packet 3020 is received from the second electronic device 304, the first electronic device 302 may determine to apply the PHY change policy from the next ISO interval 3040.

In an embodiment, the PHY change policy may indicate a change order of PHYS, e.g., LE HR, LE 2M, and LE 1M. In an embodiment, the change start packet 3020 may further include information about the time (e.g., the specific CIS subevent, the specific CIS event, or the specific ISO interval) when the PHY change policy is configured and/or applied. When the information about the time is not included, the first electronic device 302 and the second electronic device 304 may regard it as applying the PHY change policy at the next ISO interval 3040.

In the first subevent within the next ISO interval 3040, the first electronic device 302 may transmit the audio packet 3025 of SN=K+1 using the LE HR according to the PHY change policy. The second electronic device 304 may receive the audio packet 3025 using LE HR according to the PHY change policy. When failing to successfully receive the audio packet 3025, the second electronic device 304 may transmit the NACK packet 3025*a*. When the NACK packet 3025*a* is received, the audio packet 3030 of SN=K+1 in the second subevent may be transmitted using LE 2M according to the PHY change policy. Similarly, the second electronic device 304 may receive the audio packet 3030 using LE 2M according to the PHY change policy. When the reception of the audio packet 3030 fails, the second electronic device 304 may transmit the NACK packet 3030*a*. In the third subevent, the audio packet 3035 of SN=K+1 may be transmitted using LE 1M according to the PHY change policy. Similarly, the second electronic device 304 may receive the audio packet 3035 using LE 1M according to the PHY change policy. When the reception of the audio packet 3035 fails, the second electronic device 304 may transmit the NACK packet 3035*a*, and the first electronic device 302 may flush the audio data of SN=K+1.

Here, an example in which the first electronic device 302 transmits the change start packet 3020 is illustrated, but in another embodiment (not illustrated), the second electronic device 304 may transmit a change start packet (which may have the same or similar format as, e.g., the change start packet 3020) including a new PHY change policy. The change start packet may be transmitted through the ACL link or may be transmitted in at least one subevent on the CIS link. Then, as the first electronic device 302 transmits a response packet (which may be similar to, e.g., the response packet 3020*a*) indicating acceptance of the new PHY change policy, an audio service to which the new PHY change policy is applied may be performed from a next ISO interval.

Figure 31:
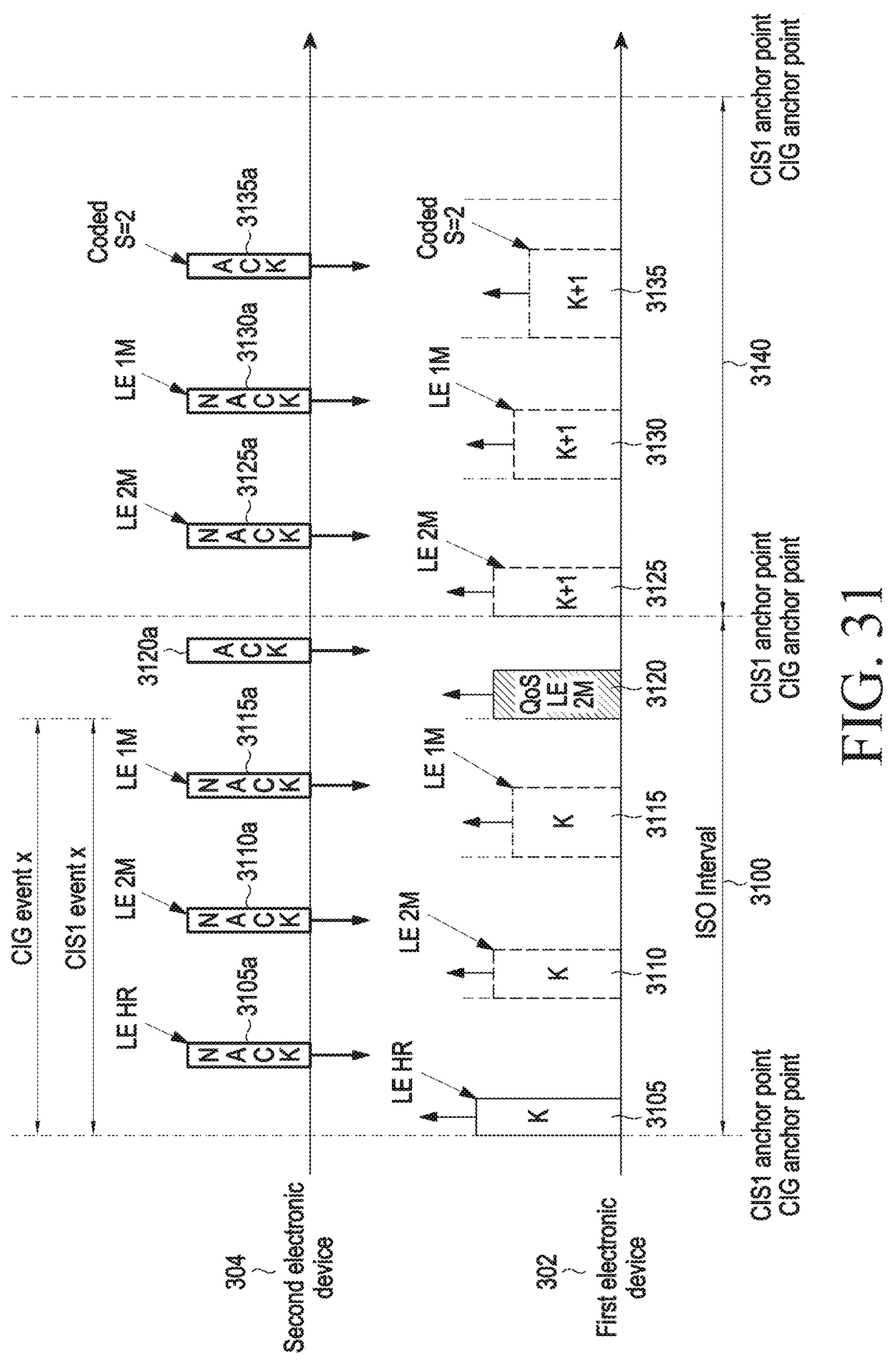
FIG. 31 is a view illustrating an example PHY change policy according to quality of service (QOS) according to an example embodiment.

FIG. 31 is a view illustrating an example PHY change policy according to quality of service (QOS) according to an embodiment. The procedure illustrated in an embodiment may correspond to FIGS. 19B and 20B.

Referring to FIG. 31, within an ISO interval 3100 for a CIS link between the first electronic device 302 and the second electronic device 304, the first electronic device 302 and the second electronic device 304 may sequentially use LE HR, LE 2M, and LE 1M according to a first PHY change policy shared therebetween. In the first subevent within the ISO interval 3100 (e.g., CIS 1 event x of CIG event x), the audio packet 3105 of SN=K may be transmitted using LE HR, and the NACK packet 3105*a* may be transmitted using LE HR. In the second subevent, the audio packet 3110 of SN=K may be transmitted using LE 2M, and the NACK packet 3110*a* may be transmitted using LE 2M. In the third subevent, the audio packet 3115 of SN=K may be transmitted using LE 1M, and the NACK packet 3115*a* may be transmitted using LE 1M.

In the fourth subevent within the ISO interval 3100, the first electronic device 302 may transmit a change request packet 3120 (e.g., a QoS_LE_2M packet) for requesting to change the PHY having the maximum speed among the first PHY change policies according to monitoring of the surrounding wireless environment. In an embodiment, the first electronic device 302 may determine to change the PHY having the maximum speed to LE 2M according to deterioration of the wireless environment, and may request the second PHY change policy through the change request packet 3120. In an embodiment, the change request packet 3120 may further include information about the time (e.g., the specific CIS event or the specific ISO interval) when the PHY change policy is configured and/or applied.

In an embodiment, the change request packet 3120 may include a second PHY change policy, and the second PHY change policy may indicate a new change order of PHYS, e.g., LE 2M, LE 1M, and Coded PHY with S=2. In an embodiment, the change request packet 3120 may include information requesting to decrease the PHY (e.g., LE HR) of the maximum speed of the first PHY change policy by step N (e.g., by one step or to LE 2M). In another embodiment, the change request packet 3120 may include information requesting to increase the PHY having the maximum speed of the first PHY change policy by step N (e.g., by one step or to a specific PHY). In embodiments of the disclosure, the change request packet 3120 may indicate a new PHY change policy in various ways.

When the ACK packet 3120*a* responding to the change request packet 3120 is received from the second electronic device 304, the first electronic device 302 may determine to apply the second PHY change policy according to the change request packet 3120 from the next ISO interval 3140. In an embodiment, the second PHY change policy may sequentially indicate LE 2M, LE 1M, and Coded PHY with S=2.

In the first subevent within the next ISO interval 3140, the first electronic device 302 may transmit the audio packet 3125 of SN=K+1 using LE 2M according to the second PHY change policy. The second electronic device 304 may receive the audio packet 3125 using LE 2M according to the second PHY change policy. When the reception of the audio packet 3125 fails, the second electronic device 304 may transmit the NACK packet 3125*a* using LE 2M. When the NACK packet 3125*a* is received, the audio packet 3130 of SN=K+1 in the second subevent may be transmitted using LE 1M according to the second PHY change policy. Similarly, the second electronic device 304 may receive the audio packet 3130 using LE 1M according to the second PHY change policy. When the reception of the audio packet 3130 fails, the second electronic device 304 may transmit the NACK packet 3130*a* using LE 1M.

In the third subevent, the audio packet 3135 of SN=K+1 may be transmitted using Coded PHY with S=2 according to the second PHY change policy. Similarly, the second electronic device 304 may receive the audio packet 3135 using the coded PHY with S=2 according to the second PHY change policy. When receiving the audio packet 3135 is successful, the second electronic device 304 may transmit the ACK packet 3135*a* using Coded PHY with S=2, and the first electronic device 302 may flush the audio data of SN=K+1.

Here, an example in which the first electronic device 302 transmits the change request packet 3120 is illustrated, but in another embodiment (not illustrated), the second electronic device 304 may transmit a change request packet (which may have the same or similar format as, e.g., the change request packet 3120) indicating a new PHY change policy. The change start packet may be transmitted through the ACL link or may be transmitted in at least one subevent on the CIS link. Then, as the first electronic device 302 transmits a response packet (which may be similar to, e.g., the response packet 3120*a*) indicating acceptance of the new PHY change policy, an audio service to which the new PHY change policy is applied may be performed from a next ISO interval.

In an embodiment, the PHY change policy may indicate to change not only the PHY but also other communication parameters (e.g., at least one of the transmission path, the subevent length, or the data size) according to a given time interval (e.g., at least one ISO interval, at least one CIS event, or at least one CIS subevent).

Figure 32:
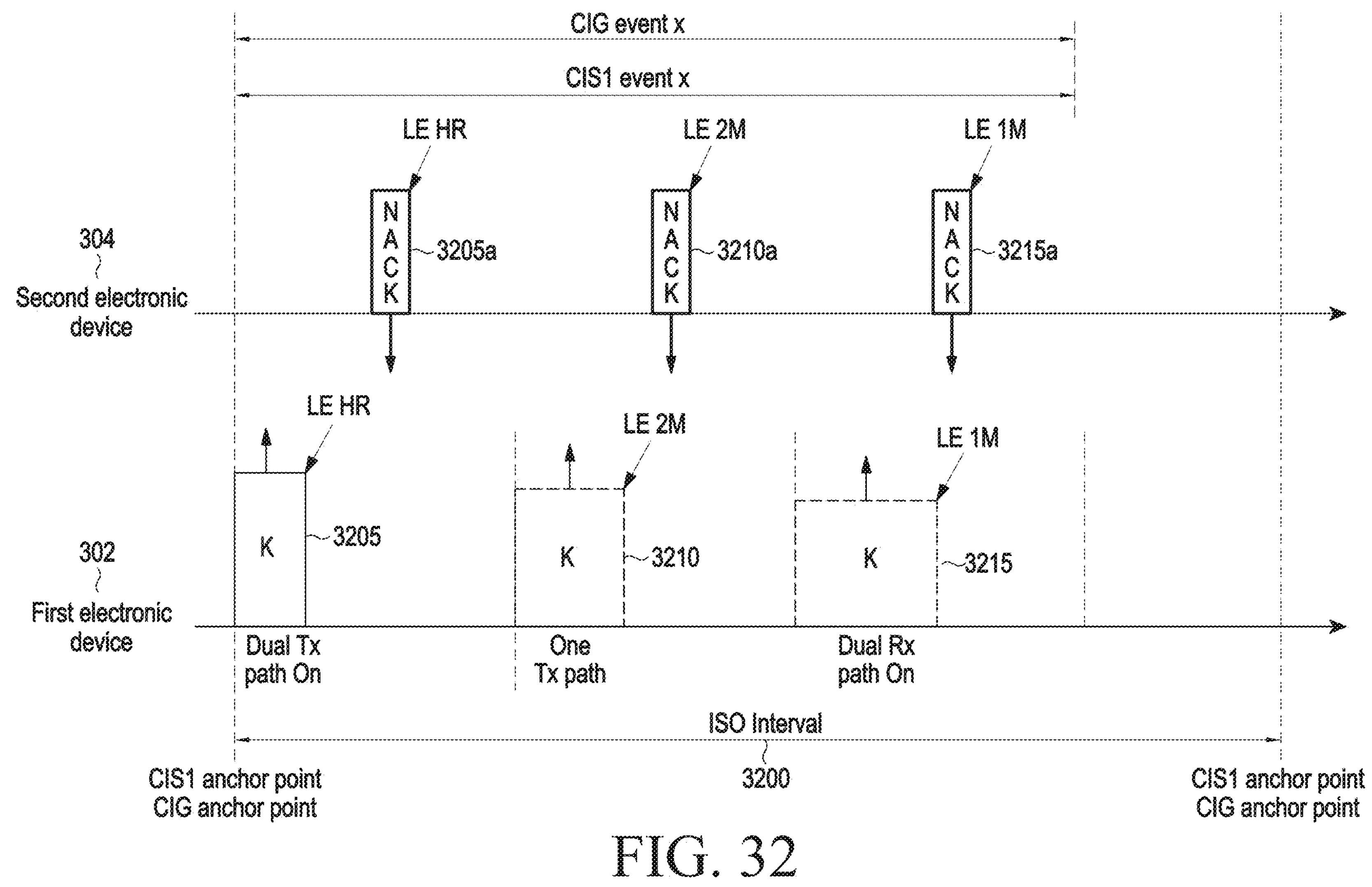
FIG. 32 is a view illustrating an example procedure for changing a PHY and transmission path according to an example embodiment.

FIG. 32 is a view illustrating an example procedure for changing a PHY and transmission path according to an embodiment.

Referring to FIG. 32, the PHY change policy shared between the first electronic device 302 and the second electronic device 304 may indicate a PHY and a transmission path for each subevent. In the illustrated example, the PHY change policy may indicate [LE HR, Dual Tx path On], [LE 2M, One Tx path], and [LE 1M, Dual Rx path On]. In another embodiment, the PHY change policy may indicate the same PHY and different transmission paths for each subevent, e.g., [Dual Tx path On], [One Tx path], and [Dual Rx path On].

According to an embodiment, within the ISO interval 3200 (e.g., CIS 1 event x of CIG event x) for the CIS link between the first electronic device 302 and the second electronic device 304, the first electronic device 302 may transmit the audio packet 3205 of SN=K using the dual Tx path and the LE HR in the first subevent. The NACK packet 3205*a* corresponding to the audio packet 3205 may be transmitted using LE HR. In the second subevent, the first electronic device 302 may transmit an audio packet 3210 of SN=K using LE 2M and the single Tx path. The NACK packet 3210*a* corresponding to the audio packet 3210 may be transmitted using LE 2M. In the third subevent, the first electronic device 302 may transmit the audio packet 3215 of SN=K using the dual reception path and LE 1M. The NACK packet 3215*a* corresponding to the audio packet 3215 may be transmitted using LE 1M.

Figure 33:
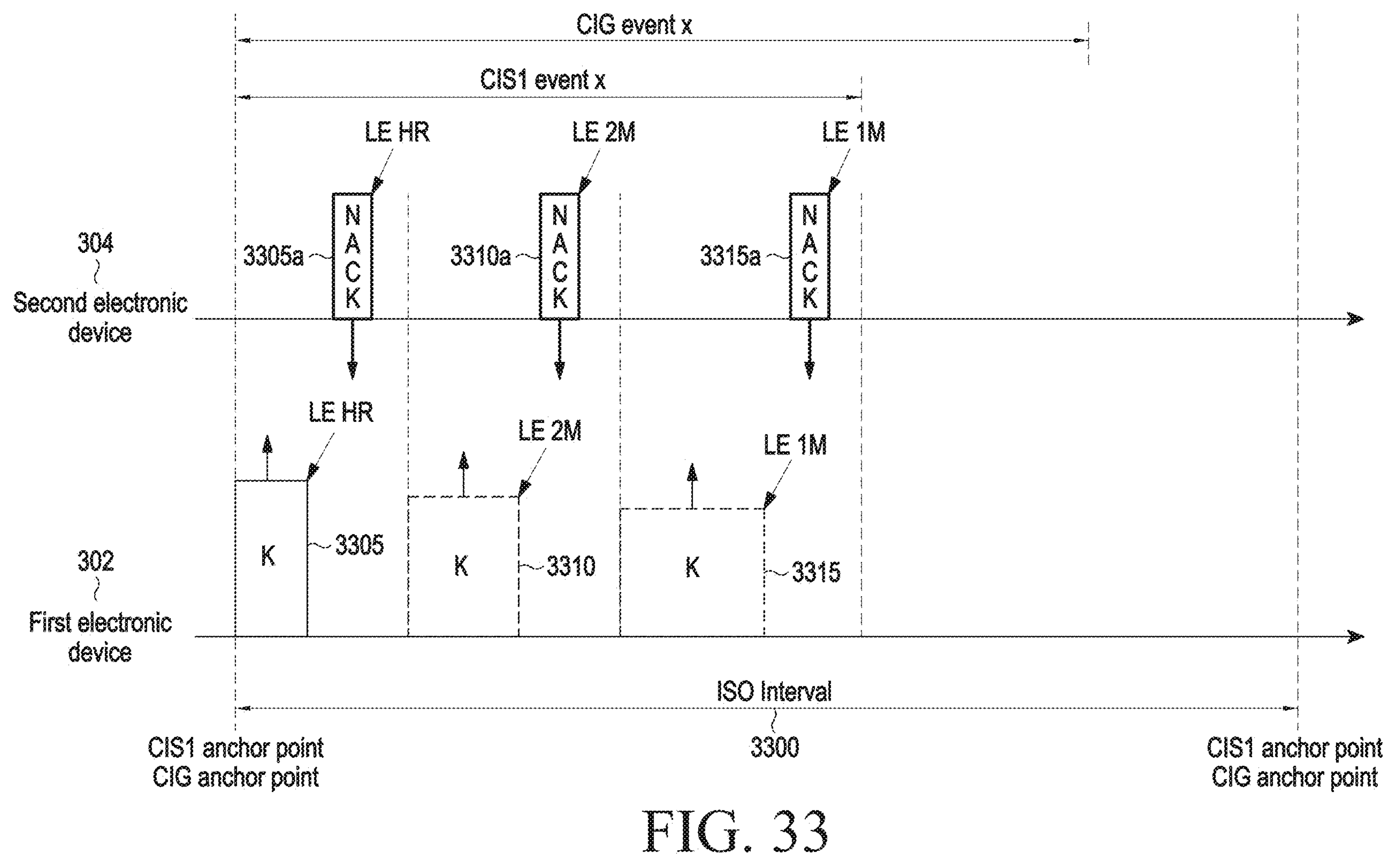
FIG. 33 is a view illustrating an example procedure for changing a PHY and communication parameter according to an example embodiment.

FIG. 33 is a view illustrating an example procedure for changing a PHY and communication parameter according to an embodiment.

Referring to FIG. 33, the PHY change policy shared between the first electronic device 302 and the second electronic device 304 may indicate PHY and communication parameter(s) (e.g., subevent length SE_Length) for each subevent. In the illustrated example, the PHY change policy may indicate [LE HR, SE_Length=1], [LE 2M, SE_Length=2], and [LE 1M, SE_Length=3]. In another embodiment, the PHY change policy may indicate the same PHY and different communication parameter(s) (e.g., subevent length) for each subevent.

According to an embodiment, within the ISO interval 3300 (e.g., CIS 1 event x of CIG event x) for the CIS link between the first electronic device 302 and the second electronic device 304, the first electronic device 302 may transmit the audio packet 3305 of SN=K using LE HR in the first subevent having a length of SE_Length=1. The NACK packet 3305*a* corresponding to the audio packet 3205 may be transmitted using LE HR in the first subevent. In the second subevent having a length of SE_Length=2, the first electronic device 302 may transmit the audio packet 3310 of SN=K using LE 2M. The NACK packet 3210*a* corresponding to the audio packet 3310 may be transmitted using LE 2M in the second subevent. In the third subevent having a length of SE_Length=3, the first electronic device 302 may transmit the audio packet 3315 of SN=K using LE 1M. The NACK packet 3315*a* corresponding to the audio packet 3315 may be transmitted using LE 1M in the third subevent.

Figure 34:
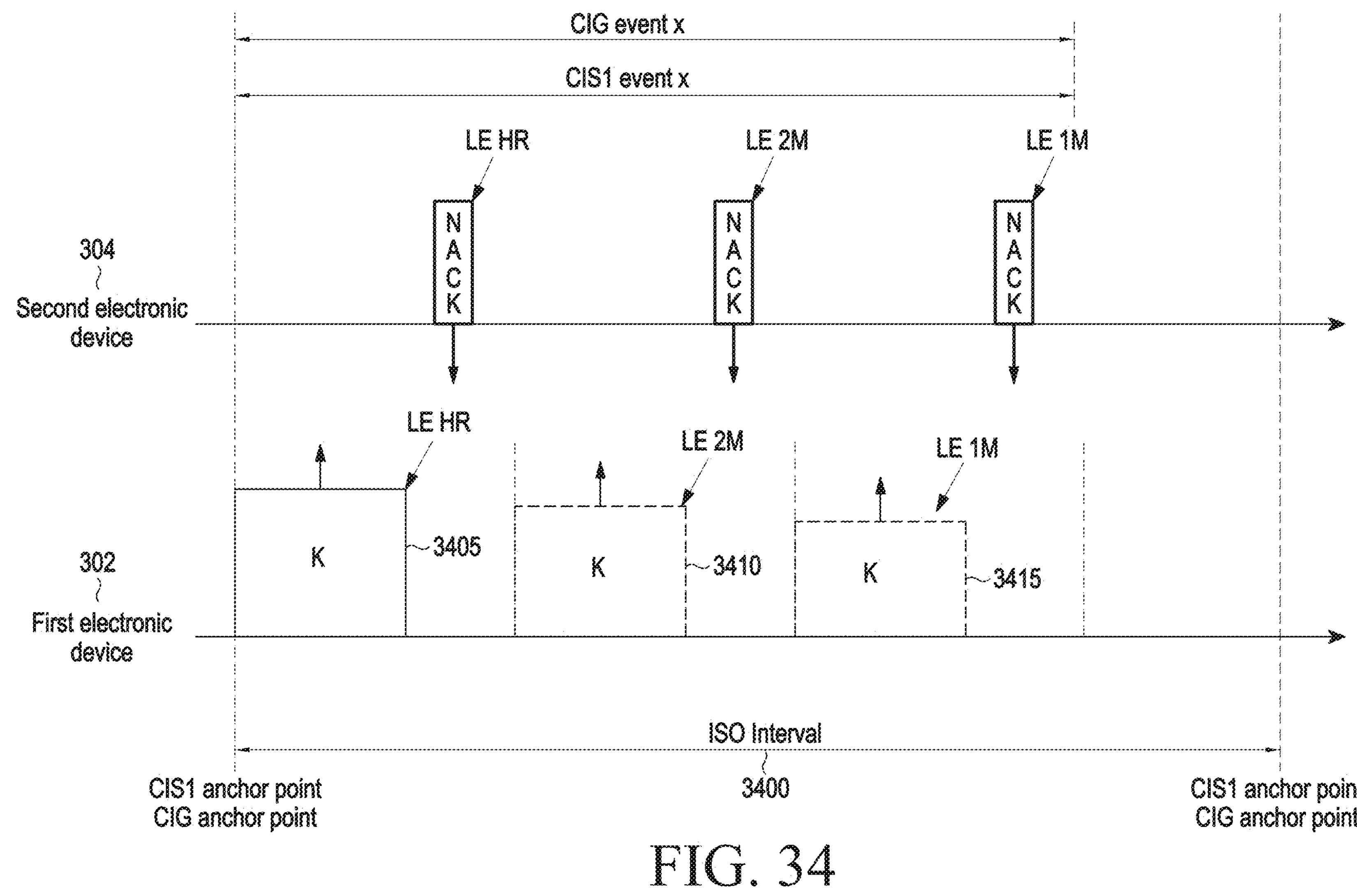
FIG. 34 is a view illustrating an example procedure for changing a PHY and data size according to an example embodiment.

FIG. 34 is a view illustrating an example procedure for changing a PHY and data size according to an embodiment.

Referring to FIG. 34, the PHY change policy shared between the first electronic device 302 and the second electronic device 304 may indicate a PHY and a data transmission rate (e.g., a data size) for each subevent. In the illustrated example, the PHY change policy may indicate [LE HR, Data_Size=1], [LE 2M, Data_Size=2], and [LE 1M, Data_Size=3]. In another embodiment, the PHY change policy may indicate the same PHY and different communication parameter(s) (e.g., data size) for each subevent.

According to the PHY change policy, the first electronic device 302 may transmit audio data for the same purpose at each NSE interval (e.g., a CIS subevent), but may change the size of the audio data for each subevent, thereby changing the data transmission rate. Within the ISO interval 3400 (e.g., CIS1 event x of CIG event x) of the CIS link between the first electronic device 302 and the second electronic device 304, the first electronic device 302 may perform an audio service through the CIS link as BN=1, NSE=3, and FT=1. In the first subevent, the second subevent, and the third subevent within the ISO interval 3400, audio packets 3405, 3410, and 3415 of the same SN (e.g., SN=K) are transmitted, but the audio packets 3405, 3410, and 3415 may include audio data of different sizes according to the PHY change policy. Through the PHY change policy for changing the data size as described above, both a high bit rate and stable data transmission may be achieved.

Figure 35:
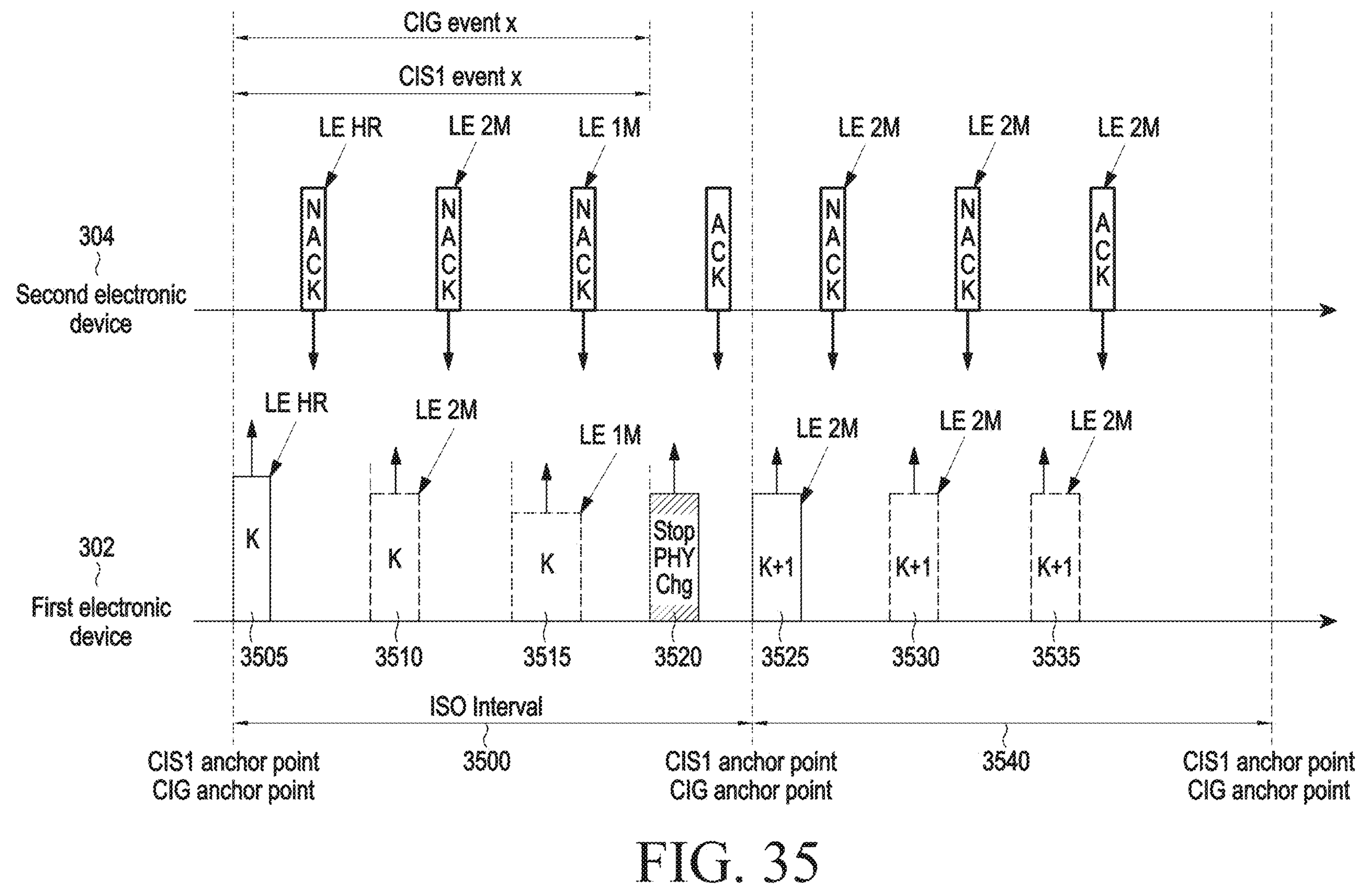
FIG. 35 is a view illustrating a procedure for terminating use of a PHY change policy while performing an audio service according to an example embodiment.

FIG. 35 is a view illustrating a procedure for terminating use of a PHY change policy while performing an audio service according to an embodiment.

Referring to FIG. 35, the PHY change policy shared between the first electronic device 302 and the second electronic device 304 may indicate different PHYs for each subevent, e.g., LE HR, LE 2M, and LE 1M.

Referring to FIG. 35, within an ISO interval 3500 for a CIS link between the first electronic device 302 and the second electronic device 304, the first electronic device 302 and the second electronic device 304 may perform an audio service by sequentially using LE HR, LE 2M, and LE 1M according to a PHY change policy shared therebetween. In the first subevent within the ISO interval 3500 (e.g., CIS 1 event x of CIG event x), the audio packet 3505 of SN=K may be transmitted using LE HR, in the second subevent, the audio packet 3510 of SN=K may be transmitted using LE 2M, and in the third subevent, the audio packet 3515 of SN=K may be transmitted using LE 1M.

In the fourth subevent within the ISO interval 3500, the first electronic device 302 may determine to terminate the CIS PHY change function according to the PHY change policy. In an embodiment, the first electronic device 302 may terminate the CIS PHY change function while the audio service is performed or after the audio service is terminated. To that end, the first electronic device 302 may transmit a termination request packet 3520 (e.g., Stop_PHY_Chg packet) for requesting to terminate the CIS PHY change function. The second electronic device 304 may recognize termination of the CIS PHY change function by receiving the termination request packet 3520. In an embodiment, the termination request packet 3520 may further include information about the time (e.g., the specific CIS event or the specific ISO interval) when the CIS PHY change function is to be terminated. When the termination request packet 3520 does not include the information about the time, the first electronic device 302 and the second electronic device 304 may regard it as termination of the CIS PHY change function at the next ISO interval 3540.

In an embodiment, when the termination request packet 3520 is received before the audio service is terminated, the first electronic device 302 may transmit the audio packets 3025, 3530, and 3535 of SN=K+1 in subevents within the next ISO interval 3540 using the PHY for the CIS link, e.g., LE 2M, before the PHY change policy is applied. The second electronic device 304 may receive the audio packets 3025, 3530, and 3535 using LE 2M.

In an embodiment, the termination request packet 3520 may include information for requesting to use a designated PHY before the audio service is terminated. For example, in the subevents within the next ISO interval 3540, the first electronic device 302 may transmit the audio packets 3025, 3530, and 3535 of SN=K+1 based on the PHY designated in the termination request packet 3520.

Here, an example in which the first electronic device 302 transmits the change request packet 3520 in the fourth subevent is illustrated, but in another embodiment, the second electronic device 304 may transmit the termination request packet for requesting the termination of the CIS PHY change function in any subevent. Then, as the first electronic device 302 transmits the response packet corresponding to the termination request packet, the audio service that does not use the CIS PHY change function may be performed from the next ISO interval.

In an embodiment, the first electronic device 302 and the second electronic device 304 may negotiate the update of the PHY for the CIS link through the BLE communication link (e.g., ACL link) or negotiate the update of the PHY for the CIS link through the CIS link while communicating audio data through the CIS link. In an embodiment, the second electronic device 304 may include a pair of Bluetooth devices (e.g., the first earbud 202 and the second earbud 204). The first electronic device 302 may connect a BLE communication link and a CIS link with the first earbud 202, and may also connect a BLE communication link and a CIS link with the second earbud 204.

Figure 36:
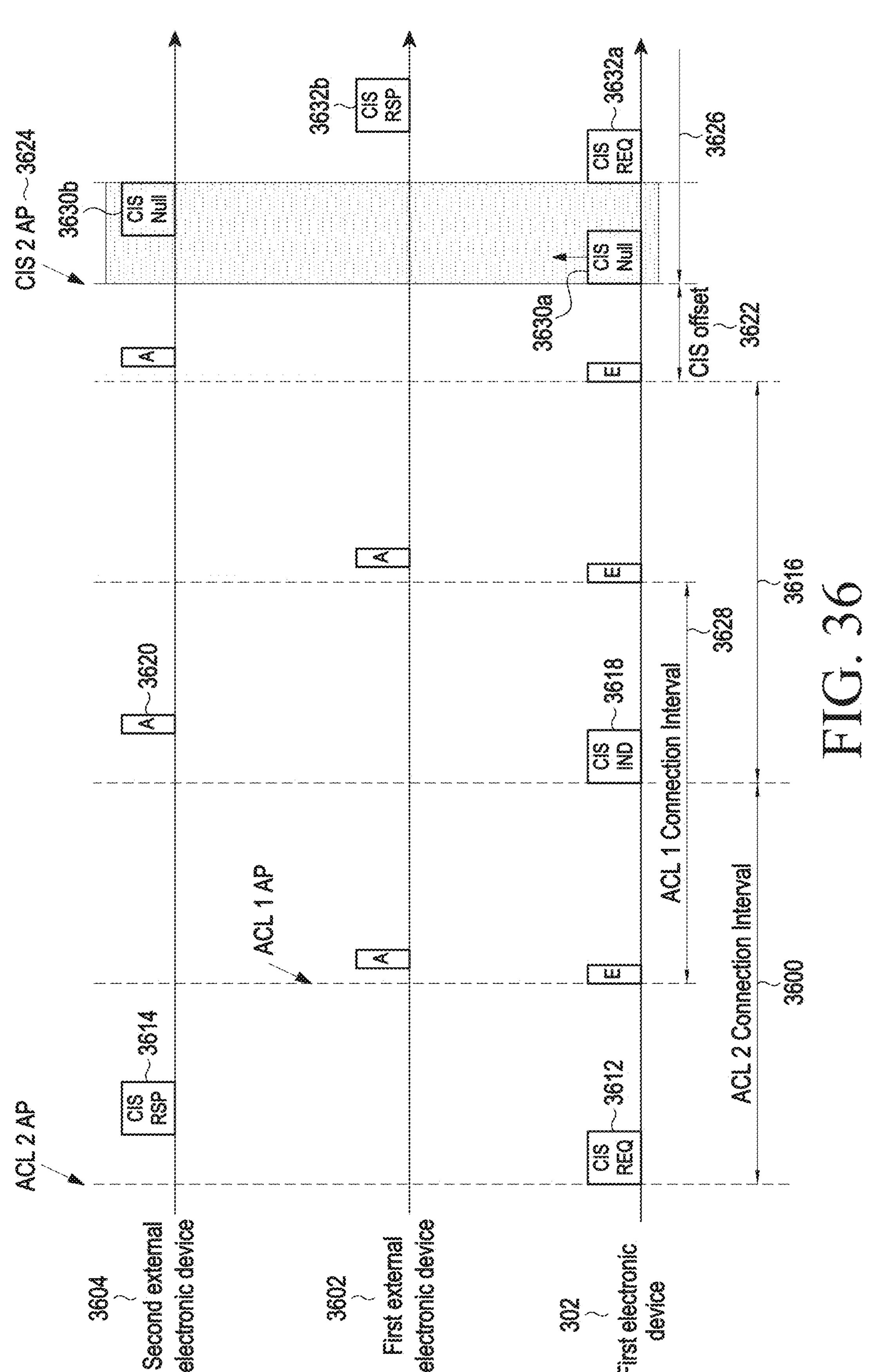
FIG. 36 is a view illustrating a procedure for generating a CIS link through an ACL link according to an example embodiment.

FIG. 36 is a view illustrating a procedure for generating a CIS link through an ACL link according to an embodiment. Here, the first electronic device 302 may communicate with each of a pair of first external electronic device 3602 and second external electronic device 3604 (e.g., the first earbud 202 and the second earbud 204). In an embodiment, the first electronic device 302 may be connected to the first external electronic device 3602 through the first ACL link, and may be connected to the second external electronic device 3604 through the second ACL link.

Referring to FIG. 36, a connection interval (ACL 2 Connection interval) 3600 of the second ACL link may start at an anchor point ACL 2 AP for the second ACL link. Within the connection interval 3600, the first electronic device 302 may transmit a CIS request packet CIS_REQ 3612 for requesting the second external electronic device 3604 to establish a CIS link through the second ACL link. The second external electronic device 3604 may transmit a CIS response packet CIS_RSP 3614 in response to the CSI request packet 3612, to the first electronic device 302 through the second ACL link. At the next connection interval 3616 of the second ACL link, the first electronic device 302 may transmit the CIS indication packet CIS_IND 3618 to the second external electronic device 3604, and may receive the ACK packet A 3620 from the second external electronic device 3604.

The first electronic device 302 may calculate the anchor point CIS 2 AP 3624 for the second CIS link with the second external electronic device 3604, based on the CIS offset 3622 obtained from the CIS indication packet 3618. The anchor point CIS 2 AP 3624 may be a starting point of the ISO interval 3626 for the second CIS link. The first electronic device 302 may exchange the CIS null packets 3630*a* and 3630*b* at the ISO interval 3626 of the second CIS link starting from the CIS 2 AP 3624 and may start CIS communication.

While exchanging packets for establishing the second CIS link between the first electronic device 302 and the second external electronic device 3604, the first electronic device 302 may exchange the null packet E and the response packet A with the first external electronic device 3602 within an ACL 1 connection interval 3628 of the first ACL link. After the CIS null packets 3630*a* and 3630*b* are exchanged through the second CIS link to start the second CIS link, the first electronic device 302 may exchange the CIS_REQ packet 3632*a* and the CIS_RSP packet 3632*b* with the first external electronic device 3602 through the first ACL link to create the first CIS link. Although not shown, similarly, after the CIS_REQ packet 3632*a* and the CIS_RSP packet 3632*b* are exchanged, the CIS 1 AP for the second CIS link may be calculated by CIS_IND (not shown) transmitted by the first electronic device 302, and ISO intervals of the first CIS link may start.

Figure 37:
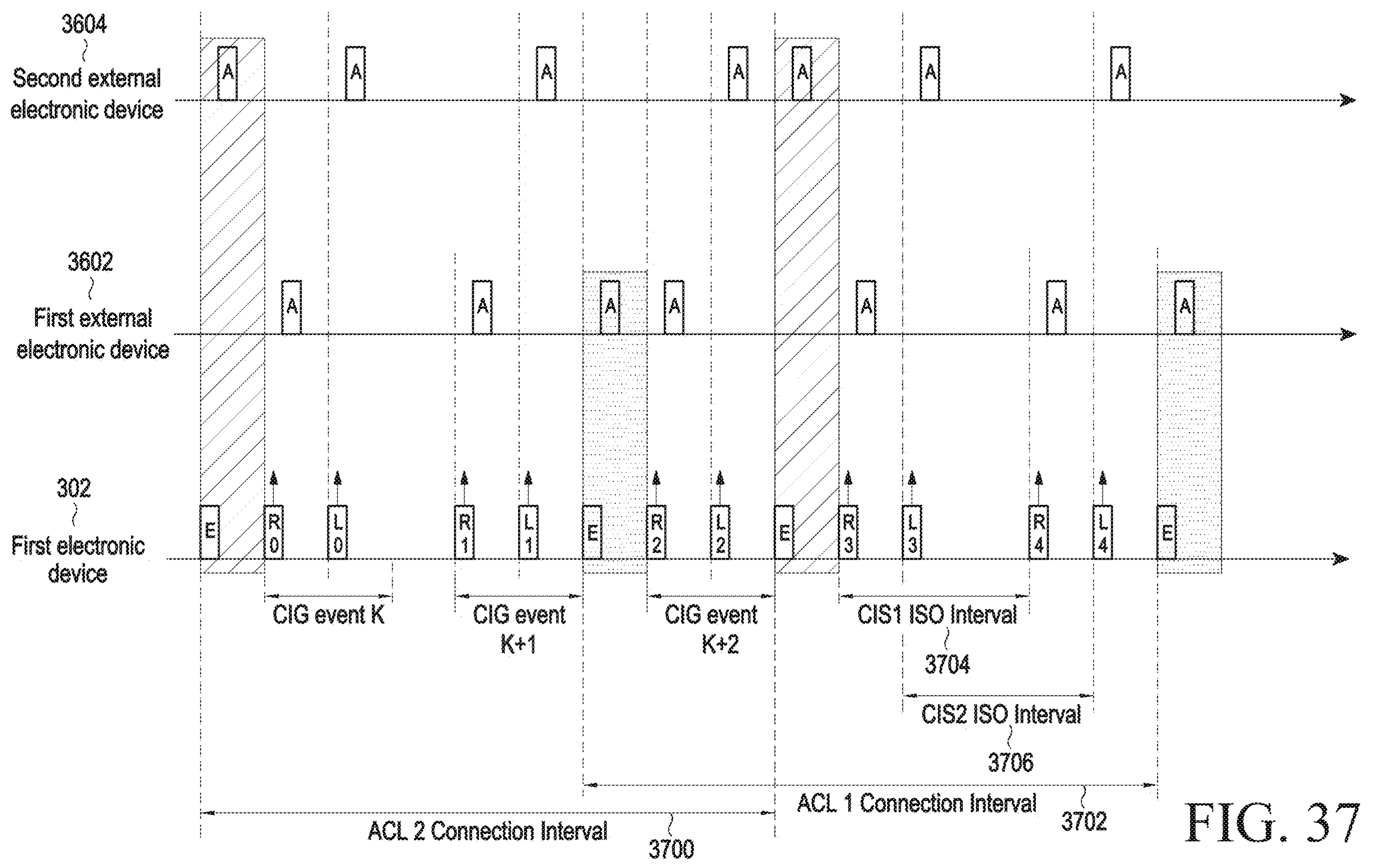
FIG. 37 is a view illustrating a procedure for communicating through two ACL links and two CIS links according to an example embodiment.

FIG. 37 is a view illustrating a procedure for communicating through two ACL links and two CIS links according to an embodiment. In the illustrated example, the first electronic device 302 may be connected to the first external electronic device 3602 through a first ACL link and a first CIS link. Further, the first electronic device 302 may be connected to the second external electronic device 3604 through a second ACL link and a second CIS link.

Referring to FIG. 37, the first electronic device 302 may exchange data packets, e.g., a null (E) packet and an ACK (A) packet, with the second external electronic device 3604 through the second ACL link according to an ACL 2 connection interval 3700 of the second ACL link. The first electronic device 302 may exchange audio packets, e.g., an L0 packet, an L1 packet, an L2 packet, an L3 packet, an LA packet, and ACK(A) packets with the second external electronic device 3604 through the second CIS link according to the ISO interval 3706 of the second CIS link.

The first electronic device 302 may exchange data packets, e.g., a null (E) packet and an ACK (A) packet, with the first external electronic device 3602 through the first ACL link according to an ACL 1 connection interval 3702. The first electronic device 302 may exchange audio packets, e.g., an R0 packet, an R1 packet, an R2 packet, an R3 packet, an R4 packet, and an ACK(A) packet with the first external electronic device 3602 through the first CIS link according to the ISO interval 3704 of the first CIS link.

Figure 38:
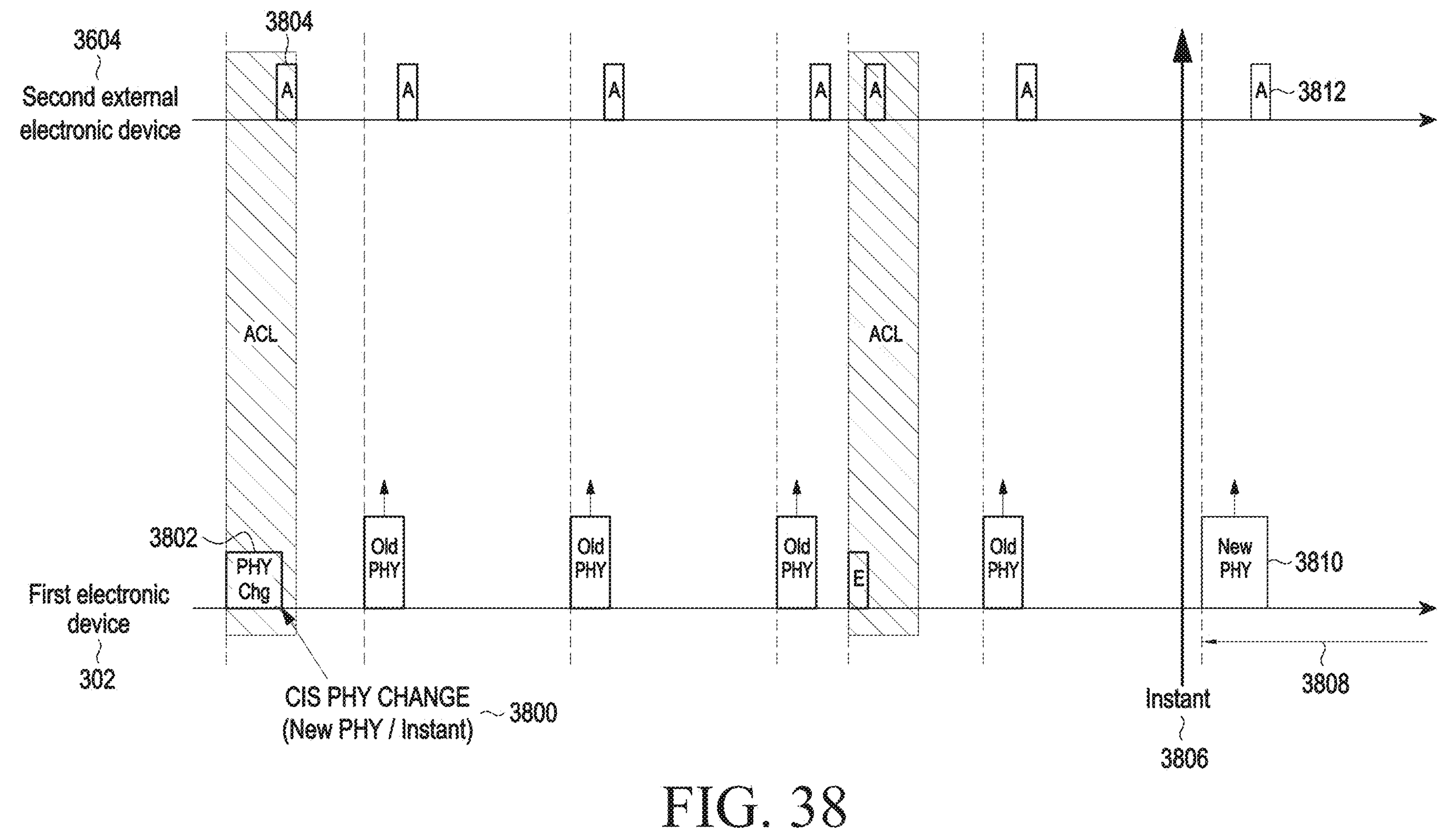
FIG. 38 is a view illustrating a procedure for changing a PHY of a CIS link through an ACL link according to an example embodiment.

FIG. 38 is a view illustrating a procedure for changing a PHY of a CIS link through an ACL link according to an embodiment. In the illustrated example, the first electronic device 302 may be connected to the second external electronic device 3604 through a second ACL link and a second CIS link. Here, a procedure of changing the PHY of the second CIS link for the second external electronic device 3604 through the second ACL link is described, but the same procedure may be applied to the first ACL link and the first CIS link for the first external electronic device 3602.

Referring to FIG. 38, the first electronic device 302 may transmit a change request packet (e.g., PHY_Chg packet) 3802 related to the second CIS link through the second ACL link. In an embodiment, the change request packet 3802 may include CIS PHY change information (CIS PHY CHANGE) 3800, and the CIS PHY change information 3800 may include information about a new PHY change policy (New PHY) and an instant when the new PHY change policy is to be applied. The second external electronic device 3604 may obtain the CIS PHY change information 3800 and may transmit an ACK(A) packet 3804 corresponding to the change request packet 3802 to the first electronic device 302 through the second ACL link.

Until the time 3806 indicated by the CIS PHY change information 3800 is reached, the first electronic device 302 may transmit audio packets to the second external electronic device 3604 through the second CIS link using the previous old PHY (PHY). At the first ISO interval 3808 after reaching the time 3806, the first electronic device 302 may transmit the audio packet 3810 generated using the new PHY according to the new PHY change policy to the second external electronic device 3604 through the second CIS link. The second external electronic device 3604 may decode the audio packet 3810 received through the second CIS link using a new PHY according to the new PHY change policy. According to the decoding result, the ACK(A) packet 3812 corresponding to the audio packet 3810 may be transmitted to the first electronic device 302 through the second CIS link. Thereafter, the first electronic device 302 and the second external electronic device 3604 may exchange audio data using PHY(s) according to the new PHY change policy on the second CIS link.

Figure 39:
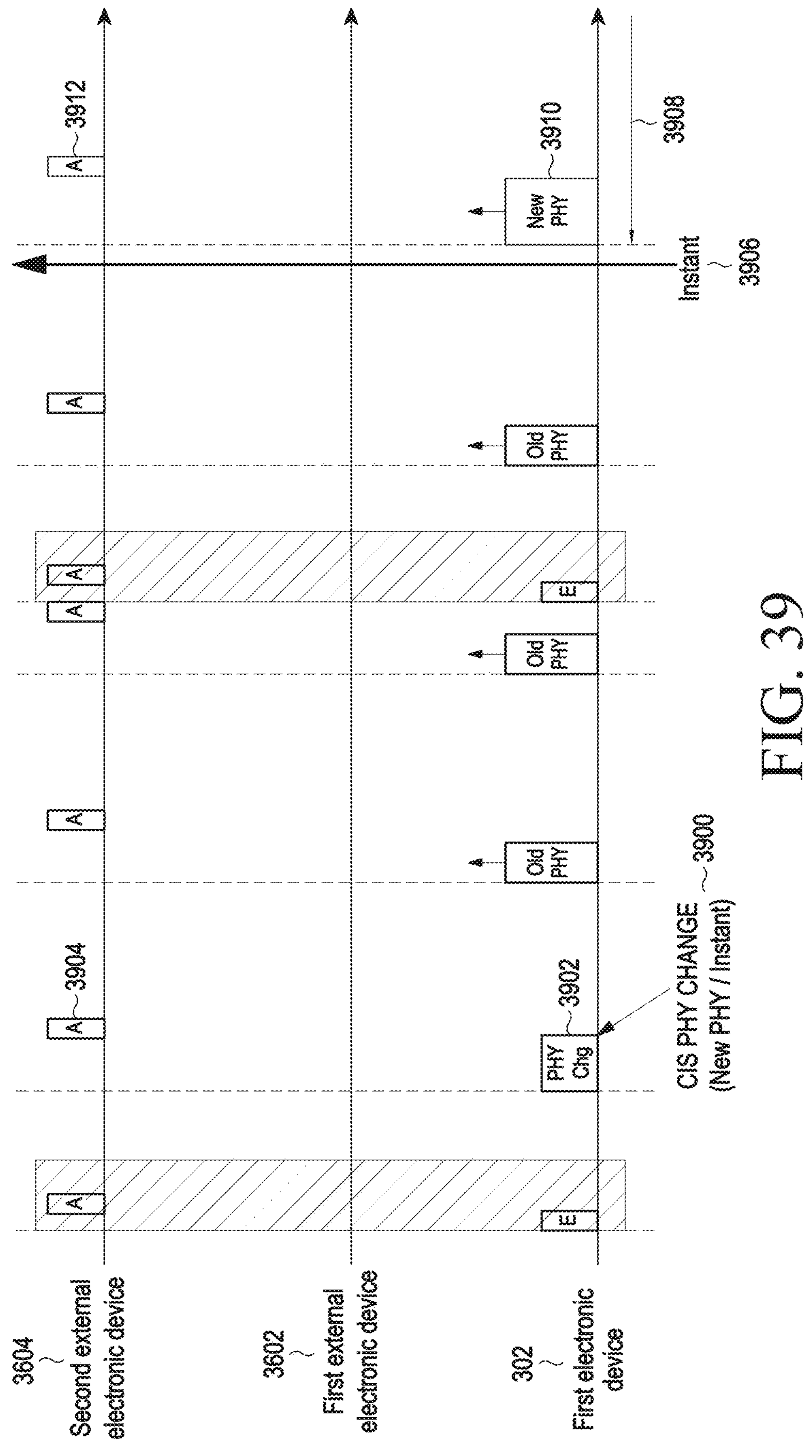
FIG. 39 is a view illustrating a procedure for changing a PHY through a CIS link according to an example embodiment.

FIG. 39 is a view illustrating a procedure for changing a PHY through a CIS link according to an embodiment. In the illustrated example, the first electronic device 302 may be connected to the second external electronic device 3604 through a second ACL link and a second CIS link. Here, a procedure of changing the PHY of the second CIS link for the second external electronic device 3604 through the second ACL link is described, but the same procedure may be applied to the first ACL link and the first CIS link for the first external electronic device 3602.

Referring to FIG. 39, the first electronic device 302 may transmit a change request packet (e.g., PHY_Chg packet) 3902 for changing the PHY through the second CIS link. In an embodiment, the change request packet 3902 may include CIS PHY change information (CIS PHY CHANGE) 3900, and the CIS PHY change information 3900 may include information about a new PHY change policy (New PHY) and an instant when the new PHY change policy is to be applied. The second external electronic device 3604 may obtain the CIS PHY change information 3900 and may transmit an ACK(A) packet 3904 corresponding to the change request packet 3902 to the first electronic device 302 through the second CIS link.

Until the time 3906 indicated by the CIS PHY change information 3900 is reached, the first electronic device 302 may transmit audio packets to the second external electronic device 3604 through the second CIS link using the previous PHY. At the first ISO interval 3908 after reaching the time 3906, the first electronic device 302 may transmit the audio packet 3910 generated using the new PHY according to the new PHY change policy to the second external electronic device 3604 through the second CIS link. The second external electronic device 3604 may decode the audio packet 3910 received through the second CIS link using a new PHY according to the new PHY change policy. According to the decoding result, the ACK(A) packet 3912 corresponding to the audio packet 3910 may be transmitted to the first electronic device 302 through the second CIS link. Thereafter, the first electronic device 302 and the second external electronic device 3604 may exchange audio data using PHY(s) according to the new PHY change policy on the second CIS link.

According to embodiments of the disclosure, AoBLE electronic devices capable of providing an audio service through Bluetooth LE may change to a designated PHY at a designated time when performing the audio service and perform communication, thereby maintaining the quality and latency of the audio service, increasing the transmission success rate, minimizing or reducing current consumption, and increasing link efficiency.

According to embodiments of the disclosure, the electronic device may lead to selection of a PHY efficient to perform an audio service first among various PHYs supported by Bluetooth LE to perform communication, thereby increasing link efficiency.

A first electronic device 302 according to an embodiment may include memory 130 storing instructions, a communication circuit 190 configured to support Bluetooth communication and at least one processor 120, comprising processing circuitry, functionally connected, directly or indirectly, with the memory and the communication circuit. The instructions, when executed by the at least one processor, cause the first electronic device to establish a Bluetooth low energy (BLE) communication link with a second electronic device through at least the communication circuit. The instructions, when executed by the at least one processor, cause the first electronic device to identify a physical layer transmission scheme (PHY) change policy indicating a change in a PHY used in a connected isochronous stream (CIS) link for an audio service between the first electronic device and the second electronic device based on the BLE communication link. The instructions, when executed by the at least one processor, cause the first electronic device to start the CIS link based on the PHY change policy and determine a PHY for a first time interval of the CIS link as a first PHY based on the PHY change policy. The instructions, when executed by the at least one processor, cause the first electronic device to transmit a first audio packet generated using at least the first PHY in the first time interval to the second electronic device through at least the CIS link. The instructions, when executed by the at least one processor, cause the first electronic device to determine a PHY for a second time interval of the CIS link as a second PHY based on the PHY change policy. The instructions, when executed by the at least one processor, cause the first electronic device to transmit a second audio packet generated using at least the second PHY in the second time interval to the second electronic device through at least the CIS link.

In an embodiment, the PHY change policy may indicate a plurality of PHYs designated to be used in a plurality of time intervals, respectively, including the first time interval and the second time interval. The plurality of PHYs may include at least one of LE 1M (1 mega-symbol per second), LE 2M, coded PHY with S=2, coded PHY with S=8, or LE high rate (HR). Each of the plurality of time intervals may include one of at least one isochronous (ISO) interval for the CIS link, at least one event, or at least one subevent.

In an embodiment, the instructions cause the first electronic device to identify whether the second electronic device supports a PHY change function for the CIS link through the BLE communication link, and, upon identifying that the second electronic device supports the PHY change function, obtain the PHY change policy.

In an embodiment, the instructions cause the first electronic device to transmit a change request packet 2505 indicating a new PHY change policy and a time to apply the new PHY change policy to the second electronic device through at least the BLE communication link and/or the CIS link, receive a response packet 2515 allowing the new PHY change policy from the second electronic device through at least the BLE communication link and/or the CIS link, and transmit audio packets to the second electronic device through at least the CIS link based on the new PHY change policy.

In an embodiment, the PHY change policy may include a change order of a plurality of PHYs and/or a change order of a plurality of parameter sets. Each of the plurality of parameter sets may include information of at least one of a transmission path, a length of a subevent, or a data size for use in the CIS link.

A second electronic device 304 according to an embodiment may include memory storing instructions, a communication circuit 220 configured to support Bluetooth communication and at least one processor 210, comprising processing circuitry, functionally connected with the memory and the communication circuit. The instructions, when executed by the at least one processor, cause the second electronic device to establish a Bluetooth low energy (BLE) communication link with a first electronic device through at least the communication circuit. The at least one processor may be configured to identify a physical layer transmission scheme (PHY) change policy indicating a change in a PHY used in a connected isochronous stream (CIS) link for an audio service between the first electronic device and the second electronic device based on the BLE communication link. The at least one processor may be configured to start the CIS link based on the PHY change policy and determine a PHY for a first time interval of the CIS link as a first PHY based on the PHY change policy. The at least one processor may be configured to receive a first audio packet generated using at least the first PHY in the first time interval from the first electronic device through at least the CIS link. The at least one processor may be configured to determine a PHY for a second time interval of the CIS link as a second PHY based on the PHY change policy. The at least one processor may be configured to receive a second audio packet generated using at least the second PHY in the second time interval from the first electronic device through at least the CIS link.

In an embodiment, the PHY change policy may indicate a plurality of PHYS designated to be used in a plurality of time intervals, respectively, including the first time interval and the second time interval. The plurality of PHYs may include at least one of LE 1M (1 mega-symbol per second), LE 2M, coded PHY with S=2, coded PHY with S=8, or LE high rate (HR). Each of the plurality of time intervals may include one of at least one isochronous (ISO) interval for the CIS link, at least one event, or at least one subevent.

In an embodiment, the instructions cause the second electronic device to identify whether the first electronic device supports a PHY change function for the CIS link through the BLE communication link, and, upon identifying that the first electronic device supports the PHY change function, obtain the PHY change policy.

In an embodiment, the instructions cause the second electronic device to receive a change request packet 2505 indicating a new PHY change policy and a time to apply the new PHY change policy from the first electronic device through at least the BLE communication link and/or the CIS link, transmit a response packet 2515 allowing the new PHY change policy to the first electronic device through at least the BLE communication link and/or the CIS link, and receive audio packets from the first electronic device through at least the CIS link based on the new PHY change policy.

In an embodiment, the PHY change policy may include a change order of a plurality of PHYs and/or a change order of a plurality of parameter sets. Each of the plurality of parameter sets may include information of at least one of a transmission path, a length of a subevent, or a data size for use in the CIS link.

A method performed by a first electronic device 302 according to an embodiment may comprise establishing (1915) a Bluetooth low energy (BLE) communication link with a second electronic device 304. The method may comprise identifying (1930) a physical layer transmission scheme (PHY) change policy indicating a change in a PHY used in a connected isochronous stream (CIS) link for an audio service between the first electronic device and the second electronic device based on the BLE communication link. The method may comprise starting (1935) the CIS link based on the PHY change policy and determining (1940) a PHY for a first time interval of the CIS link as a first PHY based on the PHY change policy. The method may comprise transmitting (1945) a first audio packet generated using at least the first PHY in the first time interval to the second electronic device through at least the CIS link. The method may comprise determining (1940) a PHY for a second time interval of the CIS link as a second PHY based on the PHY change policy. The method may comprise transmitting (1945) a second audio packet generated using at least the second PHY in the second time interval to the second electronic device through at least the CIS link.

In an embodiment, the PHY change policy may indicate a plurality of PHYS designated to be used in a plurality of time intervals, respectively, including the first time interval and the second time interval. The plurality of PHYs may include at least one of LE 1M (1 mega-symbol per second), LE 2M, coded PHY with S=2, coded PHY with S=8, or LE high rate (HR). Each of the plurality of time intervals may include one of at least one isochronous (ISO) interval for the CIS link, at least one event, or at least one subevent.

In an embodiment, the method may further comprise identifying (1920, 1925) whether the second electronic device supports a PHY change function for the CIS link through the BLE communication link, and, upon identifying that the second electronic device supports the PHY change function, obtaining (1930) the PHY change policy.

In an embodiment, the method may further comprise transmitting (1967) a change request packet indicating a new PHY change policy and a time to apply the new PHY change policy to the second electronic device through at least the BLE communication link and/or the CIS link, receiving (1969) a response packet allowing the new PHY change policy from the second electronic device through at least the BLE communication link and/or the CIS link, and transmitting (1975, 1980) audio packets to the second electronic device through at least the CIS link based on the new PHY change policy.

In an embodiment, the PHY change policy may include a change order of a plurality of PHYs and/or a change order of a plurality of parameter sets. Each of the plurality of parameter sets may include information of at least one of a transmission path, a length of a subevent, or a data size for use in the CIS link.

A method performed by a second electronic device 304 according to an embodiment may comprise establishing (2015) a Bluetooth low energy (BLE) communication link with a first electronic device 302. The method may comprise identifying (2030) a physical layer transmission scheme (PHY) change policy indicating a change in a PHY used in a connected isochronous stream (CIS) link for an audio service between the first electronic device and the second electronic device based on the BLE communication link. The method may comprise starting (2035) the CIS link based on the PHY change policy and determining a PHY for a first time interval of the CIS link as a first PHY based on the PHY change policy. The method may comprise receiving a first audio packet generated using at least the first PHY in the first time interval from the first electronic device through at least the CIS link. The method may comprise determining a PHY for a second time interval of the CIS link as a second PHY based on the PHY change policy. The method may comprise receiving a second audio packet generated using at least the second PHY in the second time interval from the first electronic device through at least the CIS link.

In an embodiment, the PHY change policy may indicate a plurality of PHYs designated to be used in a plurality of time intervals, respectively, including the first time interval and the second time interval. The plurality of PHYs may include at least one of LE 1M (1 mega-symbol per second), LE 2M, coded PHY with S=2, coded PHY with S=8, or LE high rate (HR). Each of the plurality of time intervals may include one of at least one isochronous (ISO) interval for the CIS link, at least one event, or at least one subevent.

In an embodiment, the method may further comprise identifying (2020, 2025) whether the first electronic device supports a PHY change function for the CIS link through the BLE communication link, and, upon identifying that the first electronic device supports the PHY change function, obtaining (2030) the PHY change policy.

In an embodiment, the method may further comprise receiving (2062) a change request packet 2505 indicating a new PHY change policy and a time to apply the new PHY change policy from the first electronic device through at least the BLE communication link and/or the CIS link, transmitting (2066) a response packet 2515 allowing the new PHY change policy to the first electronic device through at least the BLE communication link and/or the CIS link, and receiving (2070, 2075) audio packets from the first electronic device through at least the CIS link based on the new PHY change policy.

In an embodiment, the PHY change policy may include a change order of a plurality of PHYs and/or a change order of a plurality of parameter sets. Each of the plurality of parameter sets may include information of at least one of a transmission path, a length of a subevent, or a data size for use in the CIS link.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment (s) described herein may be used in conjunction with any other embodiment(s) described herein.

The invention claimed is:

1. A first electronic device, comprising:

memory storing instructions;

a communication circuit configured to support Bluetooth communication; and at least one processor, comprising processing circuitry, functionally connected with the memory and the communication circuit, wherein the instructions, when executed by the at least one processor, cause the first electronic device to:

establish a Bluetooth low energy (BLE) communication link with a second electronic device through at least the communication circuit;

identify a physical layer transmission scheme (PHY) change policy indicating a change in a PHY used in a connected isochronous stream (CIS) link for an audio service between the first electronic device and the second electronic device based on the BLE communication link;

start the CIS link based on the PHY change policy;

determine a PHY for a first time interval of the CIS link as a first PHY based on the PHY change policy;

transmit a first audio packet generated using at least the first PHY in the first time interval to the second electronic device through at least the CIS link;

determine a PHY for a second time interval of the CIS link as a second PHY based on the PHY change policy; and transmit a second audio packet generated using at least the second PHY in the second time interval to the second electronic device through at least the CIS link.

2. The first electronic device of claim 1, wherein the PHY change policy indicates a plurality of PHYs designated to be used in a plurality of time intervals, respectively, including the first time interval and the second time interval, wherein the plurality of PHYs include at least one of LE 1M (1 mega-symbol per second), LE 2M, coded PHY with S=2, coded PHY with S=8, or LE high rate (HR), and wherein each of the plurality of time intervals includes one of at least one isochronous (ISO) interval for the CIS link, at least one event, or at least one subevent.

3. The first electronic device of claim 1, wherein the instructions cause the first electronic device to identify whether the second electronic device supports a PHY change function for the CIS link through the BLE communication link and, upon identifying that the second electronic device supports the PHY change function, obtain the PHY change policy.

4. The first electronic device of claim 1, wherein instructions cause the first electronic device to:

transmit a change request packet indicating a new PHY change policy and a time to apply the new PHY change policy to the second electronic device through at least the BLE communication link and/or the CIS link;

receive a response packet allowing the new PHY change policy from the second electronic device through at least the BLE communication link and/or the CIS link; and transmit audio packets to the second electronic device through at least the CIS link based on the new PHY change policy.

5. The first electronic device of claim 1, wherein the PHY change policy includes a change order of a plurality of PHYs and/or a change order of a plurality of parameter sets, and wherein each of the plurality of parameter sets includes information of at least one of a transmission path, a length of a subevent, or a data size for use in the CIS link.

6. A second electronic device, comprising:

memory storing instructions;

a communication circuit configured to support Bluetooth communication; and at least one processor, comprising processing circuitry, functionally connected with the memory and the communication circuit, wherein the instructions, when executed by the at least one processor, cause the second electronic device to:

establish a Bluetooth low energy (BLE) communication link with a first electronic device through at least the communication circuit;

identify a physical layer transmission scheme (PHY) change policy indicating a change in a PHY used in a connected isochronous stream (CIS) link for an audio service between the first electronic device and the second electronic device based on the BLE communication link;

start the CIS link based on the PHY change policy;

determine a PHY for a first time interval of the CIS link as a first PHY based on the PHY change policy;

receive a first audio packet generated using at least the first PHY in the first time interval from the first electronic device through at least the CIS link;

determine a PHY for a second time interval of the CIS link as a second PHY based on the PHY change policy; and receive a second audio packet generated using at least the second PHY in the second time interval from the first electronic device through at least the CIS link.

7. The second electronic device of claim 6, wherein the PHY change policy indicates a plurality of PHYs designated to be used in a plurality of time intervals, respectively, including the first time interval and the second time interval, wherein the plurality of PHYs include at least one of LE 1M (1 mega-symbol per second), LE 2M, coded PHY with S=2, coded PHY with S=8, or LE high rate (HR), and wherein each of the plurality of time intervals includes one of at least one isochronous (ISO) interval for the CIS link, at least one event, or at least one subevent.

8. The second electronic device of claim 6, the instructions cause the second electronic device to identify whether the first electronic device supports a PHY change function for the CIS link through the BLE communication link, and, upon identifying that the first electronic device supports the PHY change function, obtain the PHY change policy.

9. The second electronic device of claim 6, wherein the instructions cause the second electronic device to:

receive a change request packet indicating a new PHY change policy and a time to apply the new PHY change policy from the first electronic device through at least the BLE communication link and/or the CIS link;

transmit a response packet allowing the new PHY change policy to the first electronic device through at least the BLE communication link and/or the CIS link; and receive audio packets from the first electronic device through at least the CIS link based on the new PHY change policy.

10. The second electronic device of claim 6, wherein the PHY change policy includes a change order of a plurality of PHYs and a change order of a plurality of parameter sets, and wherein each of the plurality of parameter sets includes information of at least one of a transmission path, a length of a subevent, or a data size for use in the CIS link.

11. A method performed by a first electronic device, the method comprising:

establishing a Bluetooth low energy (BLE) communication link with a second electronic device;

identifying a physical layer transmission scheme (PHY) change policy indicating a change in a PHY used in a connected isochronous stream (CIS) link for an audio service between the first electronic device and the second electronic device based on the BLE communication link;

starting the CIS link based on the PHY change policy;

determining a PHY for a first time interval of the CIS link as a first PHY based on the PHY change policy;

transmitting a first audio packet generated using at least the first PHY in the first time interval to the second electronic device through at least the CIS link;

determining a PHY for a second time interval of the CIS link as a second PHY based on the PHY change policy; and transmitting a second audio packet generated using at least the second PHY in the second time interval to the second electronic device through at least the CIS link.

12. The method of claim 11, wherein the PHY change policy indicates a plurality of PHYs designated to be used in a plurality of time intervals, respectively, including the first time interval and the second time interval, wherein the plurality of PHYs include at least one of LE 1M (1 mega-symbol per second), LE 2M, coded PHY with S=2, coded PHY with S=8, or LE high rate (HR), and wherein each of the plurality of time intervals includes one of at least one isochronous (ISO) interval for the CIS link, at least one event, or at least one subevent.

13. The method of claim 11, further comprising:

identifying whether the second electronic device supports a PHY change function for the CIS link through the BLE communication link; and upon identifying that the second electronic device supports the PHY change function, obtaining the PHY change policy.

14. The method of claim 11, further comprising:

transmitting a change request packet indicating a new PHY change policy and a time to apply the new PHY change policy to the second electronic device through at least the BLE communication link and/or the CIS link;

receiving a response packet allowing the new PHY change policy from the second electronic device through at least the BLE communication link and/or the CIS link; and transmitting audio packets to the second electronic device through at least the CIS link based on the new PHY change policy.

15. The method of claim 11, wherein the PHY change policy includes a change order of a plurality of PHYs and a change order of a plurality of parameter sets, and wherein each of the plurality of parameter sets includes information of at least one of a transmission path, a length of a subevent, or a data size for use in the CIS link.

16. A method performed by a second electronic device, the method comprising:

establishing a Bluetooth low energy (BLE) communication link with a first electronic device;

identifying a physical layer transmission scheme (PHY) change policy indicating a change in a PHY used in a connected isochronous stream (CIS) link for an audio service between the first electronic device and the second electronic device based on the BLE communication link;

starting the CIS link based on the PHY change policy;

determining a PHY for a first time interval of the CIS link as a first PHY based on the PHY change policy;

receiving a first audio packet generated using at least the first PHY in the first time interval from the first electronic device through at least the CIS link;

determining a PHY for a second time interval of the CIS link as a second PHY based on the PHY change policy; and receiving a second audio packet generated using at least the second PHY in the second time interval from the first electronic device through at least the CIS link.

17. The method of claim 16, wherein the PHY change policy indicates a plurality of PHYs designated to be used in a plurality of time intervals, respectively, including the first time interval and the second time interval, wherein the plurality of PHYs include at least one of LE 1M (1 mega-symbol per second), LE 2M, coded PHY with S=2, coded PHY with S=8, or LE high rate (HR), wherein each of the plurality of time intervals includes one of at least one isochronous (ISO) interval for the CIS link, at least one event, or at least one subevent.

18. The method of claim 16, further comprising:

identifying whether the first electronic device supports a PHY change function for the CIS link through the BLE communication link; and upon identifying that the first electronic device supports the PHY change function, obtaining the PHY change policy.

19. The method of claim 16, further comprising:

receiving a change request packet indicating a new PHY change policy and a time to apply the new PHY change policy from the first electronic device through at least the BLE communication link and/or the CIS link;

transmitting a response packet allowing the new PHY change policy to the first electronic device through at least the BLE communication link and/or the CIS link; and receiving audio packets from the first electronic device through at least the CIS link based on the new PHY change policy.

20. The method of claim 16, wherein the PHY change policy includes a change order of a plurality of PHYs and/or a change order of a plurality of parameter sets, and wherein each of the plurality of parameter sets includes information of at least one of a transmission path, a length of a subevent, or a data size for use in the CIS link.

* * * * *